US009887884B2

(12) United States Patent
Benchorin et al.

(10) Patent No.: US 9,887,884 B2
(45) Date of Patent: Feb. 6, 2018

(54) CLOUD SERVICES PLATFORM

(71) Applicant: Mentor Graphics Corporation, Wilsonville, OR (US)

(72) Inventors: Shay Benchorin, Cupertino, CA (US); Emmanuel Petit, Chevreuse (FR); Serge Leef, Portland, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/216,954

(22) Filed: Mar. 17, 2014

(65) Prior Publication Data
US 2014/0325048 A1    Oct. 30, 2014

Related U.S. Application Data

(60) Provisional application No. 61/801,857, filed on Mar. 15, 2013, provisional application No. 61/889,525, filed on Oct. 10, 2013.

(51) Int. Cl.
*G06F 15/173* (2006.01)
*H04L 12/24* (2006.01)
(Continued)

(52) U.S. Cl.
CPC ............ *H04L 41/50* (2013.01); *G06F 3/0488* (2013.01); *G06F 3/1203* (2013.01); *G06F 3/126* (2013.01);
(Continued)

(58) Field of Classification Search
CPC ............. H04L 12/2408; H04L 12/2602; H04L 12/2818; H04L 29/08099; H04L 29/08567;
(Continued)

(56) References Cited

U.S. PATENT DOCUMENTS 6,658,459 B1 * 12/2003 Kwan .................. H04L 69/169
709/217
8,189,225 B1    5/2012  Lo et al.
(Continued)

FOREIGN PATENT DOCUMENTS

GB         2484001         3/2012

OTHER PUBLICATIONS

International Search Report dated Nov. 5, 2014, from International Patent Application No. PCT/US14/30717, 4 pp.
(Continued)

*Primary Examiner* — Liangche A Wang
*Assistant Examiner* — Johnny Aguiar
(74) *Attorney, Agent, or Firm* — Klarquist Sparkman, LLP

(57) ABSTRACT

Embodiments of the disclosed technology comprise a cloud-hosted central service platform that interfaces and enables access to both central and distributed resources and peripherals for connected mobile applications. For example, this platform allows service providers and application developers to create a large number of new classes of applications, leveraging web access to devices, sensors, and/or actuators of any kind. This platform can be applied to virtually any vertical segment. Any of the disclosed features or aspects of the disclosed embodiments can be used in various combinations and subcombinations with one another or with other methods, apparatus, and systems.

15 Claims, 57 Drawing Sheets
(41 of 57 Drawing Sheet(s) Filed in Color)

(51) Int. Cl.
- *G06F 3/12* (2006.01)
- *G06F 3/0488* (2013.01)
- *G06Q 10/10* (2012.01)
- *G06Q 30/02* (2012.01)
- *H04N 21/436* (2011.01)
- *H04L 29/08* (2006.01)
- *H04L 12/28* (2006.01)

(52) U.S. Cl.
CPC .......... *G06F 3/1226* (2013.01); *G06F 3/1287* (2013.01); *G06F 3/1292* (2013.01); *G06Q 10/101* (2013.01); *G06Q 10/103* (2013.01); *G06Q 30/0207* (2013.01); *G06Q 30/0237* (2013.01); *H04L 12/2818* (2013.01); *H04L 29/08099* (2013.01); *H04L 29/08567* (2013.01); *H04N 21/43615* (2013.01)

(58) Field of Classification Search
CPC ... H04L 67/025; H04L 67/125; H04L 69/169; H04N 21/4227; H04N 21/43615; H04N 5/4403; H04M 1/72533; G06F 1/3209; G06F 1/3215; G06F 19/3418; G06F 9/4411; G06F 3/1285; G06F 3/1287; G06F 3/1288; G06F 3/1289
USPC .... 709/208, 217, 223, 224, 227; 710/15, 62; 348/734
See application file for complete search history.

(56) References Cited

U.S. PATENT DOCUMENTS

| | | |
|---|---|---|
| 8,451,473 B2 | 5/2013 | Hong et al. |
| 2002/0078161 A1* | 6/2002 | Cheng ................ H04L 12/2803 709/208 |
| 2002/0083143 A1* | 6/2002 | Cheng ................ H04L 12/2805 709/208 |
| 2003/0142683 A1* | 7/2003 | Lam .................... H04L 12/2898 370/401 |
| 2006/0271695 A1* | 11/2006 | Lavian ................. G06F 21/552 709/229 |
| 2007/0211734 A1* | 9/2007 | Yang ................... H04L 12/2818 370/401 |
| 2008/0096486 A1 | 4/2008 | Whitten |
| 2011/0205965 A1* | 8/2011 | Sprigg ................. G06F 9/4411 370/328 |
| 2011/0238816 A1* | 9/2011 | Vohra ................. H04L 41/0806 709/224 |
| 2011/0240736 A1* | 10/2011 | Miyachi .................. H04L 67/02 235/382 |
| 2012/0197977 A1* | 8/2012 | Nagasaka ............... H04L 67/34 709/203 |
| 2013/0205016 A1* | 8/2013 | Dupre .................... H04L 43/10 709/224 |
| 2014/0085663 A1 | 3/2014 | Kavanappillil et al. |

OTHER PUBLICATIONS

Written Opinion dated Nov. 5, 2014, from International Patent Application No. PCT/US14/30717, 5 pp.
International Preliminary Report on Patentability and Written Opinion dated Sep. 24, 2015, from International Patent Application No. PCT/US14/30717, 7 pp.
Supplementary European Search Report dated Oct. 10, 2016, from European Patent Application No. 14764086.6, 8 pp.

* cited by examiner

FIG. 23

 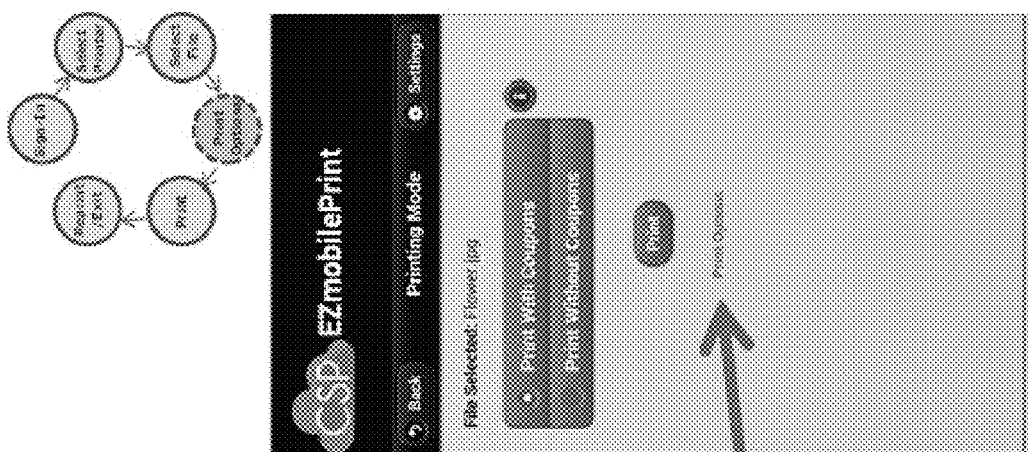
Print Options
Optional
Change print parameters
FIG. 27

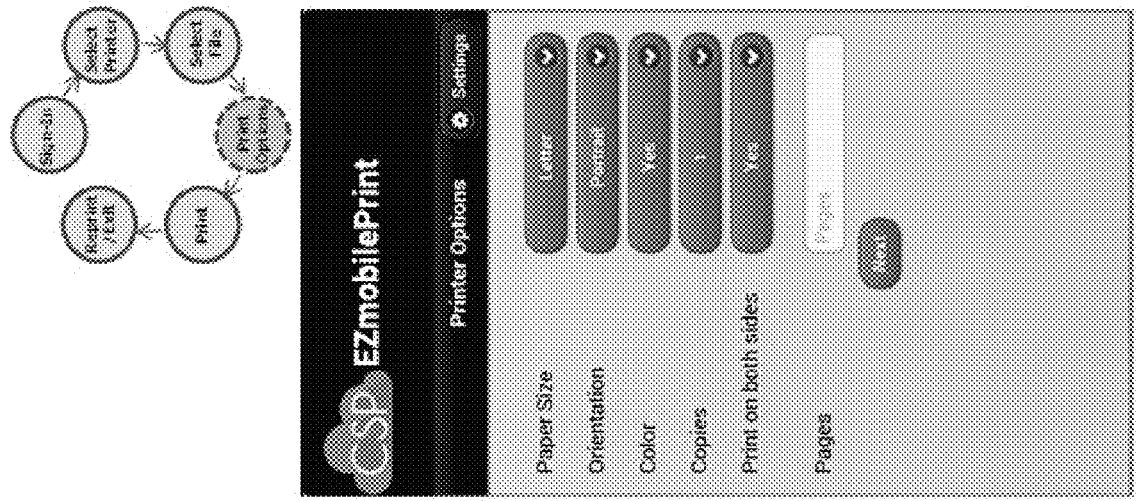
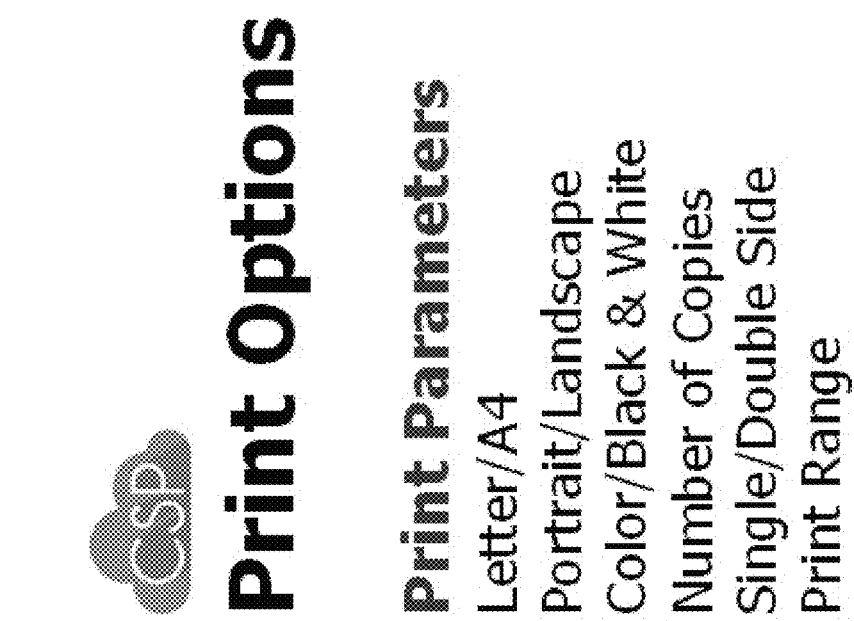
FIG. 28

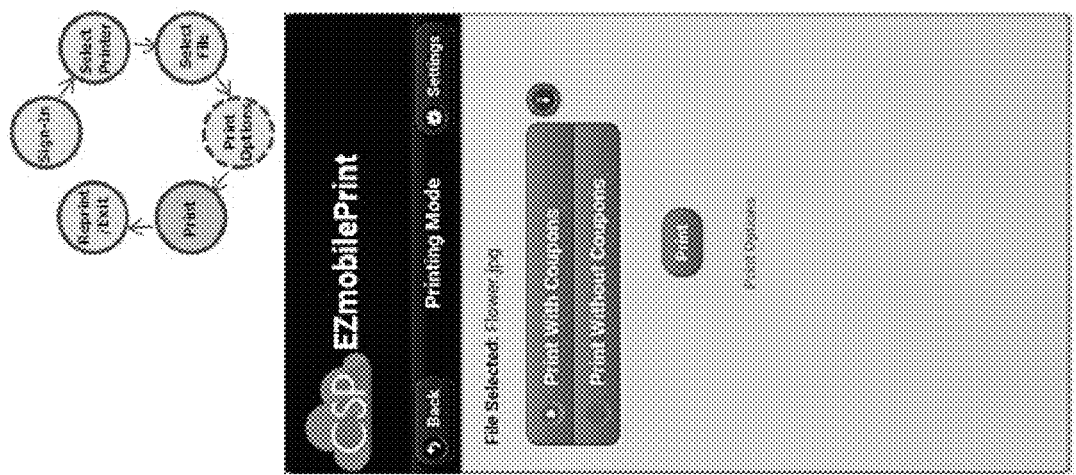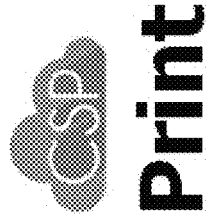
FIG. 29

CLOUD SERVICES PLATFORM

CROSS-REFERENCE TO OTHER APPLICATIONS

This application claims the benefit of U.S. Provisional Application No. 61/801,857, filed on Mar. 15, 2013, and entitled "CLOUD SERVICES PLATFORM", and U.S. Provisional Application No. 61/889,525, filed on Oct. 10, 2013, and entitled "CLOUD SERVICES PLATFORM", both of which are hereby incorporated herein by reference.

FIELD

This application relates generally to managing and controlling distributed electronic peripherals.

SUMMARY

Embodiments of the disclosed technology comprise a cloud-hosted central service platform that interfaces and enables access to both central and distributed resources and on-premises electronic peripherals for connected mobile or web applications. For example, this platform allows service providers and application developers to create a large number of new classes of applications, leveraging web access to devices, sensors, and/or actuators of any kind. This platform can be applied to virtually any vertical segment including, but not limited to, automotive, telehealth care, home automation, retail, etc. Embodiments of the disclosed platform can also be used as the foundation of large scale systems controlled by a single operator, such as a government agency, a transportation consortium, a retail operator, a building operator, airport operator, and/or any single operator having some control over a plurality of distributed peripheral devices. Also, companies with large distributed, connected assets that can benefit from a centralized control point can utilize such a platform.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 21-30 illustrate exemplary screen shots for a printing flow.

DETAILED DESCRIPTION

1. General Considerations

Figure 1:
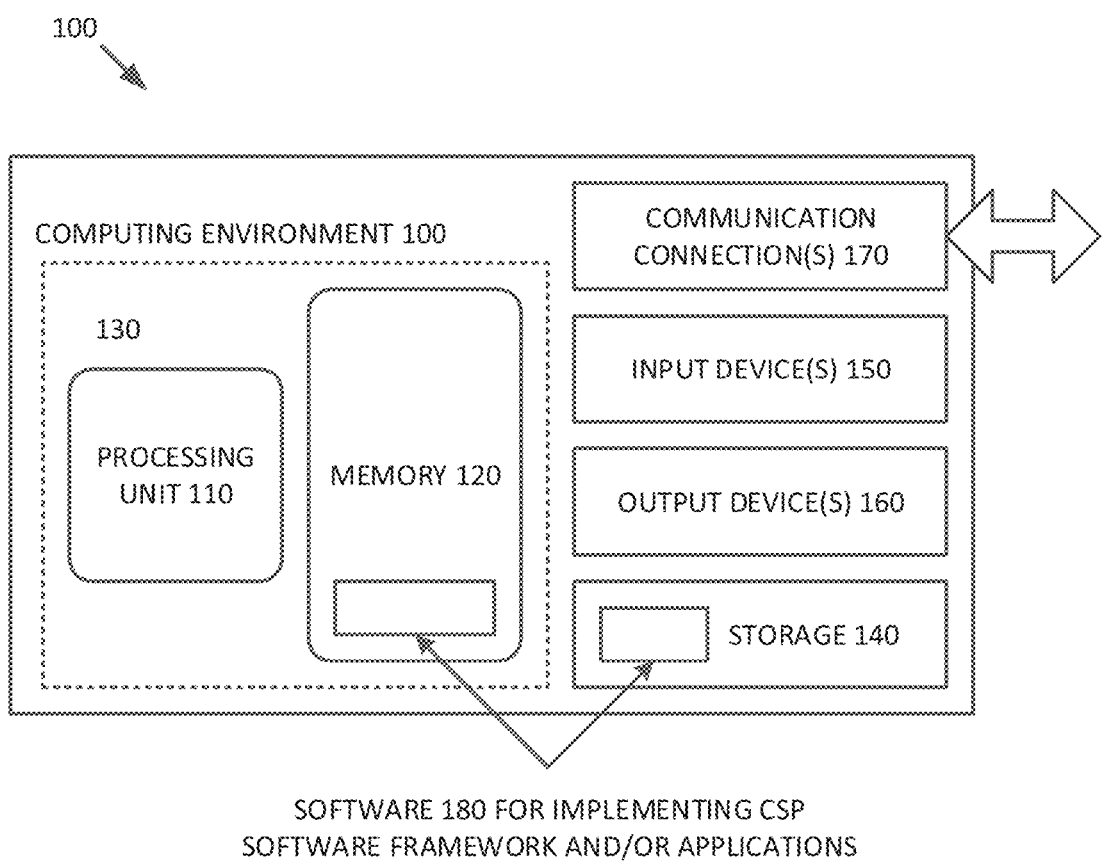
FIG. 1 illustrates a generalized example of a suitable computing hardware environment for a computing device with which several of the described embodiments can be implemented.

Disclosed below are representative embodiments of methods, apparatus, and systems for managing and controlling distributed peripherals. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another or with other methods, apparatus, and systems. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented by computer-executable instructions stored on one or more computer-readable media (e.g., non-transitory computer-readable media, such as one or more optical media discs, volatile memory components (such as DRAM or SRAM), or nonvolatile memory components (such as hard drives)) executing on a computer (e.g., any commercially available computer), or some combination thereof. Any of the computer-executable instructions for implementing the disclosed techniques (e.g., the disclosed peripheral management, peripheral control, or other techniques) as well as any intermediate or final data created and used during implementation of the disclosed systems can be stored on one or more computer-readable media (e.g., non-transitory computer-readable media). The computer-executable instructions can be part of, for example, a dedicated software application or as part of an application that is accessed or downloaded via a network (e.g., a local-area network, a wide-area network, a client-server network, or other such network).

Such software can be executed on a single computer (e.g., a computer embedded in or electrically coupled to a printer, multiple purpose printing kiosk, display device, scanning apparatus, actuator, sensor, or other device or system with which the disclosed technology may operate) or in a network environment. For example, the software can be executed by a computer embedded in or communicatively coupled to a printer, multiple purpose printing kiosk, display device, scanning apparatus, or other device or system with which the disclosed technology may operate.

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, Python, JINI, .NET, Lua or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions which when executed by a computer cause the computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by a computing device comprising an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a printer, multiple purpose printing kiosk, display device, scanning apparatus, actuator, sensor, or other device or system with which the disclosed technology may operate.

FIG. 1 illustrates a generalized example of a suitable computing hardware environment 100 for a computing device with which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described techniques for operating or using the disclosed systems. For example, the memory 120 can store software 180 for implementing any of the disclosed peripheral management, use, or control examples or techniques.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory storage medium which can be used to store information and which can be accessed within the computing environment 100. The storage 140 can also store instructions for the software 180 implementing any of the described techniques, systems, or environments.

The input device(s) 150 can be a touch input device such as a keyboard, mouse, touch screen, pen, or trackball, a voice input device, a scanning device, or another device that provides input to the computing environment 100. The output device(s) 160 can be a display, touch screen, printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment. Computer-readable media include tangible non-transitory computer-readable media, such as memory 120 and storage 140, and do not encompass transitory carrier waves or signals.

The various methods, systems, and interfaces disclosed herein can also be described in the general context of computer-executable instructions, such as those included in program modules, being executed in a computing environment on a target processor. Generally, program modules include routines, programs, libraries, objects, classes, components, data structures, and/or the like that perform particular tasks or implement particular abstract data types. The functionality of the program modules may be combined or split between program modules as desired in various embodiments. Computer-executable instructions for program modules may be executed within a local or distributed computing environment.

2. Introduction to the Disclosed Technology

Figure 2:
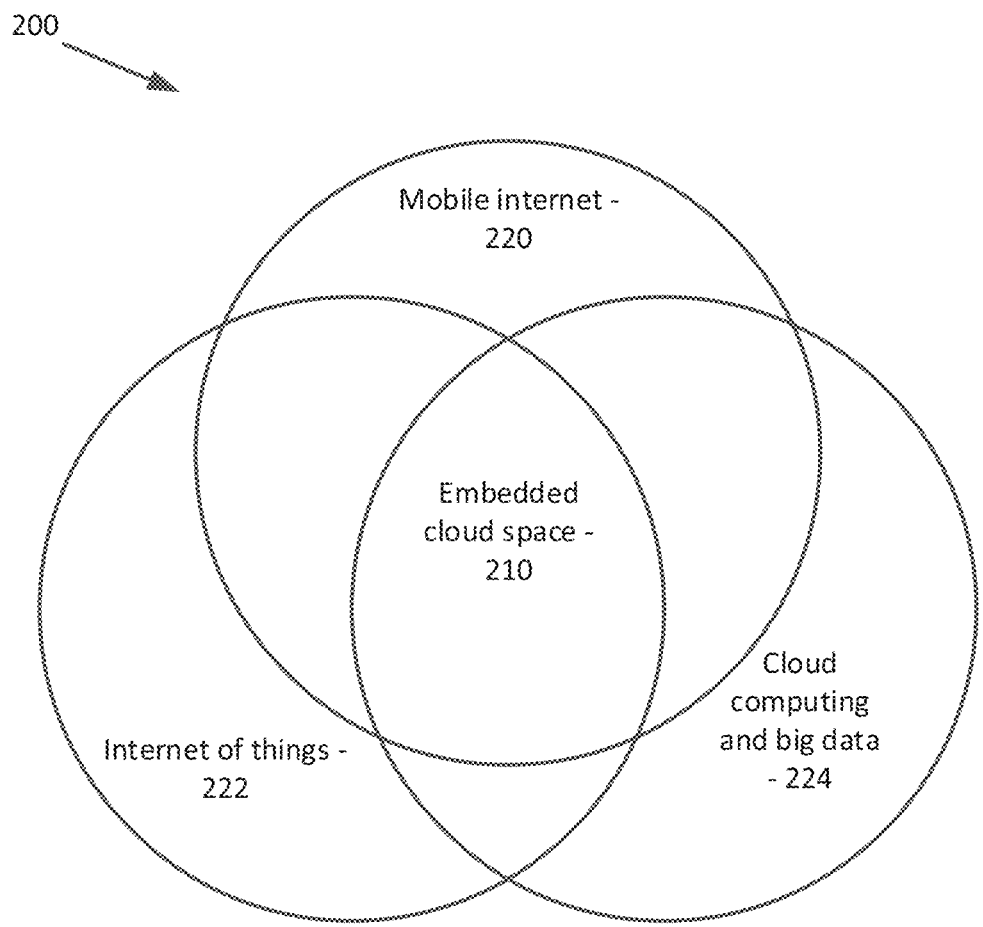
FIG. 2 is a block diagram illustrating a convergence space of the mobile internet, the internet of things, and cloud computing and big data.

Embodiments of the disclosed technology are designed to take advantage of three major trends in today's information technology: (i) cloud computing; (ii) the "internet of things"; and (iii) mobile applications. As shown in the diagram 200 of FIG. 2, embodiments of the disclosed technology lie in the convergence space (termed embedded cloud space 210) of the mobile internet 220, the internet of things 222, and cloud computing and big data 224.

Certain embodiments of the disclosed technology comprise a cloud-hosted central service platform that interfaces and enables access to both central and distributed resources and on-premises peripherals for connected mobile or web applications. For example, this platform allows service providers and application developers to create a large number of new classes of applications, leveraging web access to devices, sensors, and/or actuators of any kind. This platform can be applied to virtually any vertical segment including, but not limited to, automotive, telehealth care, home automation, retail, etc. Embodiments of the disclosed platform can also be used as the foundation of large scale systems controlled by a single operator, such as a government agency, a transportation consortium, a retail operator, a building operator, airport operator, and/or any single operator having some control over a plurality of distributed peripheral devices. Also, companies with large distributed, connected assets that can benefit from a centralized control point can utilize such a platform.

3. Example Solution Architectures and Design Elements 3.1. Separation of Layers

Existing embedded cloud solutions are built for enabling the deployment of a single application or applications from a single service provider. By contrast, embodiments of the disclosed technology support multiple service providers for providing services and access to a large variety of consumer devices. In order to achieve this capability, certain implementations use a separation of software layers and the creation of a public and managed web services layer.

Figure 3:
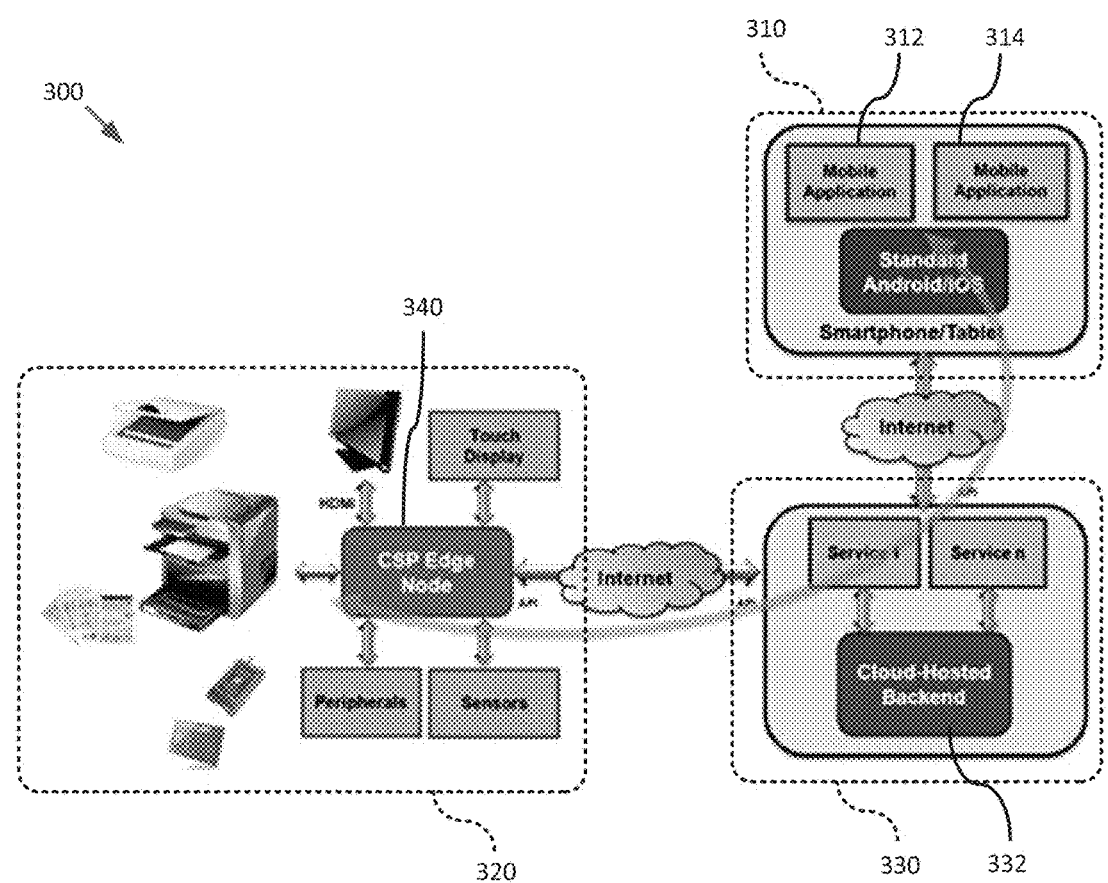
FIG. 3 is a block diagram showing one illustrative architecture for a cloud services platform (CSP) according to the disclosed technology.

FIG. 3 is a block diagram showing one illustrative architecture 300 for a cloud services platform (CSP) according to the disclosed technology. In particular, the architecture 300 provides access from a mobile device 310 (such as a smartphone or tablet) to a desired one or more peripherals (shown collectively as peripheral(s) 320), which are connected to a CSP edge node 340 through a web service layer 330 (which, in the illustrated embodiment, is implemented through a cloud-hosted backend 332).

As shown in the example of FIG. 3, proprietary hardware can be replaced by consumer/off-the-shelf peripherals (e.g., printers, scanners, monitors, card readers, sensors, actuators, and other such peripheral devices) shown at 320. Furthermore, in the illustrated implementations, a publicly available web service layer 330 serves as the bridge between the peripheral(s) 320 and the one or more mobile devices 310.

Also, with various implementations of the technology, the mobile device may execute one or more applications that can be (i) a native, connected application designed for the particular mobile device, (ii) a web application split between the client (rendering on the mobile equipment) and a server hosted on a network, such as the Internet, or (iii) some combination of both.

Other illustrative details of the architecture are shown in FIG. 3 itself. It should be noted that the particular configuration shown in FIG. 3 is for example purposes only and that any of the implementation details illustrated in FIG. 3 can be used alone or in any combination or subcombination with one another or substituted for other frontend or backend components.

3.2 Macro Components

Referring again to FIG. 3, at the first level of abstraction, the illustrative CSP architecture 300 comprises one or more of: (a) one or more central nodes designed to host the platform core and enabling services (e.g., hosted in the web service layer 330); (b) one or more edge nodes, such as edge node 340, designed to interface with on-premises peripherals; and (c) one or more mobile devices, such as mobile device 310, implementing the user experience of the services. Certain implementations of the architecture allow real-time and/or low-latency interactions with an application agent/interface loaded on the edge node (e.g., edge node 340) of the solution platform.

The architecture 300 can use one or more mobile applications configured to be executed by mobile devices, such as the mobile phone or tablet 310. Example applications 312, 314 are illustrated with mobile device(s) 310. The one or more applications 312, 314 executed by the mobile device(s) 310 can provide a user interface for allowing a user to select and use one or more services implemented in part by the peripheral(s) 320 and can also be used to help ensure continuous access to the central node of the platform (e.g., hosted in the web service layer 330). The mobile applications 312, 314 executed on the mobile device(s) 320 may utilize the (managed) services implemented by the combination of central nodes, edge nodes and peripherals. These mobile applications 312, 314 may, for example, be developed by external application developers and service providers, and then invoked by an end user of a mobile device to obtain a service. The mobile applications 312, 314 may be, for example, mobile client-server Web applications with the client-side executing on a mobile device 310 (e.g., in a mobile web browser) and a server-side hosted in Internet application servers.

Figure 4:
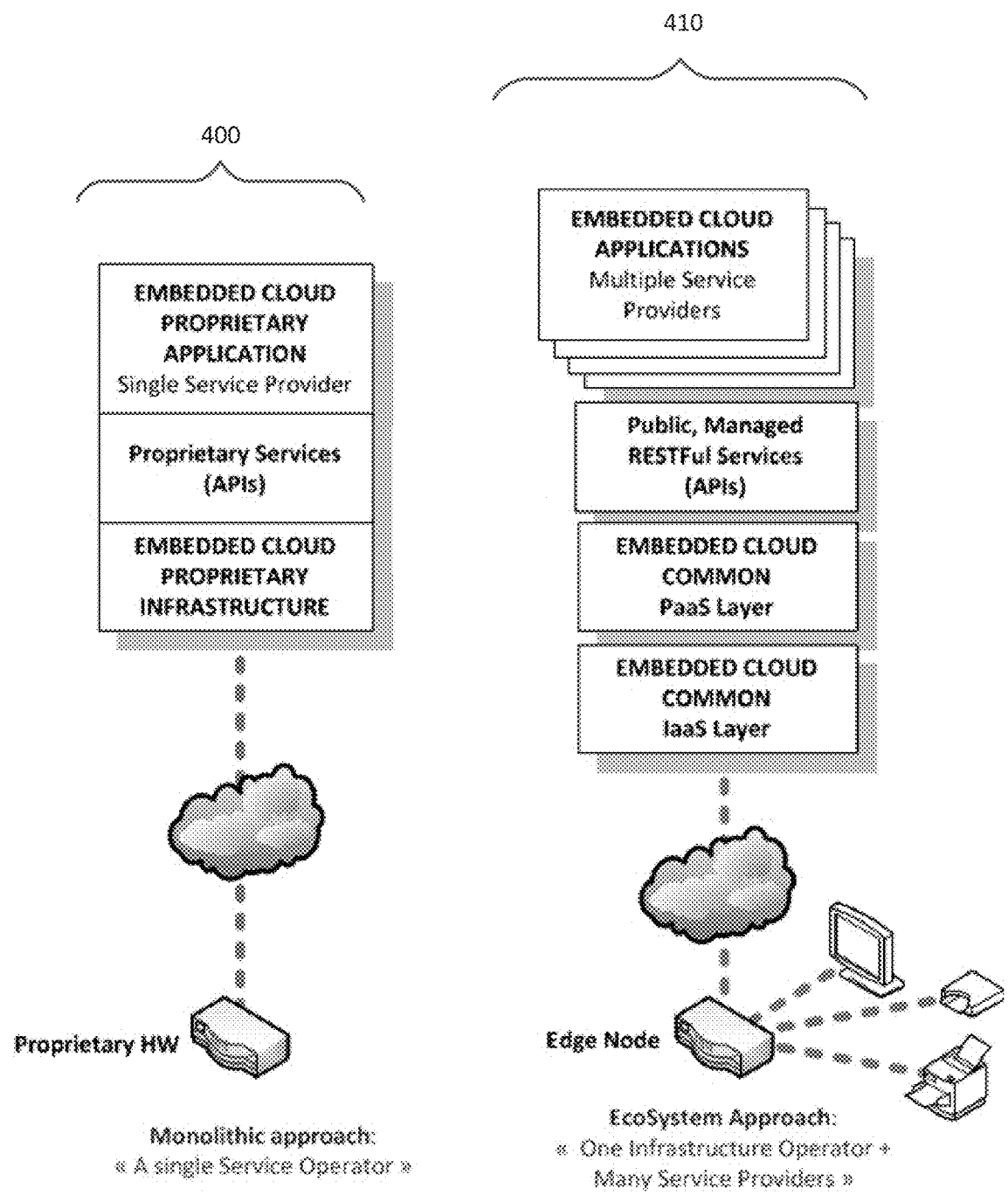
FIG. 4 is a schematic block diagram showing an example of an illustrative architecture according to the disclosed technology compared to a more traditional architecture.

FIG. 4 is a schematic block diagram showing an example of an illustrative architecture 410 according to the disclosed technology compared to a more traditional architecture 400. In particular, FIG. 4 shows a monolithic approach 400 for providing cloud-based application versus a public approach 410 in which a common platform exists (operated by a platform operator) on which multiple service providers can create and implement a variety of different applications that can be downloaded or otherwise accessed by consumers and used to operate, use, and/or otherwise engage one or more consumer peripherals (e.g., any of the peripherals mentioned herein). The particular diagram in FIG. 4 does not feature load balancing and clustering for the public approach 410, although it should be understood that such features can be available in embodiments of the disclosed technology.

Figure 5:
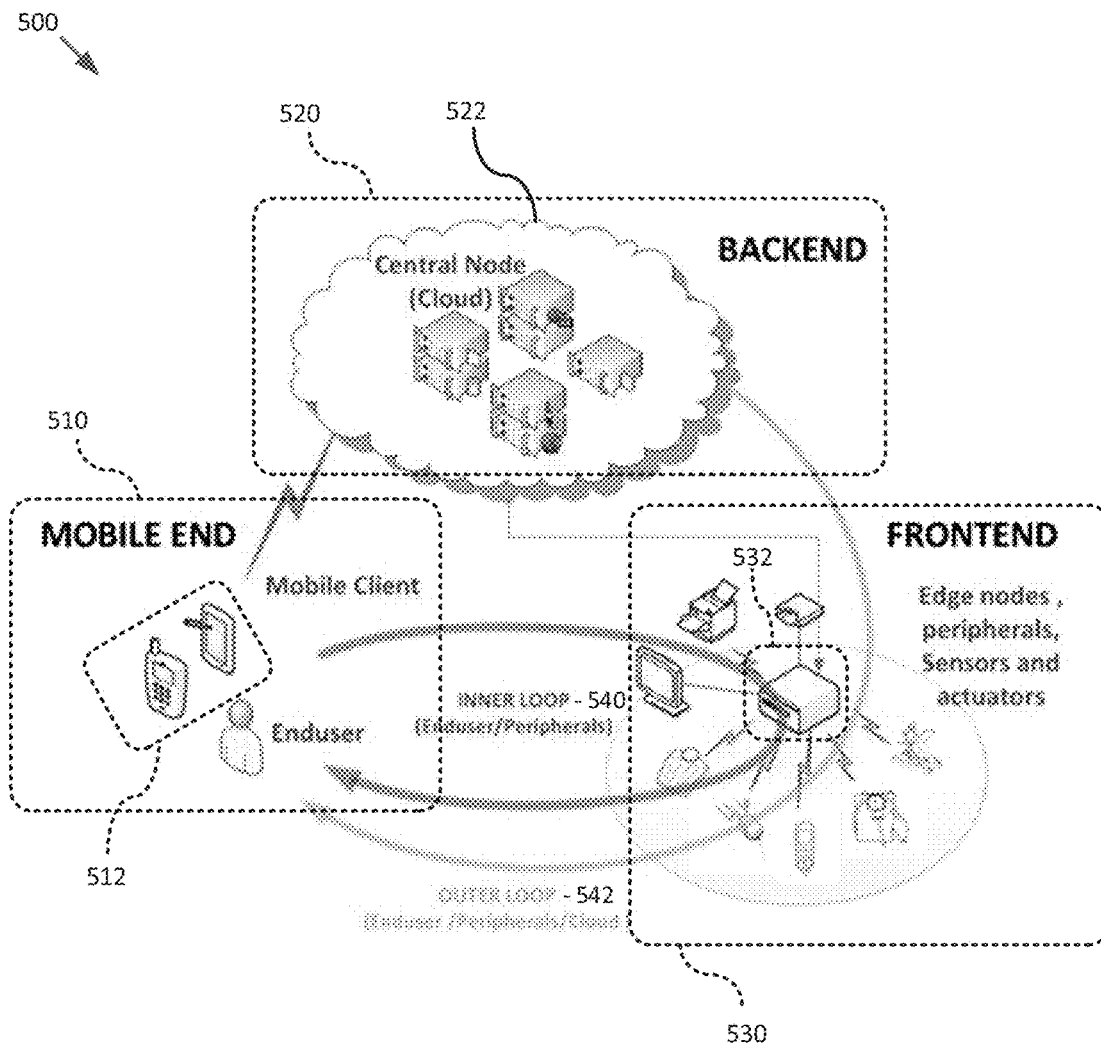
FIG. 5 is a schematic block diagram showing another illustrative architecture of a system according to one embodiment of the disclosed technology.

FIG. 5 is a schematic block diagram showing another illustrative architecture 500 of a system according to one embodiment of the disclosed technology. The architecture 500 includes a mobile end 510 (e.g., comprising one or more mobile devices 512 operated by an end user), a cloud-based back end 520 (e.g., comprising one or more central nodes 522 implemented using cloud-based hosted servers), and a front end 530 (e.g., comprising one or more edge nodes 532 that are communicatively coupled to one or more peripherals and configured to control the functionality of the peripherals (for instance, to receive and/or send data from a printer, scanner, monitor, actuator, sensor, or any other such peripheral device). As seen in this figure, the illustrative architecture provides an outer communication loop 542 involving the backend 520, and an inner communication loop 540 that substantially omits the backend 520. By working within the inner loop 540, the mobile end 510 and the front end 530 may provide a direct, low latency, real-time interaction between a managed peripheral and the edge node of the solution end.

3.3 Central Node Architecture & Design

3.3.1. Deployment Servers

Figure 6:
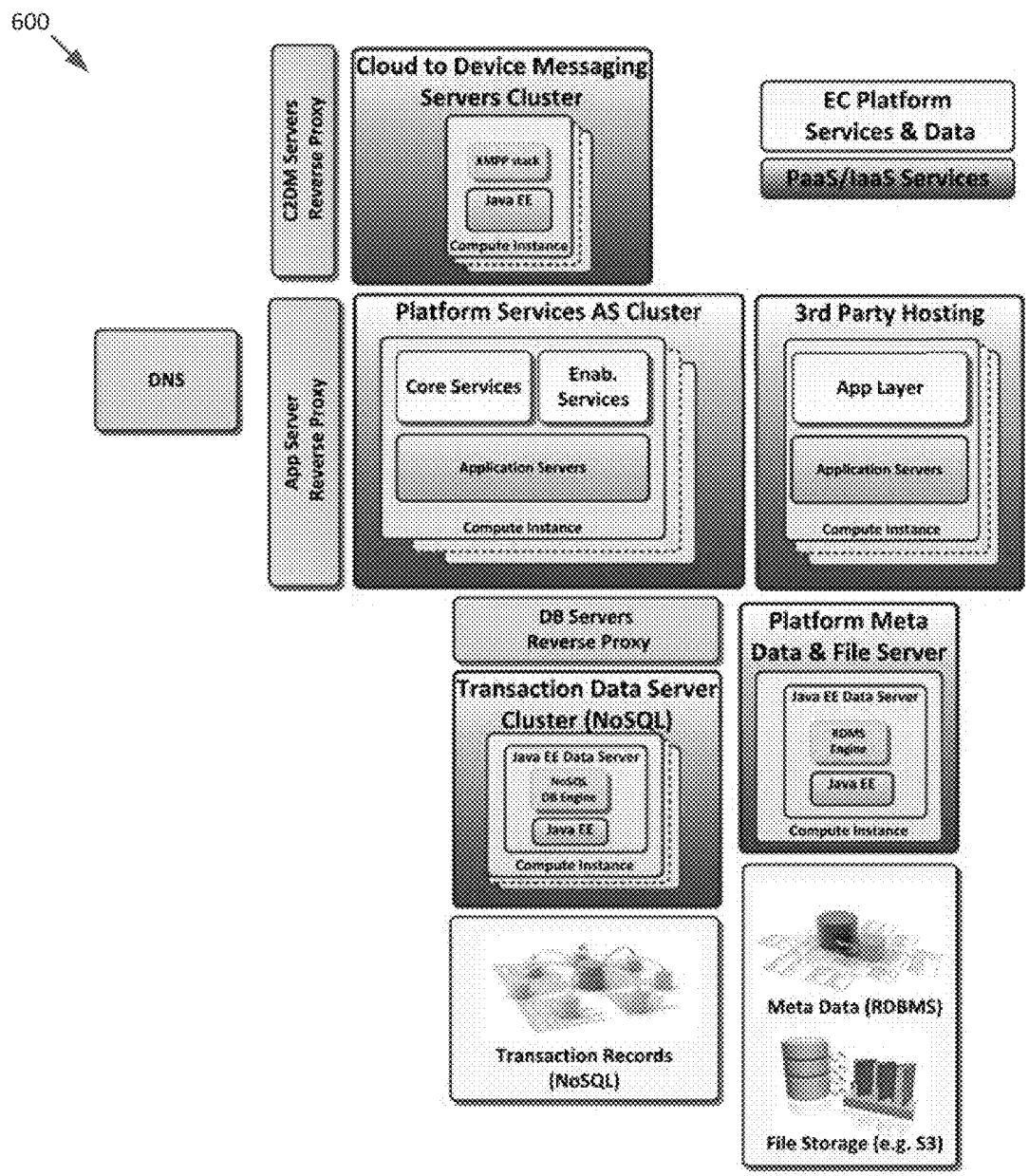
FIG. 6 is a schematic block diagram showing one illustrative architecture for the components of the one or more central nodes.

In certain embodiments, the one or more central nodes (e.g., hosted in web service layer 330 and shown as central node 522) can be running on a public infrastructure (e.g., any publicly available cloud-based hosting service) and can implement any one or more of the following functionalities:
- API Store
- Apps Store
- API Manager
- Identity Management
- Cloud to Device communication
- Message mediation
- Core and enabling services
- Web portals
- Web application hosting
- Billing and transaction reconciliation
- Central databases: meta data FIG. 6 is a schematic block diagram showing one illustrative architecture 600 for the components of the one or more central nodes. The illustrated embodiment should not be construed as limiting, however, as any one or more of the components can be implemented alone or in combination or subcombination with one or more of the other components.

Figure 59:
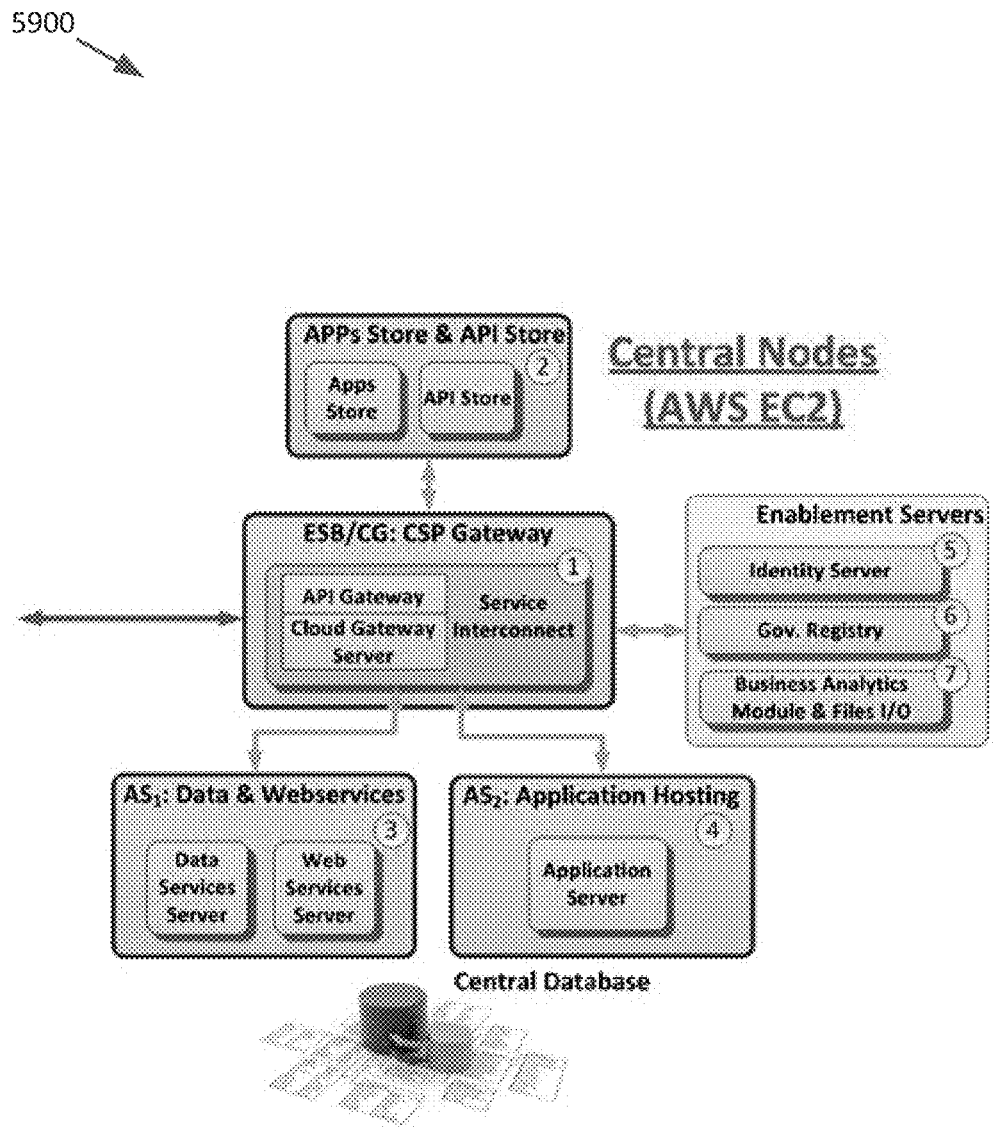
FIG. 59 is a block diagram of another embodiment of the one or more central nodes.

Another embodiment of the one or more central nodes is illustrated in architecture 5900 of FIG. 59. The components in the architecture 5900 are self-labeled and are not to be construed as limiting. Instead, the components can be used alone or in any combination or subcombination with one another.

3.3.2. Data Model

In particular embodiments, the central data server hosts a data model that implements any one or more of the following:
- The solution's actors credentials and attributes (e.g., one or more of Admin, Users, Service Providers, OEM, etc.);
- The embedded cloud topology description and peripheral attributes (e.g., one or more of edge nodes & peripherals attributes, relationships, etc.);
- The APIs and Applications attributes (e.g., one or more of their access credentials, business model and application/API relationships, etc.); and/or
- One or more peripheral request activity logs (e.g., binary inputs and outputs (as files, for instances) and other such events and data), which may be used for extracting utilization load per infrastructure's customer (e.g. application designer, service provider) in order to, e.g., generate billing information.

Description and modeling of personalized and localized commercial content (e.g. advertisement, coupons, promotional communication) that can be distributed for example together with a printout (on a printer peripheral) or on a display (on a TV peripheral).

Figure 60:
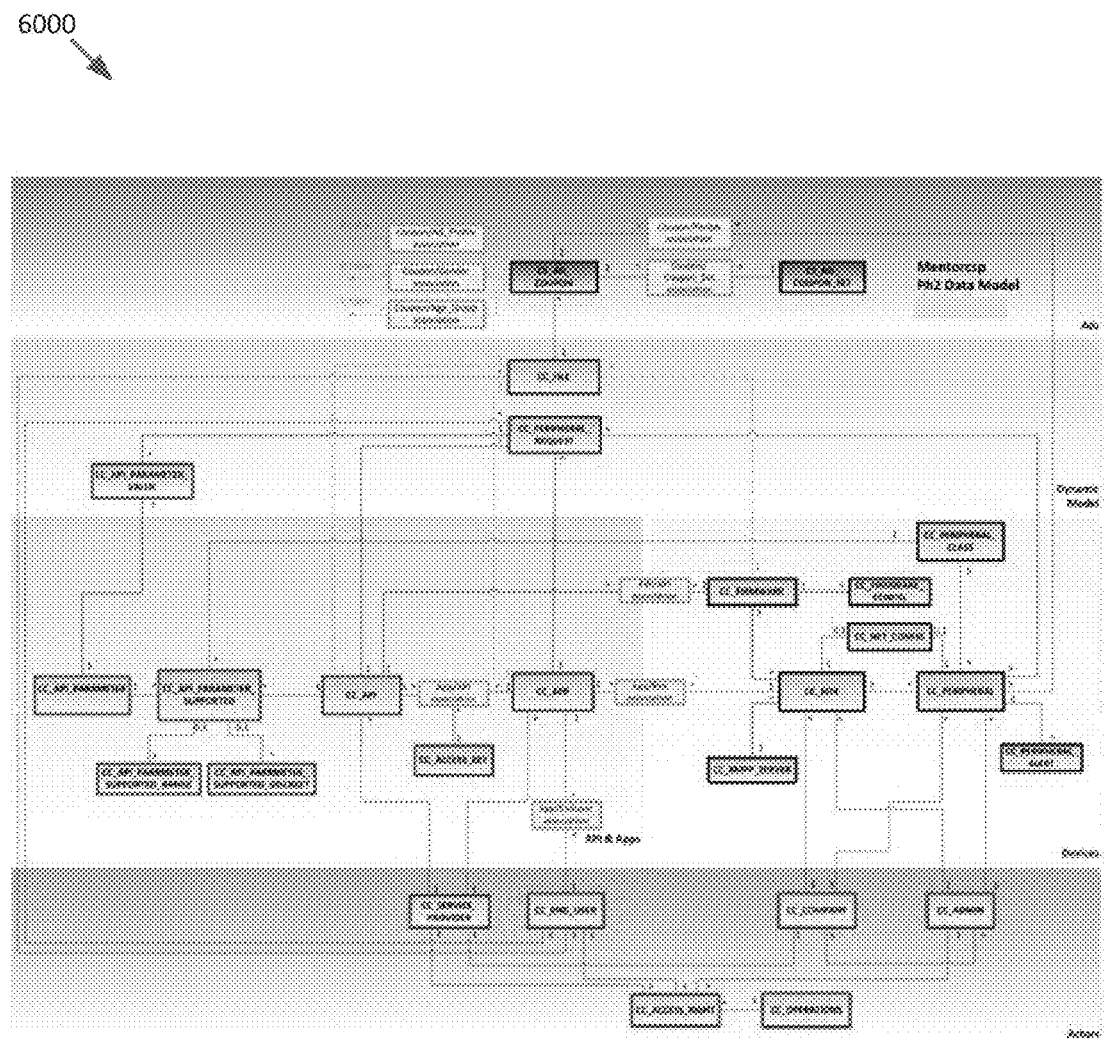
FIG. 60 is an entity-relation diagram showing one illustrative relationship model for data in an embodiment of the disclosed technology.

FIG. 60 is an entity-relation diagram showing one illustrative relationship model 6000 for data in an embodiment of the disclosed technology. The relationships and particular data objects shown in FIG. 60 should not be construed as limiting, however, as other implementations can use any one or more of the data objects or any one or more of the illustrated relationship alone or in any combination with one another.

Figure 61A:
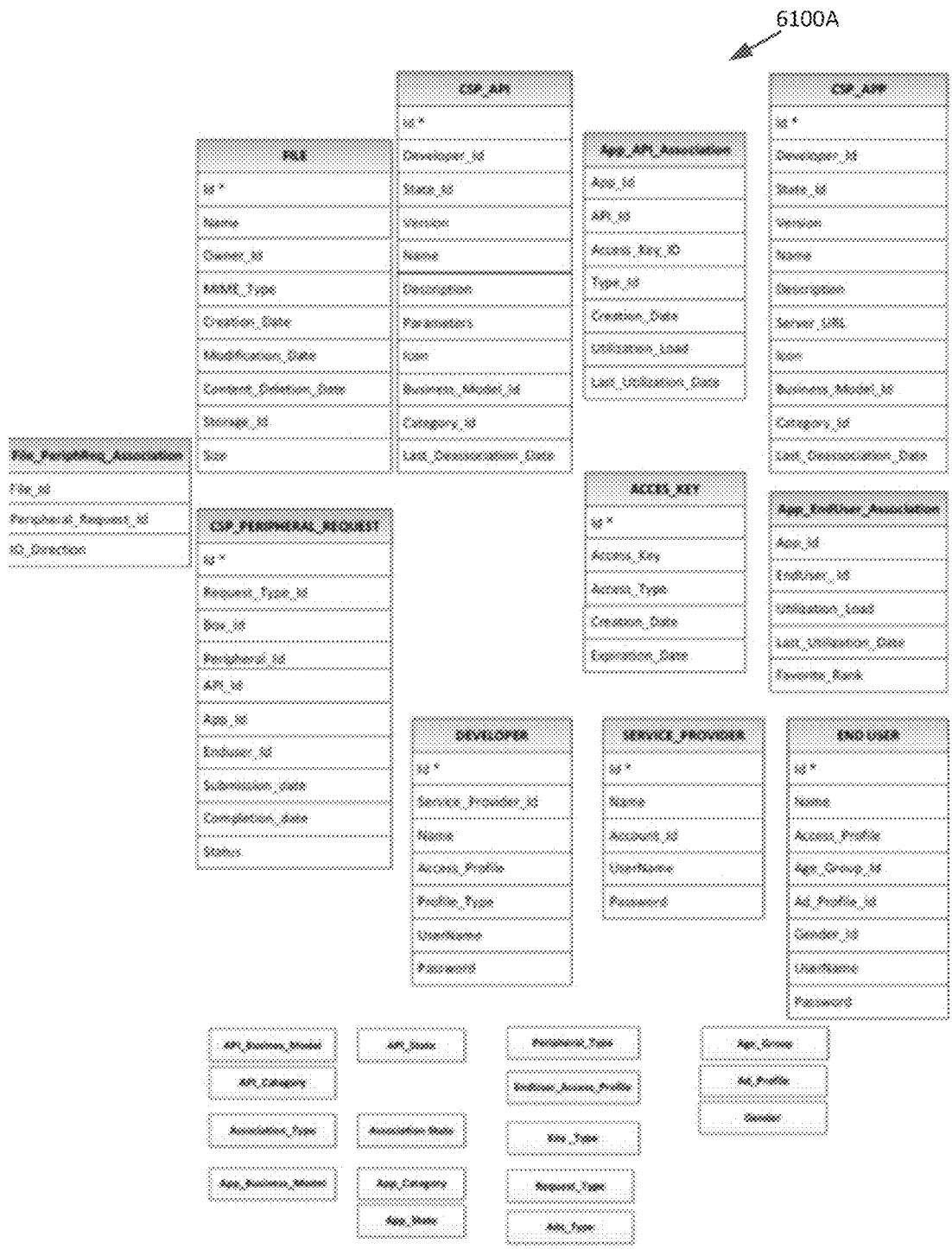
FIGS. 61A and B are schematic block diagrams showing one illustrative physical model of data according to an embodiment of the disclosed technology.
Figure 61B:
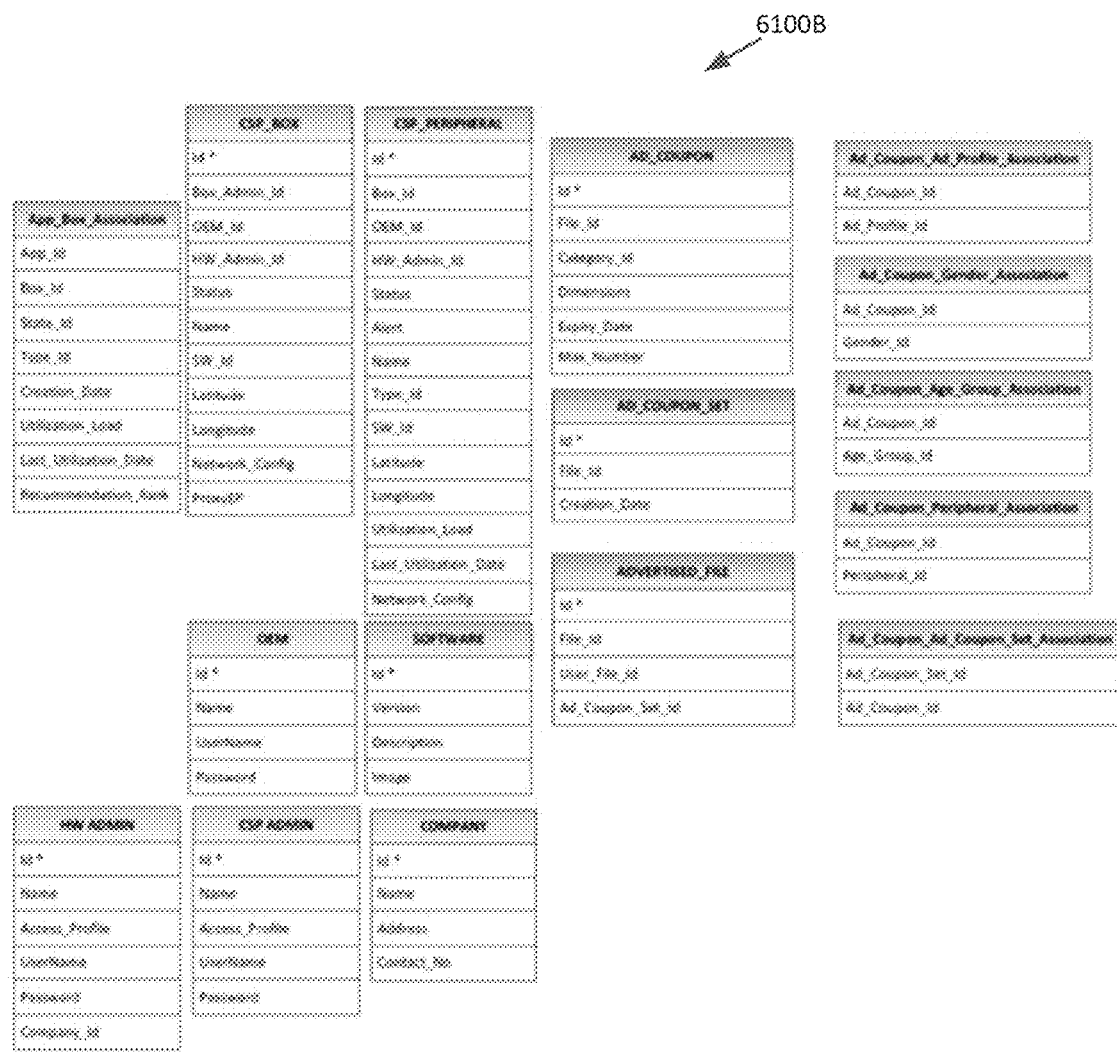

FIGS. 61A and B are schematic block diagrams showing one illustrative physical model 6100A and 6100B of data according to an embodiment of the disclosed technology. The relationships and particular data objects shown in FIGS. 61A and 61B should not be construed as limiting, however, as other implementations can use any one or more of the data objects or any one or more of the illustrated relationship alone or in any combination with one another.

3.3.3. Service Views

Figure 7:
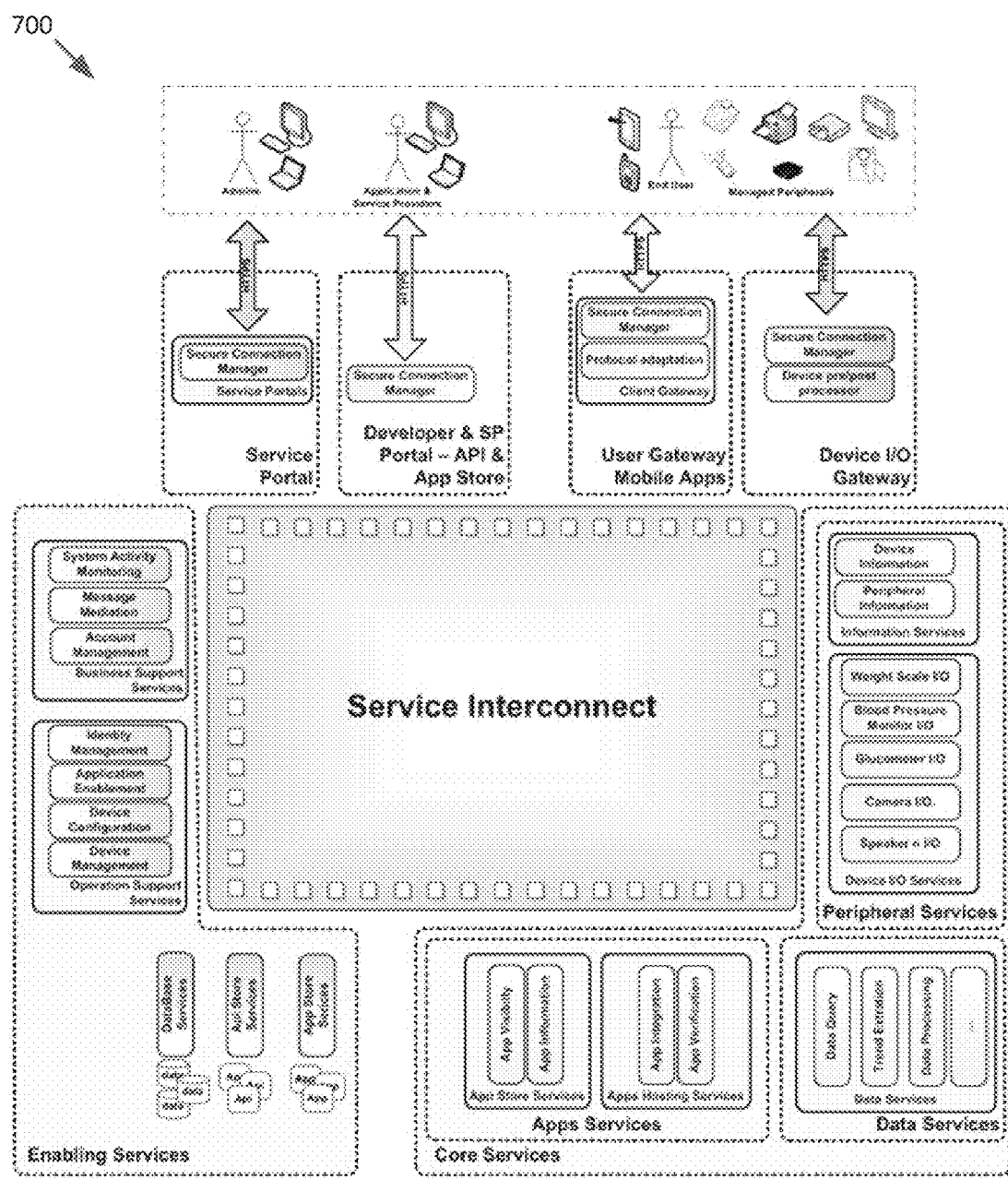
FIG. 7 is a block diagram showing services that can be available according to one illustrative embodiment of the disclosed technology.

Various services can be provided using embodiments of the CSP according to the disclosed technology. FIG. 7 is a block diagram 700 showing services that can be available according to one illustrative embodiment of the disclosed technology. The services and arrangement of services shown in FIG. 7 are by way of example only. Any one or more of the services can be offered alone or in any combination with one another.

The illustrative service view shown in FIG. 7 provides a high-level description of the services that the CSP can provide to various actors, including, for example:

Enabling services to deal with the internal management of the platform (these include, but are not limited to, one or more of: identity management, application and APIs life cycle management, edge nodes remote configuration and management, billing, activity monitoring, and/or the like); and/or Core services dealing with CSP's customers (these include, for example, one or more of pay-per-use peripheral and data services, application hosting, and/or the like).

3.3.4. Edge Node Architecture & Design

In certain embodiments of the disclosed technology, the CSP edge nodes implement any one or more of the following functionalities:

Secured device-initiated connection to the CSP central nodes;

On-premises peripheral controller (e.g., edge nodes receive and interpret CSP peripheral requests initiated by per-per-use or free web APIs invocation, and manage any state associated with peripheral requests; such as, for example, peripheral requests may be complex and may necessitate local interactions between the edge node software and the driven peripheral, as illustrated by the inner loop in FIG. 5); and/or Asynchronous and/or cyclic reporting of peripheral state change.

Figure 8:
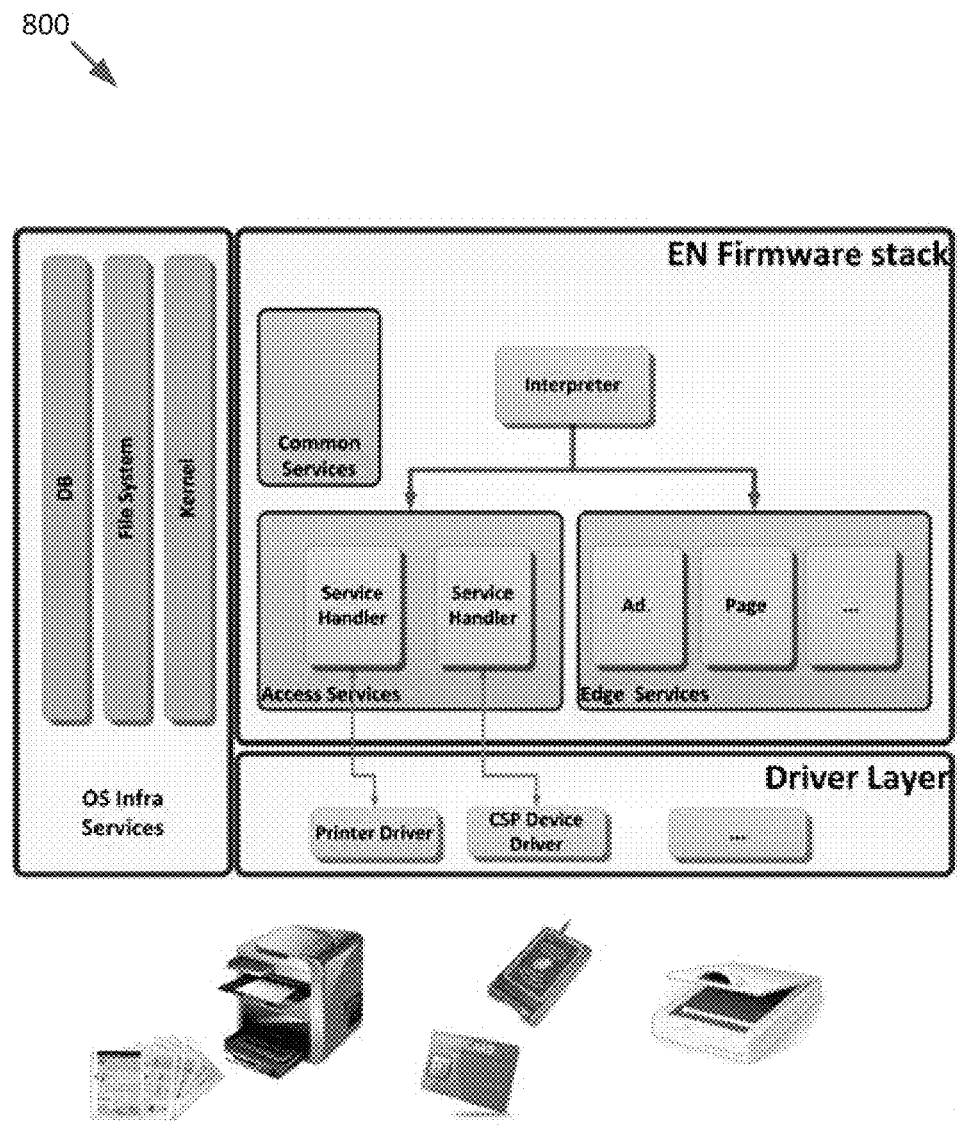
FIG. 8 is a schematic block diagram showing an illustrative architecture for the software components that can be used to implement a CSP edge node according to one embodiment of the disclosed technology.

FIG. 8 is a schematic block diagram showing an illustrative architecture 800 for the software components that can be used to implement a CSP edge node according to one embodiment of the disclosed technology. In certain implementations, the edge node is implemented using Freescale i.MX6Q boards with one or more quad-core ARM processors running Mentor Graphics' embedded Linux. The edge node can be configured to manage and control the peripherals via one or more central APIs. To provide the connection to the peripherals, the edge node can comprise one or more connectors, including one or more of a USB port, HDMI port, Ethernet port, or any other port and associated driver hardware for connecting and controlling one or more peripherals. The illustrative embodiment shown in FIG. 8 should not be construed as limiting in any way, however, as any of the components can be used alone or in any combination or subcombination with one another.

In certain implementations, businesses (such as vertical businesses) may desire the edge node to have additional features. In such implementations, the edge node can have one or more additional features, including one or more of:

Short range radio interface to aggregate data from one or more wireless sensors network (for example in home automation);

Bluetooth support to connect to one or more wireless devices (such as weight scale or blood pressure monitor(s));

A WiFi transceiver (e.g., an 802.11 compliant wireless transceiver) to so that the edge node can also serve as a WiFi access point and communicate directly with mobile devices in WiFi range of the edge node, thereby facilitating low-latency "inner loop" processing as more fully explained below; and/or A web browser to support web interface in the case the edge node is used for user's interface.

Figure 9:
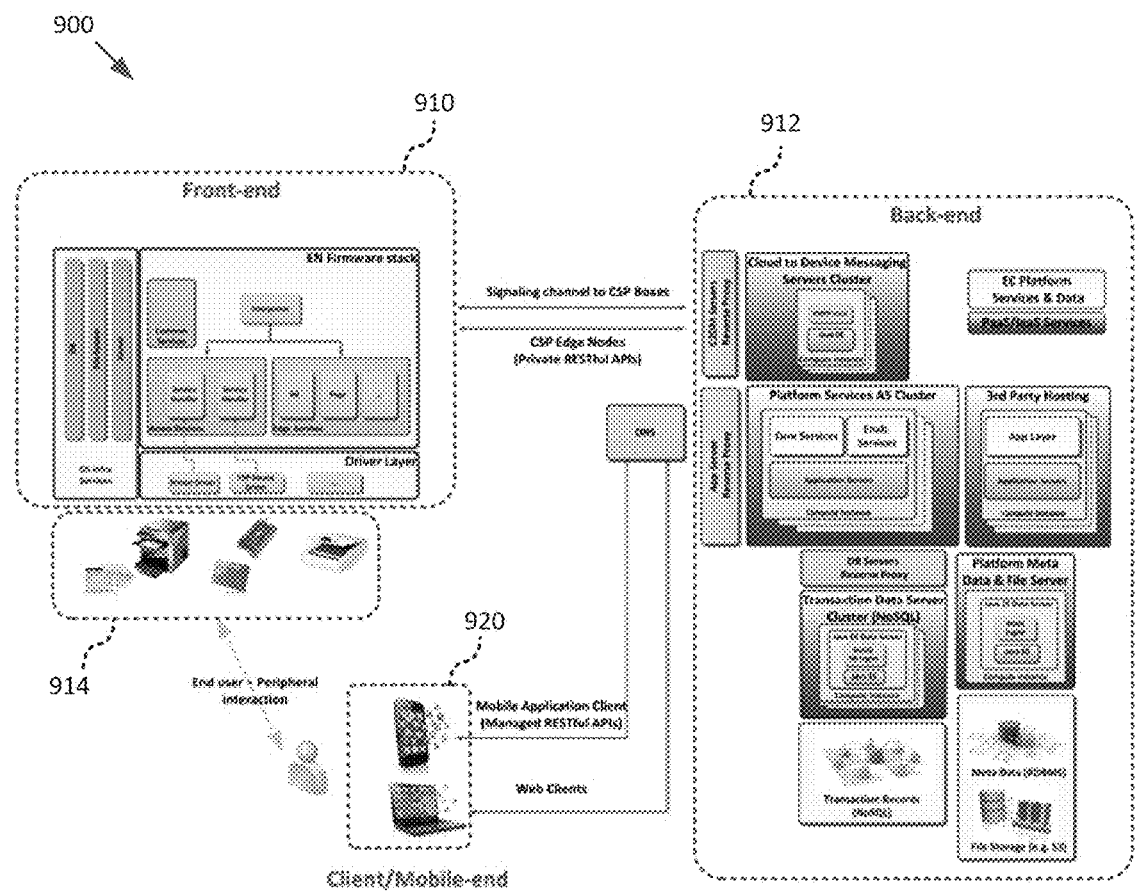
FIG. 9 is schematic block diagram of an illustrative example system architecture comprising a backend, a frontend, and mobile devices, which can be operated by a user to interact with the one or more peripherals.

FIG. 9 is schematic block diagram of an illustrative example system architecture 900 comprising a backend 912 (which can be the central node 600 and further include one or more of the illustrated components), a frontend 910 (which can be one or more the edge nodes 800 and further include one or more of the illustrated components), and mobile devices 920, which can be operated by a user to interact with the one or more peripherals 914. The communications between the backend 912 and the frontend 910 as well as the communications between the backend 912 and the mobile devices 920 can be facilitated, for example, via the internet or other public network. The illustrative embodiment shown in FIG. 9 should not be construed as limiting in any way, however, as any of the components can be used alone or in any combination or subcombination with one another.

Figure 10:
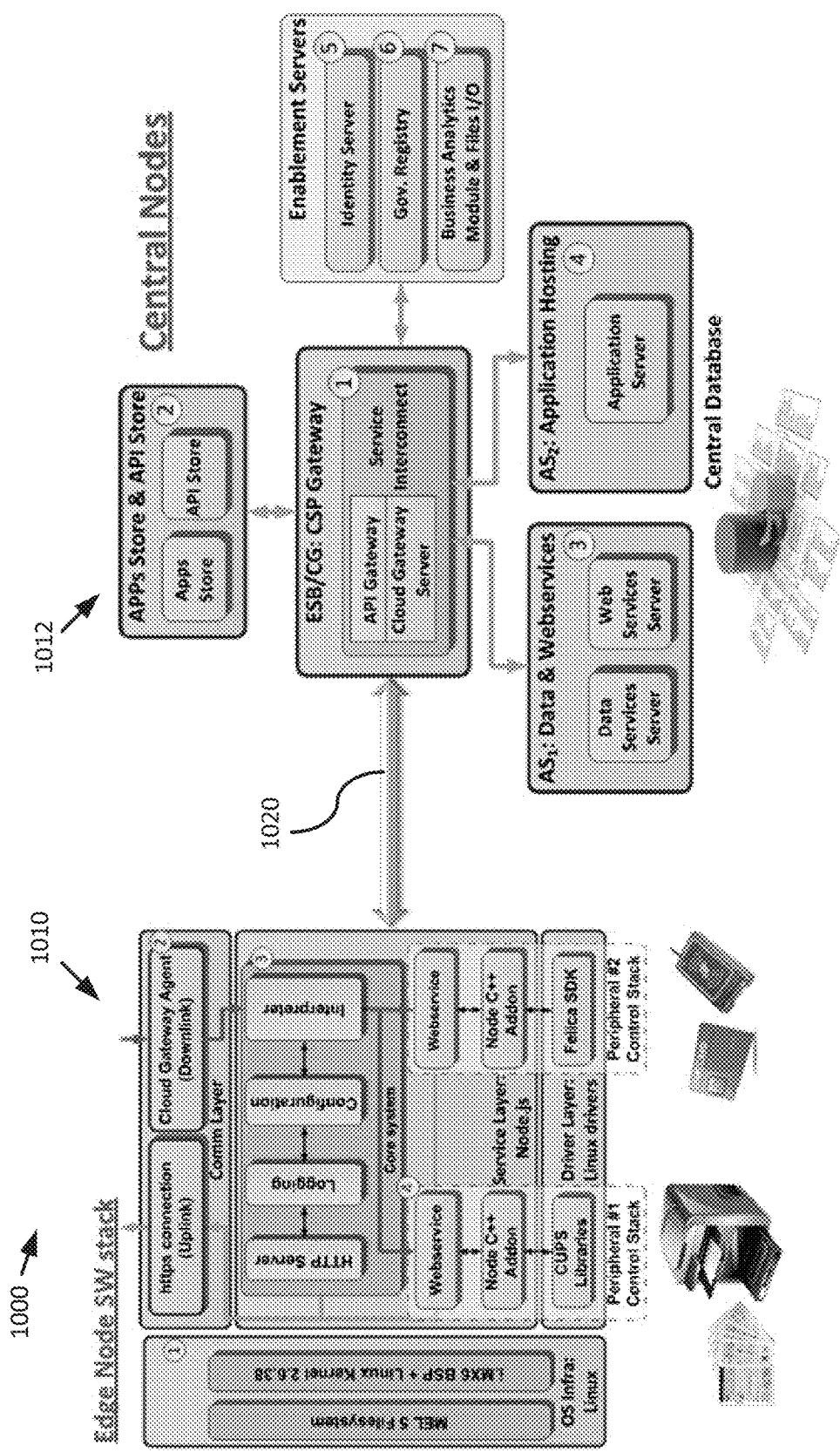
FIG. 10 is a schematic block diagram showing another example system architecture showing both the central node and the edge node in communication with one another via a network.

FIG. 10 is a schematic block diagram showing another example system architecture 1000 showing both the central node 1012 and the edge node 1010 in communication with one another via a network 1020. The network 1020 can be, for example, the internet or other public network. The illustrative embodiment shown in FIG. 10 should not be construed as limiting in any way, however, as any of the components can be used alone or in any combination or subcombination with one another.

3.4 Example Embodiments

One example embodiment of the disclosed technology is a system comprising: one or more central servers configured to host a set of web services and applications; and one or more edge nodes in communication with the one or more central servers, each of the one or more edge nodes being further configured to drive two or more peripherals, wherein the web services and applications are configured to be accessed by a mobile device separate from the central servers and the edge nodes and to facilitate operation of at least one of the peripherals driven by an edge node at a location in common with the mobile device without the mobile device directly communicating with the at least one of the peripherals. The two or more peripherals can be non-internet-enabled electronic peripherals.

Another example embodiment of the disclosed technology is a system, comprising: one or more central servers; and one or more edge nodes in communication with the one or more central servers, each of the one or more edge nodes comprising an edge node processor executing edge node software services including one or more of (a) a local web server/proxy request parser; (b) a local web browser configured to provide a local interface and execution client; and (c) one or more local device handlers or drivers, each of the one or more edge nodes being further configured to control one or more peripheral devices. The one or more peripherals can be non-internet-enabled electronic peripherals. The one or more peripheral devices can comprise two or more heterogeneous peripherals that operate using (a) different peripheral drivers; (b) different peripheral APIs; or (c) different operating systems. The one or more central servers can host one or more web services accessible via a mobile device application, at least one of the web services being configured to communicate with a respective edge node and drive a respective peripheral connected to the edge node in response to a request from a mobile device executing the mobile device application at a location coincident with the respective peripheral.

4. Illustrative Implementations

Illustrative embodiments of the disclosed technology are configured with scalability in mind. For example, certain implementations of the disclosed technology are configured to handle a large number of recurrent transactions. To generate large number of transactions, implementations of the disclosed technology are designed to reach to people in strategic places of their day to day life such as their office, their car, or their home. Applications can be provided to such individuals through the use of their mobile devices. The mobile devices can leverage the peripheral environment that surrounds them. For example, smartphones are becoming so ubiquitous that it is desirable to provide one or more applications that can be distributed to these smartphones and allow the user to access peripherals that exist or can exist throughout the environments that the user occupies in the course of their lives.

For example, any place with an identifiable set of peripherals can be targeted by the described technology, such as for example: hospital, mall, stadium, point of historical or sociological interest, and/or the like. In all such cases, a set of peripherals (e.g., a printer, scanner, monitor, actuator, sensor, or other such peripheral device) at the considered location can be used as the foundation of a system ecosystem (e.g., a system of interconnected peripheral devices) by collectively identifying all of the known peripheral devices within that system ecosystem.

5. Example Environments for Deploying Embodiments of the Disclosed Technology The disclosed technology can be deployed in a variety of environments. Example environments are disclosed below, but such environments should not be construed as limiting, as the number of the environments in which aspects of the disclosed technology can be used are not limited. Generally speaking, any number or variety of peripherals can be coupled to an edge node and used to create a customized deployment of the disclosed cloud-based service platform. The peripherals can include, for instance, one or more of: a multi-touch display, an image capture device (e.g., a camera), a microphone, a keypad, an RFID reader, a fingerprint reader, a Wi-Fi access point, a USB connector, a scanner (e.g., a barcode reader), a document scanner, a scale, a display device (e.g., a digital sign), a credit card reader, a smart card reader, a USB/phone charger, or other such electronic peripheral. A few example environments in which the disclosed cloud-services platform can be used are disclosed below:

An office environment, comprising one or more office peripherals. The office peripherals can comprise office peripherals such as: one or more printers, scanners, copiers, scales, coffee machines, information displays, access control systems, or the like;

A car environment, comprising one or more car peripherals The peripherals can comprise peripherals such as: one or more automotive built-in instrument controls (e.g., speed, acceleration, motor control, and/or the like), safety systems, navigation systems, user mobile phones on a dock, cameras, multimedia devices, driver assistance sensors, driver assistance actuators, or the like;

A health care environment, comprising one or more health care peripherals. The peripherals can comprise peripherals such as: one or more connected weight scales, blood pressure monitors, oxygen meters, glucose meters, cameras, external body sensors, internal body sensors/actuators (e.g., pacemakers), or the like.

A connected home environment, comprising one or more home peripherals. The home peripherals can comprise peripherals such as: printers, scanners, copiers, cameras, burglar alarms, electricity/gas meters, TVs, access systems, remote controls, or the like.

There exist many business environments in which embodiments of the disclosed technology can be implemented. The exhibits attached to this disclosure, which are incorporated by reference herein, further illustrate sample environments in which the disclosed technology can be implemented. Of course, any one or more aspects of the environment can be implemented in any environment where the access, management, and/or connectivity offered by the disclosed technology is desirable.

6. Operating the Platform

In particular embodiments, a platform operator can be used to administrate the central platform as described above and allow any one or more application developers or any one or more peripheral and/or service suppliers to participate in the advantages of embodiments of the disclosed architecture. For example, a "platform operator" can be formed to administrate the platform and collect operating revenues.

In particular implementations, this operator can collect recurrent revenues as the platform is utilized by multiple applications and/or operated by multiple service providers. Since platform services are managed, multiple business models can be implemented and enforced. For example, the platform services can be offered according to one or more of the following business models:

Pay-Per-Use;
Subscription;
Revenue sharing as a percentage of service provider's revenues; and/or
Any combination of the above

7. Barrier to Entry Considerations

In certain embodiments, barriers to entry to use embodiments of the disclosed technology can be lowered, using for example any one or more of the following techniques:

7.1. For Application Developers

In certain embodiments, the managed APIs (e.g., via RESTful compliant HTTP or HTTPs web services) are given access to application developers. The APIs can be accessed and distributed through an "API store" web portal that presents peripheral and peripheral-related services in an intuitive way (similar to a mobile app store that is now a common experience). The web developer can then pick and choose the pay-per-use APIs he/she is interested in for a given application and subscribe to (or purchase) them. The application developer can then create any connected application (e.g., web application, native application or hybrid application) using/calling the APIs he/she has subscribed to.

In other embodiments, an applications' metadata (or other description) is advertised to end users via a CSP-specific application store.

7.2. For Competitive Platform Providers

For competitive platform providers, the barrier to entry is desirably high. According to embodiments of the disclosed technology, this is the case at many different levels. One or more of the following can be used to help secure a high barrier of entry for competitive platform providers:

System architecture: Embodiments of the platform are made of a backend information system coupled with a large number of remote peripherals via edge nodes. The proper management of this large pool of peripherals and control devices of multiple natures is a complex task making the emergence of direct competition difficult. The edge nodes, which connect peripherals to the backend infrastructure and implement the device drivers, run a software stack that is not off the shelf, even though in certain implementations it can be assembled from general purpose components;

Peripheral connections to the back end: The connection of the peripherals to the backend is partially proprietary, involving security and reliability elements that are not off the shelf. One element that can be used in this subsystem is the edge nodes hosting peripheral servers. Duplicating these solution components and managing them properly is also a complex task. It should be noted that managed peripherals do not require an Internet connection; for example, with various implementations of the technology, they can be of any kind (e.g., USB, serial, short range radio, wired, etc.);

Proprietary peripherals: Proprietary peripherals or peripherals with proprietary interfaces can be operated over public yet protected Web APIs. The creation of such APIs is only possible under agreement of the one or more owners of such proprietary peripherals; and/or De facto standard: As the eco-system grows, more and more application developers will get used to the rules and behaviors of the services. The cost of changing platform provider will contribute to level up the barrier to entry.

8. Operating Services

In certain embodiments, there exists the opportunity to set up a service operator business alongside the platform operations. This service operator can collect, for example, subscription revenue directly from the end users.

9. Example Implementations

Various implementations of the technology may be used to allow a variety of mobile computing devices to work with a variety of stationary or semi-stationary supported computing devices.

9.1 General Implementation for Accessing Various Peripherals

Figure 11:
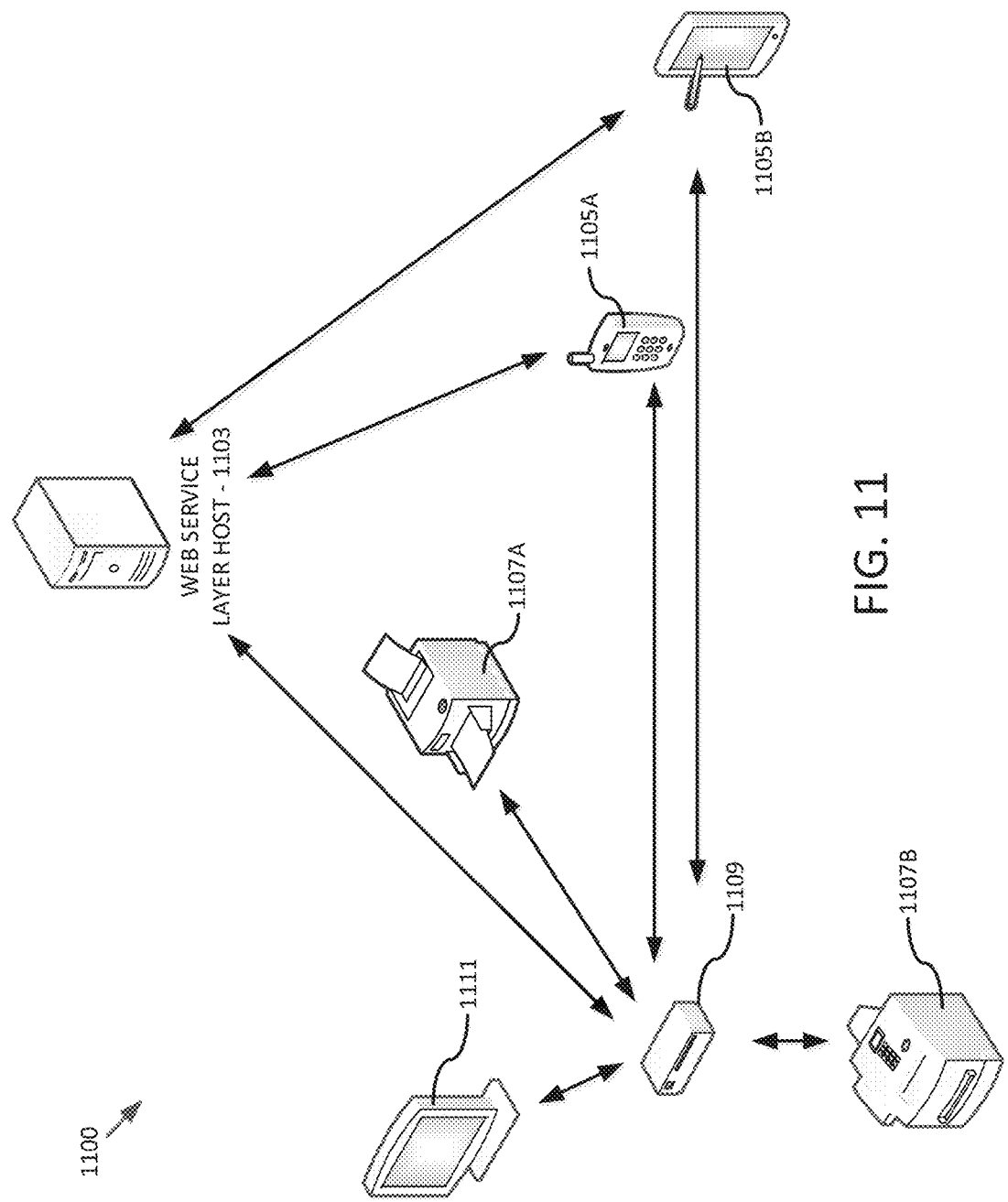
FIG. 11 is a block diagram of an example network configuration for implementing embodiments of the technology.

FIG. 11 is a block diagram of an example network configuration 1100 for implementing embodiments of the technology. As seen in this figure, the network configuration 1100 implementing various aspects of the technology can include a Web service layer host 1103, a plurality of mobile computing devices 1105, and a plurality of supported computing devices 1107. As will be explained in more detail below, the network configuration 1100 also may include an edge node host 1109, a display device 1111, or some combination of both.

According to various implementations of the technology, a user will initially carry a mobile computing device 1105, such the smartphone 1105A or a tablet computing device 1105B, to a location having one or more supported computing devices 1107. In the example illustrated in FIG. 11, the supported computing devices 1107 include a printer 1107A and a multifunction device 1107B, but with alternate implementations of the technology the supported computing devices 1107 may be medical testing or evaluation devices, devices used for shipping (such as scales), resource tracking devices such as those used in retail stores or warehouses, or others.

Next, a recognition application is launched by the mobile computing device 1105. The recognition application can be manually launched by the user of the mobile computing device 1105. Alternately, the recognition application can be manually launched in response to some stimulus, such as a particular movement of the mobile computing device 1105, an electromagnetic or sonic signal, a trigger from a positioning application (e.g., a Global Positioning Satellite position indication application), etc. The user then employs the recognition application of the mobile computing device 1105 to obtain supported device identification information identifying at least one of the supported computing devices 1107. With some implementations of the technology, the recognition application may be used to scan an identification marker physically located on a supported computing device 1107, such as a Near Field Communication (NFC) marker or a Quick Response (QR) code marker. Of course, with alternate implementations of the technology the recognition application may use any known technique to identify a particular supported computing device 1107. Also, it should be appreciated that the supported device identification information may identify a particular known environment of multiple supported computing devices 1107.

Once the recognition application has obtained the supported device identification information, the mobile computing device 1105 transmits the supported device identification information to the Web service layer host 1103. With the illustrated examples, the Web service layer host 1103 hosts a CSP backend as described in detail above. The mobile computing device 1105 can transmit the supported device identification information to the Web service layer host 1103 using any suitable communication medium, such as, for example, through a public or private electronic communication network (e.g., the internet).

With various implementations of the technology, the mobile computing device 1105 can also transmit user identification information to the Web service layer host 1103. The user identification information will include information identifying the mobile computing device 1105, the user of the mobile computing device 1105, the particular known environment of multiple supported computing devices 1107, or some combination of both.

In response to receiving the identification information, the Web service layer host 1103 conveys application information back to the mobile computing device 1105. More particularly, the Web service layer host 1103 provides the mobile computing device 1105 with application information corresponding to applications associated with the identification information. For example, if the identification information identified a supported computing device 1107 as a particular model of printer, then the application information may correspond to a printing application that allows the mobile computing device 1105 to print from that particular model of printer. Further, if the identification information identified the supported computing device 1107 as being at a particular retail location and identified the user as being a person with a purchase history at that retail location, then the application information may correspond to an application that provides coupons relevant to the user's purchase history and allows the mobile computing device 1105 to print the coupons from that particular model of printer. With various implementations of the technology, the application information may be a list of applications already resident on the mobile computing device 1105, the applications themselves for subsequent installation, or a link to the applications at another location for downloading or remote execution.

With various implementations of the technology, the associated applications may convey data to the supported computing device 1107 through the Web service layer host 1103. For example, if an associated application is a photo application for printing photographs on a supported computing device 1107 that is a particular printer, the photograph data to be printed may be sent by the mobile computing device 1105 to the Web service layer host 1103. Alternately, the user may employ the mobile computing device 1105 to select photograph data stored at some remote location accessible to the Web service layer host 1103 (e.g., at a "cloud" storage location). The Web service layer host 1103 in turn will relay data from the associated application (e.g., the photograph data to be printed) to the supported computing device 1107 through any suitable communication medium, such as, for example, through a public or private electronic communication network (e.g., the Internet).

The Web service layer host 1103 typically will relay data from the associated application to the supported computing device 1107 through an edge node, as discussed in detail above. In some implementations of the technology, the supported computing device 1107 will communicate with the Web service layer host 1103 through an edge node located in a separate edge node host 1109 (such as with the multifunction device 1107B). Alternately, the supported computing device 1107 will communicate with the Web service layer host 1103 through an edge node located in the supported computing device 1107 itself (such as with the printer 1107A). Of course, with still other implementations of the technology, the supported computing device 1107 may alternately or additionally send or exchange data with the supported computing device 1107 directly (either through the edge node or outside of the edge node).

According to some aspects of the technology, the Web service layer host 1103 may send additional data to the supported computing device 1107 or another associated device based upon the identification information. For example, the network configuration 1100 includes a display monitor 1111 located near the multifunction device 1107B. If the multifunction device 1107B and the display monitor 1111 are located at a retail location, they can be used to provide coupon or other sales-related information to the user of the mobile computing device 1105. Thus, if the identification information identifies the user as being a person with a purchase history at that retail location, then a service application at the Web service layer host 1103 (or at another related location) may generate or otherwise identify advertisement information relevant to the user's purchase history. The Web service layer host 1103 may then select the advertisement information for display to the user. For example, the Web service layer host 1103 may transmit generated advertisement information to the display monitor 1111 for display via the edge node 1109.

If the advertisement information includes a coupon, the user may then use the multifunction device 1107B to print the coupon. With various implementations of the technology, the user may print the coupon (or otherwise act upon the advertisement information) by interacting with display monitor 1111, the multifunction device 1107B, mobile computing device 1105, or some combination thereof. With some implementations of the technology, the Web service layer host 1103 may employ the visual displays of two or more of the display monitor 1111, the multifunction device 1107B, and the mobile computing device 1105 together to convey information to the user or to otherwise perform some function. Similarly, general advertisement information may be stored and displayed by the mobile computing device 1105 even before the identification information is sent, and subsequently updated and/or further displayed on the display monitor 1111 or on a display of the multifunction device 1107B in response to the Web service layer host 1103 receiving the identification information.

Still further, various implementations of the technology may employ a variety of devices to perform a function. For example, the network configuration 1100 may support the use of a greeting card generation application. The purchase of a greeting card may be presented to a user on the display monitor 1111 in response to the Web service layer host 1103 receiving the identification information. The user may then purchase the card, format the card, take a photograph to add to the card, and sign the card using the mobile computing device 1105. Finally, the user may then print the card using the multifunction device 1107B. With some aspects of the technology, the mobile computing device 1105 may employ the processing resources of the supported computing device 1107, an edge node host 1109, or some combination of both. Thus, with this example, the mobile computing device 1105 may convey a photograph to the multifunction device 1107B through the Web service layer host 1103. For formatting the card, however, the mobile computing device 1105 may communicate directly with the edge node host 1109, and may further use processing power available from the edge node host 1109 to format the card prior to printing by the multifunction device 1107B.

With still other implementations of the technology, the recognition application may store identification information for previously recognized supported computing devices 1107, or alternately or additionally allow a user to remotely obtain identification information for supported computing devices 1107. With these embodiments, a user may employ various aspect of the technology to remotely employ supported computing devices 1107.

9.2 Distributing the Processing of Managed Peripherals on the Internet

Our day-to-day environment is surrounded by electronic devices that offer various targeted services to the end users. However, the traditional internet client/server model does not allow real time, low-latency interactions with such managed devices/peripheral since the transaction has to be carried out between a web client and an internet application server with an unknown number of internet servers in between, introducing latency patterns not compatible with real-time device/peripheral interfaces.

Embodiments of the disclosed technology address this problem by using an edge node on the device/peripheral premises in order to enable a low latency, real-time capable "inner loop" between the managed devices/peripherals and the end user client side of the application. This "inner loop" operates in conjunction with the traditional internet "outer loop".

Figure 12:
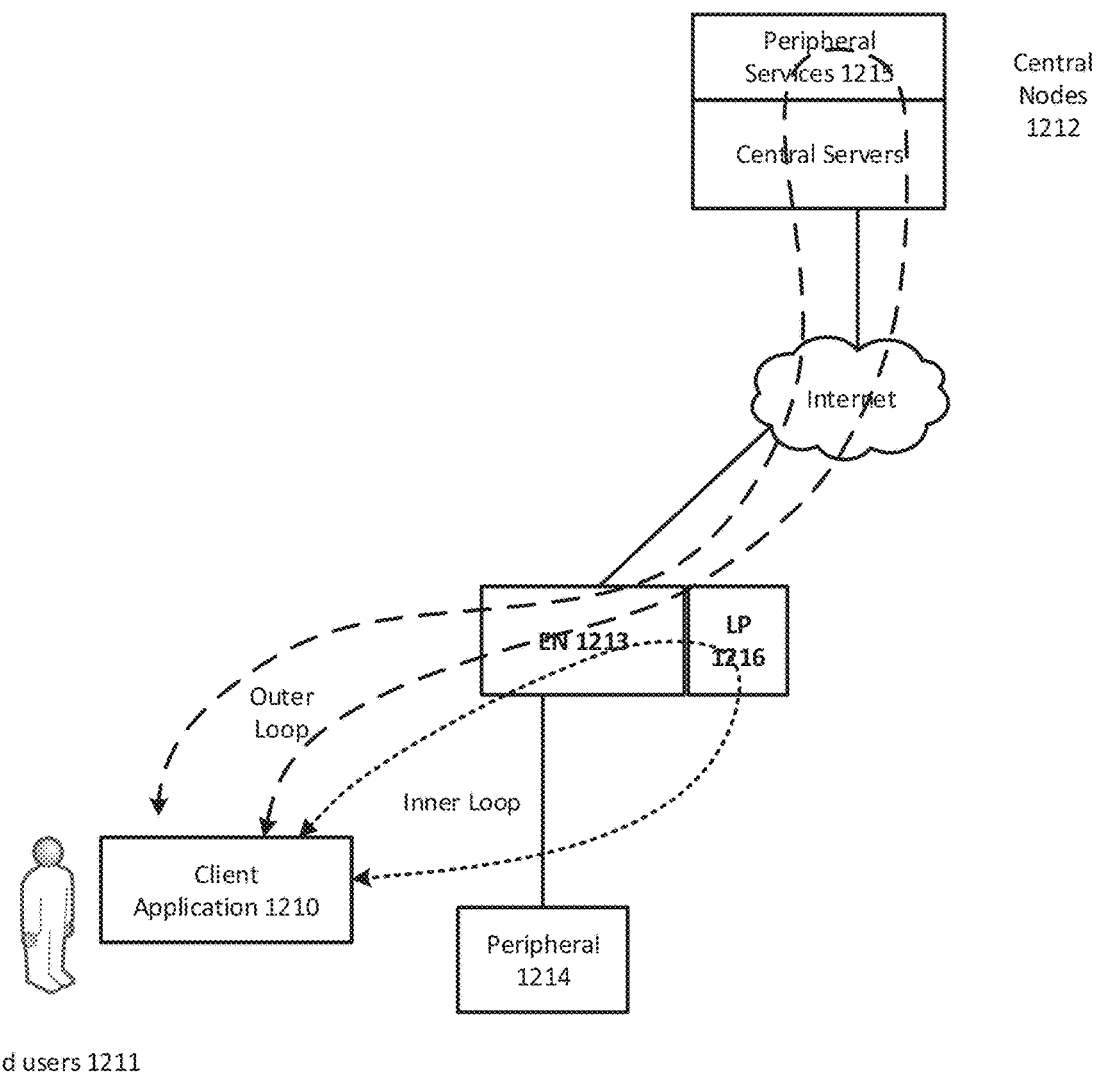
FIG. 12 is a schematic block diagram that illustrates an example of a real-time inner loop for managed peripherals.

FIG. 12 is a schematic block diagram that illustrates an example of a real-time inner loop for managed peripherals. In FIG. 12, edge node 1213 is hosting a local process 1216 in charge of the real-time, low-latency part of the transaction that is taking place between a client application 1210 and a device/peripheral 1214 over the outer loop. The local process 1216 is actually a part of the device/peripheral service 1215 the client 1210 has invoked. The introduction of this inner loop in the device/peripheral service path allows complex, real time transactions to take place over the control of a web interface.

In the illustrated embodiment, the edge node 1213 is equipped with a WiFi transceiver to enable direct communication with the client application 1210, which will typically be running on a mobile device such as a smartphone or tablet. By creating and using this direct connection, the "outer loop" invoking the internet can be avoided and low-latency processing in the "inner loop" between the edge node and the client application 1210 can be facilitated. In this way, processing for the client application 1210 can be distributed between the edge node and the central node.

One example embodiment for implementing the distributed processing of peripherals over the internet comprises: one or more central servers; and one or more edge nodes in communication with the one or more central servers via the internet, each of the one or more edge nodes comprising an edge node processor for executing edge node software services and a wireless transceiver, each of the one or more edge nodes being further coupled to and configured to control one or more peripheral devices, wherein a respective one of the edge nodes is configured to provide processing support to an application executing on a mobile device via a direct connection to the respective edge node through the wireless transceiver, thereby avoiding transactions using the internet, wherein the application executing on the mobile device interfaces with the one or more peripheral devices coupled to the respective edge node and uses the direct connection for transactions with the one or more peripheral devices. The transactions that are through the direct connection between the respective one of the edge nodes and the one or more peripheral devices can be substantially in real-time and not delayed by internet processing. The one or more central servers can also configured to communicate with the application executing on the mobile device and provide additional processing support to the application, the additional processing support being for processes that do not require real-time transactions with the one or more peripheral devices. The one or more peripheral devices can be non-internet-enabled electronic peripheral devices. The one or more central servers can also be configured to communicate with the application executing on the mobile device, and can be further configured to receive a request from the mobile device to use the one or more peripheral devices connected to the respective node and to transmit data indicative of the request to the respective edge node in order to facilitate the establishment of the direct connection between the mobile device and the respective edge node.

9.3 Managing Clusters of Heterogenous Peripherals on the Internet

In certain embodiments of the disclosed technology, devices and peripherals (e.g., TVs, printers, credit-card readers, etc.) are grouped into clusters that share a common higher-level purpose. Internet services for these clusters can then be published or otherwise made available for connected client applications. For example, the internet services can terminate on either a single device/peripheral cluster node, or a group of cluster nodes, hence abstracting the cluster into multi-form macro devices/peripherals. Notably, it is not necessary for one or more of the devices and peripherals of a given cluster to have networking capabilities, as the cluster arrangement aggregates heterogeneous devices and peripherals ranging from simple sensors to complex embedded devices and makes them accessible and controllable through the internet via an edge node.

Figure 13:
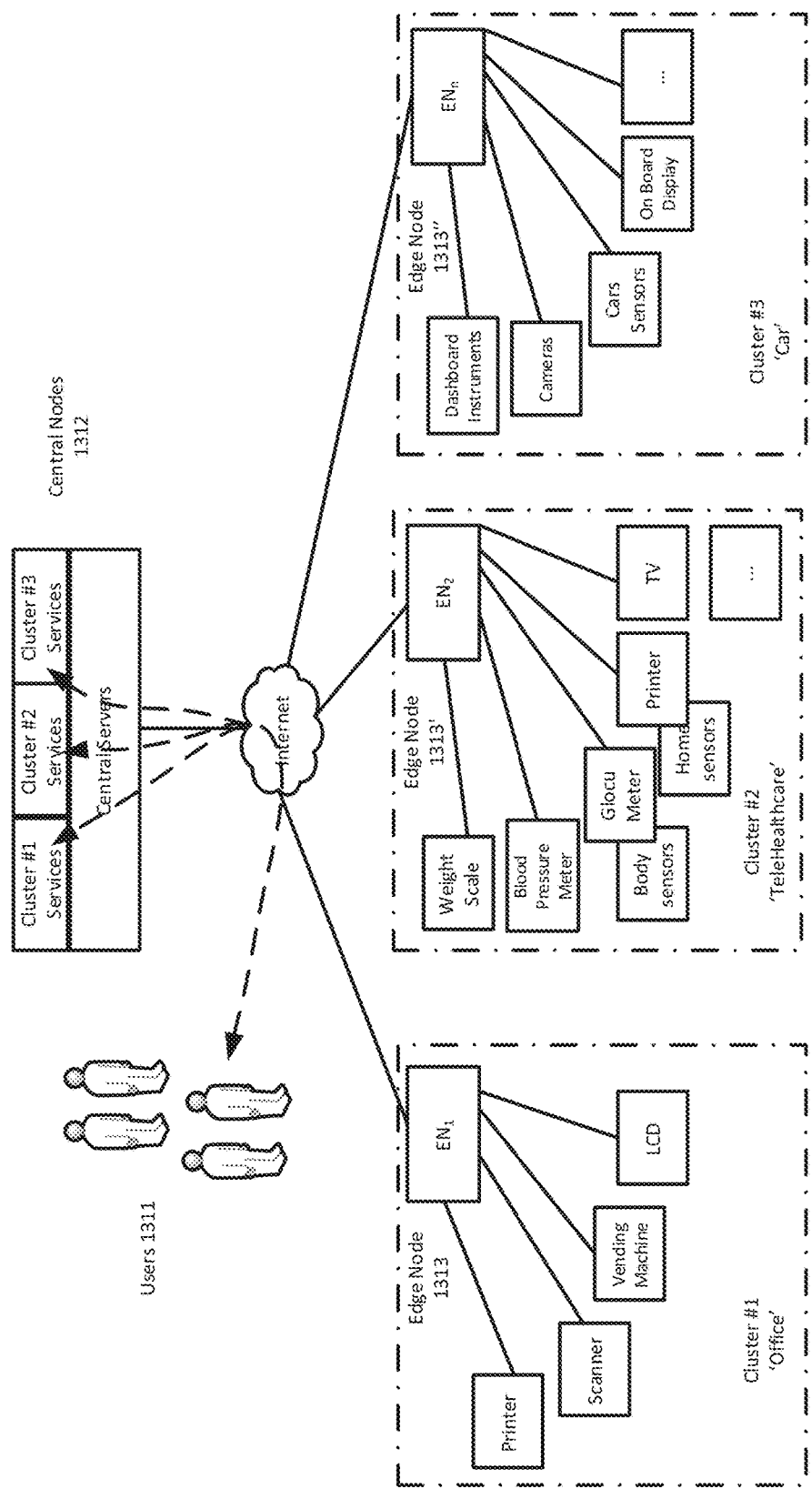
FIG. 13 is a schematic block diagram illustrating an example arrangement by which clusters of devices and peripherals are exposed on the internet.

FIG. 13 is a schematic block diagram illustrating an example arrangement by which clusters of devices and peripherals are exposed on the internet. In FIG. 13, a series of edge nodes 1313, 1313', 1313" are each used to aggregate a set of devices and peripherals onto a consistent cluster. These edge nodes are connected to a central server 1312 over the internet. The example shown in FIG. 13 shows three examples of device/peripheral clusters: office, telehealthcare, or car. These particular clusters are for illustrative purposes only. Additional or alternative clusters may be included in the arrangement and adapted for any desired purpose or functionality. In the illustrated embodiment, the central server exposes/publishes internet versions of the cluster services. Published services are terminating either on a single device/peripheral cluster node or on a group of nodes.

In FIG. 13, the cluster services are integrated into one or more connected applications, which can be accessed and used by users 1311. In particular implementations, the applications can render on any web client, mobile or not. Central nodes 1312 can also route a service request to the proper edge node and log the activity for reconciliation and billing. In addition, the central nodes 1312 can accumulate utilization and profile information that feeds a large database used to provide fine grain data services pertaining to the device/peripheral cluster utilization and users.

Figure 18:
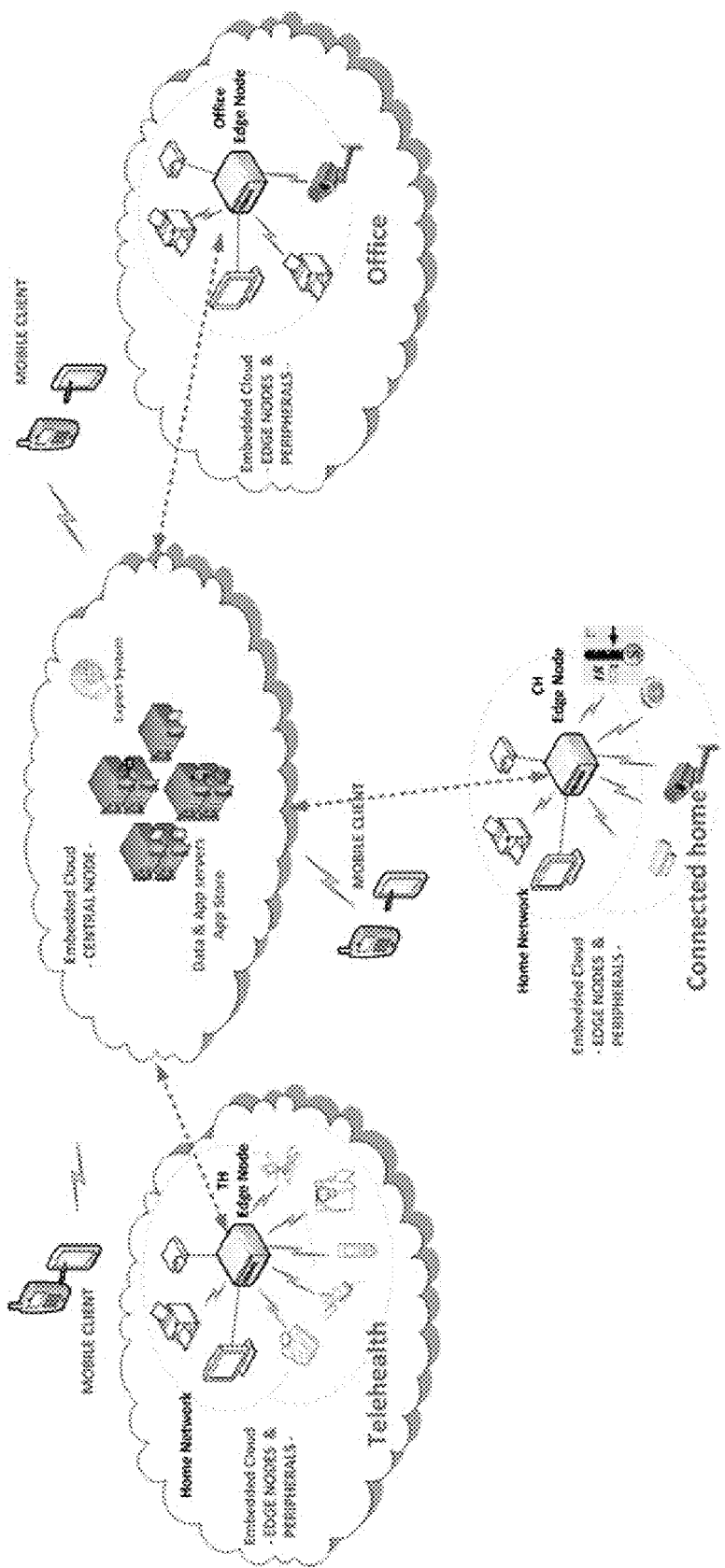
FIG. 18 illustrates another example of a system according to the disclosed technology in which heterogenous clusters of peripherals are connected via a central node.

FIG. 18, for example, illustrates another example of a system according to the disclosed technology in which heterogeneous clusters of peripherals are connected via a central node. The example shown in FIG. 18 shows three examples of device/peripheral clusters: office, telehealthcare, and connected home.

The edge nodes of any of the disclosed embodiments can also have additional features or capabilities, such as one or more of the following:

Co-existence of multiple radio interfaces and protocols in a single embedded device. In particular, the edge node can seamlessly operate heterogeneous wireless sensor/actuator devices.

Application partitioning between central processing and edge-node processing. In particular, and as noted in the previous section, low latency, real-time interactions between end-user and edge node, together with keeping a centralized control over managed web APIs can be performed and optimized. This can involve the introduction and management of macro commands, short session and transaction management, and appropriate software infrastructure on the edge nodes.

Distributed computing using edge node servers. A full deployment of such an embedded cloud infrastructure implies hundreds of thousands of edge nodes with a very 'bursty' utilization. The dormant tera Hz and tera bytes of processing power and storage can be utilized in view to balance the load between the central and edge nodes.

Virtualization & Domain isolation. Edge nodes are typically driving heterogeneous devices that may not all be supported by the same operating system. The system can use multi OS support on the edge node. In addition, it can isolate data and processing for security and confidentiality reasons. Domain isolation mechanisms can be used in some cases.

Portable Edge Nodes. Edge nodes can be operated in a portable manner in some use cases (e.g., they can be detached temporarily from a base station). In this situation, the detached agent/portable unit can be battery operated and be capable of one or more of power optimization, temporary local data storage and data reconciliation.

Adaptive Edge Nodes. The edge node can be configured to discover and connect to large number of peripherals automatically and dynamically. The solution is then able to cope with dynamic/evolving peripheral topologies. As part of this dynamic behavior, the edge node can (i) install/uninstall needed drivers, handle terminal software, (ii) recovery schemes and redundancy: use one peripheral instead of another, distribute load on equivalent peripherals, and/or (iii) route requests to different edge nodes if applicable.

9.4 Publishing and Managing On-Premises Peripherals Over the Internet

Our day-to-day environment is surrounded by electronic devices and equipment that offer various targeted services to the end users. These services are accessible over various interfaces, such as infrared remote command, serial cable, short range radio interface, Ethernet, and the like. Embodiments of the disclosed technology comprise an arrangement that creates an additional, centralized interface to access any such device/peripheral from the internet. The publication of these device/peripheral services on a managed internet server enables connected applications to access a large range of devices/peripherals on various premises.

Figure 14:
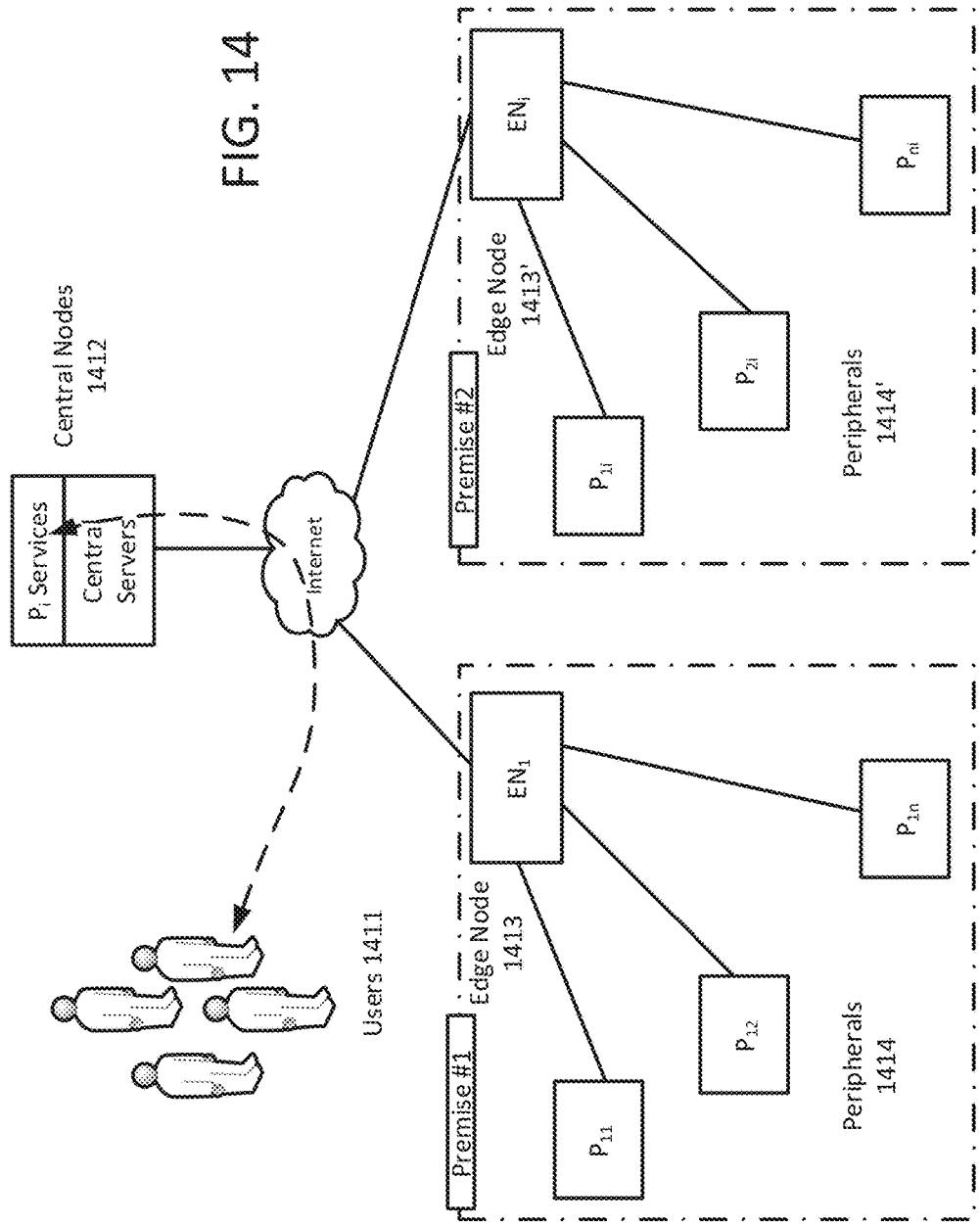
FIG. 14 is a schematic block diagram illustrating an edge node arrangement configured to expose peripheral services on the internet.

FIG. 14 is a schematic block diagram illustrating an edge node arrangement configured to expose peripheral services on the internet. In FIG. 14, a series of edge nodes 1413, 1413' are deployed at two different premises: premise #1 and premise #2. These edge nodes are used to integrate the various devices/peripherals (e.g., $P_{ij}$), drivers, and handlers (collectively shown as peripherals 1414, 1414'). In addition these edge nodes are connected to a central server 1412 over the internet. The central server 1412 exposes/publishes internet versions of the various device/peripheral services.

In the illustrated embodiment, the published services are integrated into one or more connected applications, which can be accessed and used by users 1411. Such connected applications can render on any web client, mobile or not. The central nodes 1412 can help ensure that the service request is routed to the proper edge node and log the activity for reconciliation and billing.

One example embodiment for managing clusters of heterogeneous electronic peripherals on the internet and/or publishing and managing on-premises peripherals over the internet, comprises: one or more central servers; and one or more edge nodes in communication with the one or more central servers via the internet, each of the one or more edge nodes comprising an edge node processor for executing edge node software services, each of the one or more edge nodes being further coupled to and configured to control one or more peripheral devices, the one or more peripheral devices being non-internet-enabled peripheral devices, wherein the one or more central servers are configured to provide services over the internet to a mobile device, the services including an application that can be installed on the mobile device and that provides access to each of the one or more edge nodes and their associated peripheral devices, thereby providing internet access to non-internet-enabled peripheral devices. The one or more edge nodes can comprise a first edge node coupled two or more heterogeneous peripheral devices. For instance, the two or more heterogeneous peripheral devices can have heterogeneous operating systems, heterogeneous drivers, or heterogeneous APIs. The services can include a first application that can be installed on the mobile device providing access to a first set of multiple edge nodes and a second application that can be installed on the mobile device providing access to a second set of multiple edge nodes different from the first set. In certain implementations, each edge node in the first set of multiple edge nodes can be coupled to a first combination of peripheral device types, and each edge node in the second set of multiple edge nodes can be coupled to a second combination of peripheral device types different from the first combination of peripheral device types.

9.5 Mobile User Interface for Heterogeneous Cluster of Devices

In certain embodiments of the disclosed technology, a heterogeneous set of devices is grouped into a connected cluster to deliver services that leverage the different capabilities of each device. The existing user interface of each device in the cluster can vary dramatically from: none (e.g., a temperature sensor) to very simple (e.g., a 7-segment display) to more elaborated interfaces (e.g., an LCD or touch screen interface). Embodiments of the disclosed technology provide a unified user interface for controlling and using a heterogeneous cluster of devices. The unified user interface can be rendered onto the end user's personal mobile device.

This user interface can provide any one or more of the following advantages: (i) devices without display or with rudimentary user interface can interact with the end user via modern, high resolution screens with touch panels used in now ubiquitous smartphones and tablets; (ii) the user interface deals with the cluster of devices in a unified manner, guiding the user in his individual device interactions in a service-centric manner, as opposed to a traditional, device-centric user set of interfaces; (iii) the end user experience can be improved by using the typical set of peripherals on board smart phones and tablets (e.g., camera, microphone, virtual or real keyboard, NFC tags, RFID reader, and/or other such peripherals).

Figure 15:
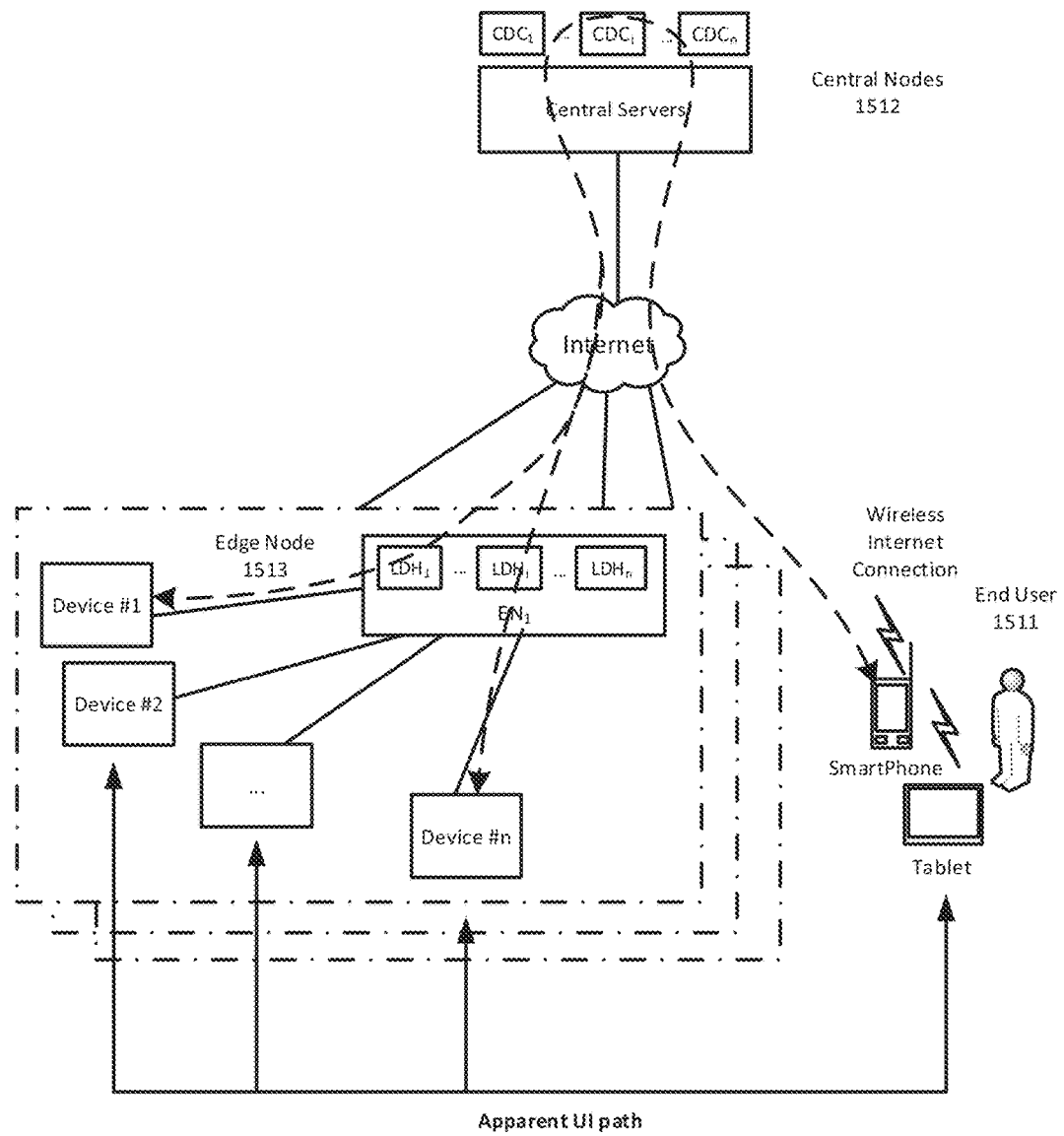
FIG. 15 is a schematic block diagram illustrating an example arrangement for how a unified UI can be used with a connected cluster of heterogeneous devices.

FIG. 15 is a schematic block diagram illustrating an example arrangement for how a unified UI can be used with a connected cluster of heterogeneous devices. In FIG. 15, a series of one or more edge nodes 1513 are used to aggregate a set of peripheral onto a cluster. These edge nodes 1513 are connected to a central server 1512 over the internet. In the illustrated example embodiment, the edge nodes 1513 embed Local Device Handlers (LDH) that expose Central Device Controllers (CDC) hosted on an internet server. In particular implementations, there is one set of CDC services for one set of LDH services, though other arrangements are possible. In the illustrated example embodiment, the end user mobile device (smartphone or tablet) is connected to the internet either via a cellular data connection or a WiFi access point on the local premises. The end user mobile client connects to a web application (e.g., a downloadable application or web-based application), which then provides a user interface. The user interface invokes the CDC service(s) to interact with the devices, based on the end user inputs originated from the mobile device. In this way, a single unified user interface can be used to interact with two or more heterogeneous devices, which may themselves have little or no user interface capability.

One example embodiment for a mobile user interface for a heterogeneous cluster of devices comprises: one or more central servers; and one or more edge nodes in communication with the one or more central servers via the internet, each of the one or more edge nodes comprising an edge node processor for executing edge node software services, each of the one or more edge nodes being further coupled to and configured to control two or more peripheral devices, wherein the one or more central servers are configured to provide services over the internet to a mobile device, the services including a web-based or downloadable application that can be accessed by the mobile device and that provides a single unified user interface on the mobile device operative to control the two or more peripheral devices. The two or more peripheral devices can be non-internet-enabled electronic peripheral devices. The two or more peripheral devices can be heterogeneous peripheral devices. In some implementations, at least one of the peripheral devices has no separate user interface. In certain implementations, the single unified user interface comprises a user interface rendered on a touchscreen of the mobile device that includes a first set of one or more user-selectable regions for controlling a first peripheral and a second set of one or more user-selectable regions for controlling a second peripheral. In this implementation, the first set and second set of user-selectable regions are simultaneously displayed to the user via the single unified user interface. The application can be a first application, and the one or more central servers can be configured to provide a second application that can be accessed by the mobile device and that provides a single unified user interface on the mobile device operative to control a different set of two or more peripheral devices controlled by a different edge node.

9.6 Print to TV Under Your Mobile Device Control

A variety of specialized devices exist on our day-to-day environment. These specialized devices carry out specific functions, are usually costly, require physical connections, and have interoperability challenges. Mobile-based technology is forecasted to slowly and quietly replace the need for specialized equipment along with connectivity hassles that they bring.

Embodiments of the disclosed technology can be used to connect a user's mobile device to a specialized device in a unique manner. In particular, exemplary arrangements of the disclosed technology allow a user to print artifacts or other materials from mobile devices to TV screens that are registered in an embedded cloud. Embodiments of the disclosed technology can also facilitate the user to control the screen display remotely via the mobile device. These embodiments can be used to eliminate the need for specialized devices and physical connections that were previously necessary to connect a mobile device user to such devices.

Embodiments of the disclosed technology can provide any one or more of the following advantages: (i) allowing the user to display mobile device artifacts on the fly; (ii) eliminating the need for physical connections and interfaces; (iii) eliminating the need for specialized equipment, and thereby allowing the user to access services using only their mobile device and internet access; (iv) improving the user experience as the user currently only needs to access a mobile device application to spool his mobile device artifact to a screen that is registered on the cloud; (v) allowing the mobile device to be used to edit the artifact using the touch panel/stylus of the mobile equipment; (vi) allowing edits to be committed to the original document; and/or (vii) allowing mobile equipment to control the display of the document, such as the number of pages, magnification, etc.

Figure 16:
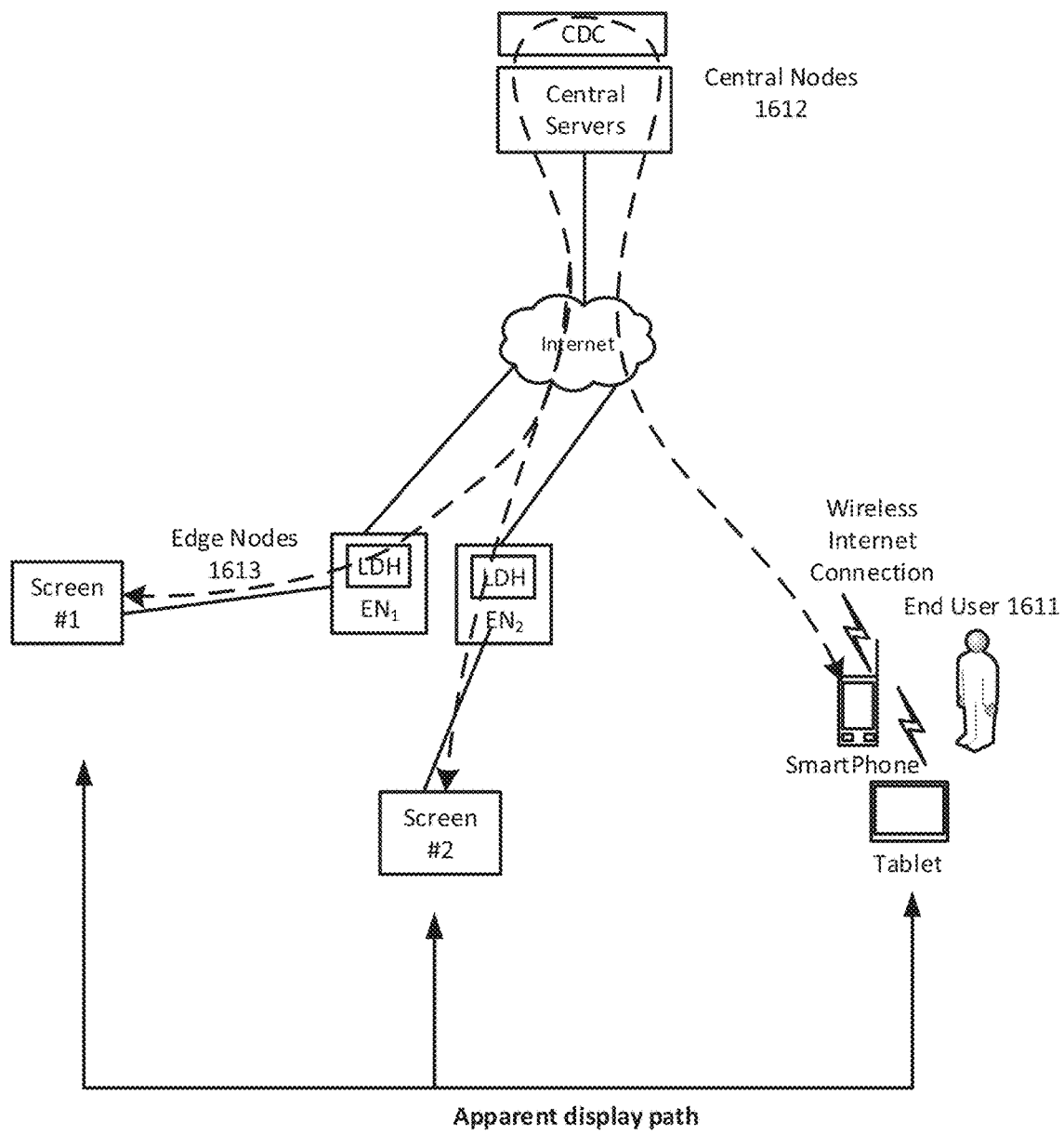
FIG. 16 is a schematic block diagram illustrating an exemplary arrangement of the disclosed technology that allows a mobile device to be mirrored on a TV screen screen over the internet.

FIG. 16 is a schematic block diagram illustrating an exemplary arrangement of the disclosed technology that allows a mobile device to be mirrored on a TV screen screen over the internet. In the illustrated embodiment, edge nodes 1613 are used to connect TV screens to a central server 1612 over the internet. The edge nodes 1613 embed Local Device Handlers (LDH) that expose Central Device Controllers (CDC) hosted on an internet server. The end user mobile device (smartphone or tablet) is connected to the internet either via a cellular data connection or a WiFi access point on the local premises. The end user mobile client connects to a web application. The user interface of this web application invokes the CDC service to interact with the identified TV screen, based on the end user inputs originated from the mobile device. For example, the user interface on the user's mobile device can include the option to "print to screen", whereby a document stored on the cloud (or sent to the cloud from the mobile device) can be rendered by the cloud server and then displayed on the screen (e.g. because the TV has a video input coupled directly to the edge node). In some implementations, the document or files is rendered by the edge node itself. Similarly, and using the edge node, the user interface on the user's device can have a "mobile-screen to TV-screen link" operation or a "white board" operation for displaying the screen on the mobile device on the TV screen.

Other operations that can also be implemented include a security services using a camera (e.g., a camera installed on or used with the TV) or room energy-saving features (e.g., cooling, lighting, etc.).

Figure 62:
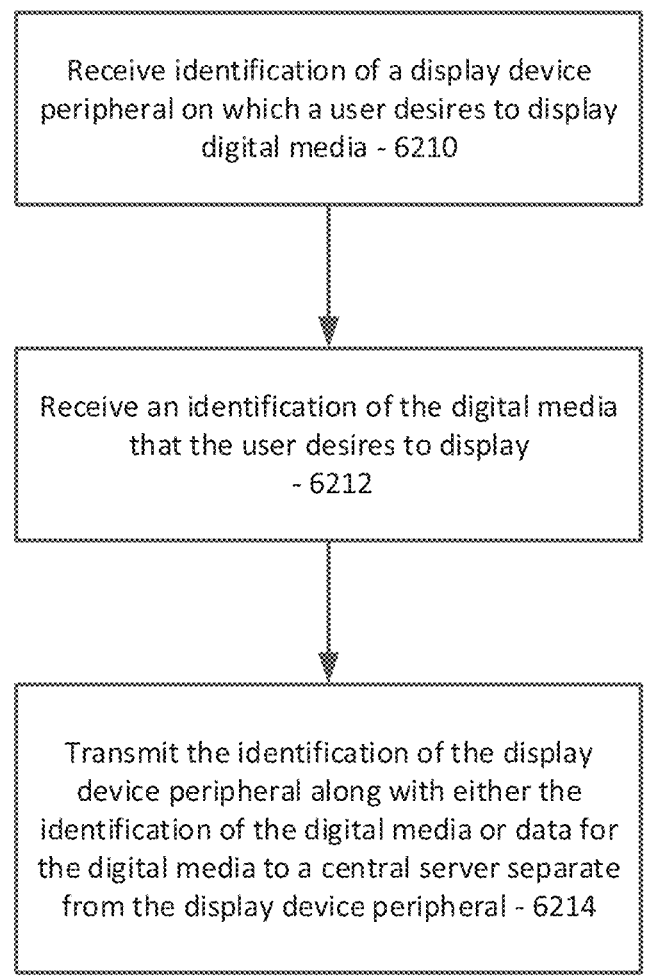
FIG. 62 is a flowchart illustrating method acts performed by an application executed on a user's mobile device for implementing an exemplary print-to-TV flow using a cloud service platform.
Figure 63:
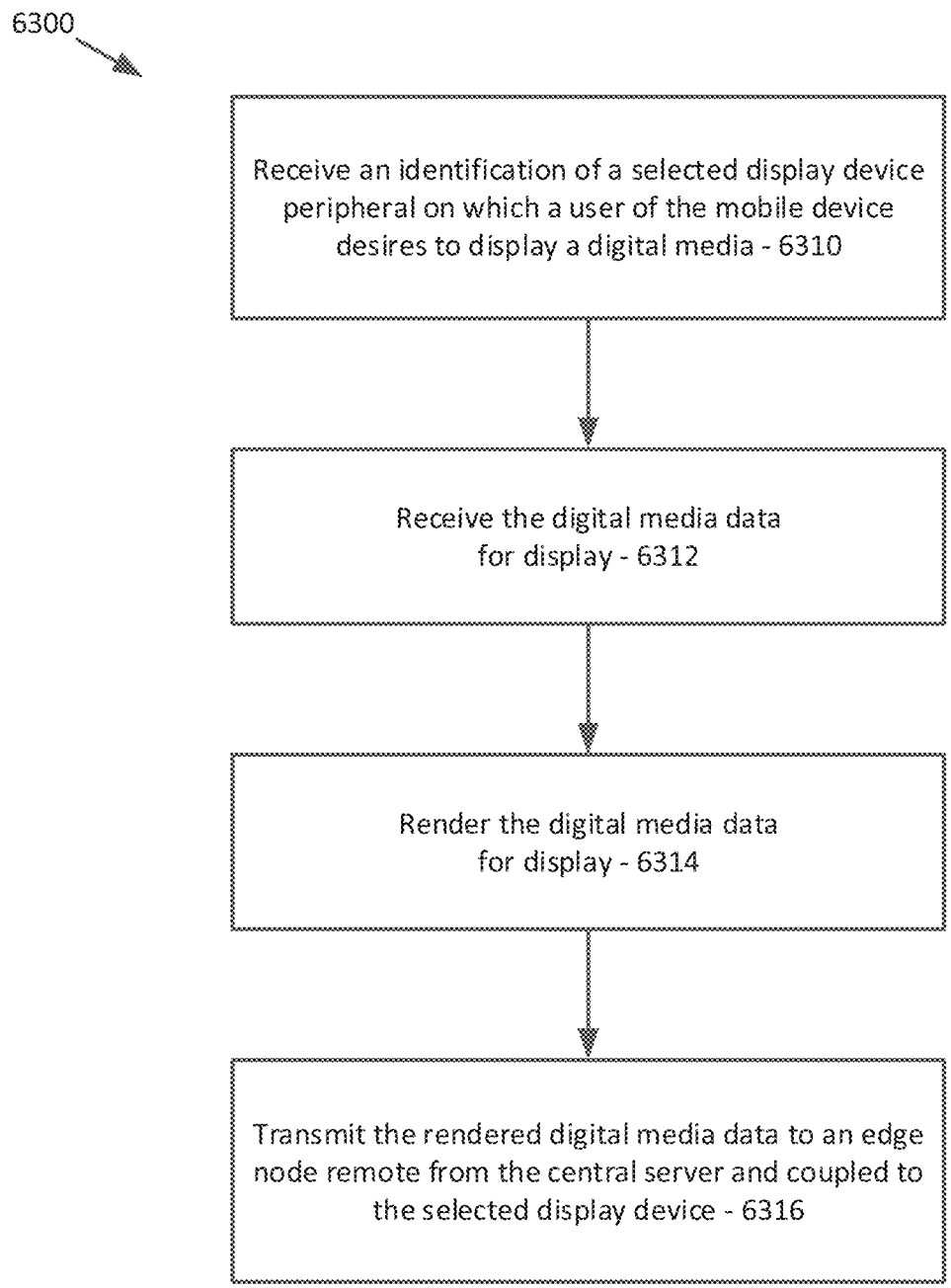
FIG. 63 is a flowchart illustrating method acts performed by a central server for implementing an exemplary print-to-TV flow using a cloud service platform.

FIG. 62 is a flowchart 6200 illustrating method acts performed by an application executed on a user's mobile device for implementing an exemplary print-to-TV flow using a cloud service platform. FIG. 63 is a flowchart 6300 illustrating method acts performed by a central server for implementing an exemplary print-to-TV flow using a cloud service platform. The illustrated method acts are not to be construed as limiting, as they can be used alone or in any combination or subcombination with one another or with other methods.

At 6210, an identification of a display device on which a user desires to display digital media is received (e.g., input, buffered, or otherwise prepared for further processing). In some embodiments, the receiving can comprise performing a scanning operation of a machine-readable code associated with the display device (e.g., a tag with a QR code on or near the display device) or performing a near-field communication (NFC) scanning operation on a NFC tag associated with the display device (e.g., an NFC tag on or near the display device). In other embodiments, a Bluetooth, RFID, or other wireless connection can be established with display device, thereby providing the display device identification to the mobile device. Still further, the display device may have an identification number displayed on it that the user can input manually via the application on the mobile device. The display device identification can be an identification number assigned to the display device or some other form of unique identifier (e.g., a UUID, MAC address, or other such identification means).

At 6212, an identification of the digital media that the user desires to display is received. The digital media can be any suitable data file for display, such as a Word document, Power Point presentation, PDF, image data (e.g., JPEG), video data (e.g., MPEG, h.264, HEVC, or other such video file), or other such displayable media file.

At 6214, the identification of the display device along with either the identification of the digital media or data for the digital media is wirelessly transmitted to a central server separate from the display device.

In some embodiments, user-selected display parameters affecting how the digital media will be displayed are received by an application on the mobile device. The display parameters can include, for example, rotation, cropping, zooming field, color, resolution, and/or other such display parameters. The identified display parameters can then be transmit to the central server.

In some embodiments, the identification of the document received comprises an indication of digital media stored on a cloud storage provider. In such instances, the digital media can be retrieved from the cloud storage provider for display (e.g., using previously stored user credentials or using credentials that the user inputs as part of this particular print-to-TV request).

Turning to FIG. 63, at 6310, an identification of a selected display device on which a user of the mobile device desires to display a digital media is received from a mobile device. As noted, in some instance, the identification of the video monitor on which the user desires to display digital is generated by the user using the mobile device to perform a scanning operation of a machine-readable code associated with the display device or to perform a near-field communication (NFC) scanning operation on a NFC tag associated with the display device.

At 6312, the digital media data for display is received. For example, an identification of the digital media data can be received by the mobile device, wherein the identification indicates that the digital media data is stored on a cloud storage provider. In such instances, the act of receiving the digital media data can comprise retrieving the digital media data from the cloud storage provider. In other examples, the digital media data itself is received directly from the mobile device.

At 6314, the digital media data for display is rendered. For instance, the digital media data can be converted (e.g., decompressed according to a codec and rendered) into a format suitable for display on the display device.

At 6316, the rendered digital media data is transmitted to an edge node remote from the central server and coupled to the selected display device.

In some embodiments, a user selection of display parameters affecting how the digital media will be displayed is also received and the rendering is performed in accordance with the display parameters. In certain embodiments, the edge node is separate from the video monitor and is configured to provide a video signal to the video monitor that is compatible with the video monitor. In further embodiments, as the digital media data is being displayed, a request from the user for modifications to the digital media data can be received, a modified version of the digital media data can be rendered based on the received request, and the rendered modified version of the digital media data is transmitted to the edge node. For instance, the request from the user for modifications to the digital media data can indicate that a different page of a document is to be displayed or a different slide of a presentation, or can indicate new material to be added to the digital media data and displayed (e.g., edits to a document or additional mark-ups to a displayed image using a "whiteboard" feature).

9.7 Delivering Localized and Profiled Commercial Content on Paper Media

Certain embodiments of the disclosed technology comprise a distributed print service that delivers localized and profiled commercial content to end users, in addition to the requested printout. The additional commercial content (e.g., an advertisement or coupon) can come in the form on an extra page preceding or succeeding the actual printout payload or merged with the payload (e.g., top of page, bottom of page, overlay, watermark, etc.). In some implementations, a cloud-hosted distributed print service also implements localized advertisement services that correlates location-based information with end user profile data and other contextual information or analytics in order to deliver highly profiled and targeted commercial content to the print service user, in addition to his/her requested printout.

Certain implementations leverage the existence of on-premises edge nodes that are part of the cloud infrastructure of the print service. The edge nodes and print service infrastructure can be any of the configurations or arrangements disclosed herein. For example, and referring to the schematic block diagram of FIG. 17, the fact that the edge nodes 1713, 1713', 1713" are managed by the service infrastructure allows one or more of the following to be factored in and used to determine what commercial content to deliver: (i) actual location of the end user, without needing any assistance from a GPS or positioning device (because the edge nodes are on known premises); (ii) proximity of commercial operations/businesses being advertised; (iii) actual profile of the end user, provided from his/her print service account information; (iv) additional contextual information that can be gathered from previous uses by the end user or at the edge node (analytics); and/or (v) additional contextual information gathered from additional on-premises peripherals controlled by the same infrastructure and edge node (e.g. a camera for facial recognition).

The fact that the edge nodes 1713, 1713', 1713" are on premises allows the commercial content to be readily available on premises, which is desirable for fast delivery of high quality/high resolution commercial content. In particular implementations, the edge nodes will store locally the commercial contents in local cache storage which is updated outside of the print transaction time.

By delivering commercial content, in addition to the end user requested printout, embodiments of the disclosed technology can: (i) offset the cost of the service, making it more affordable for endusers; (ii) introduce additional services to the end use; and/or (iii) create innovative business collaboration between service operator, advertisement company, and local (to the edge node) businesses.

Figure 17:
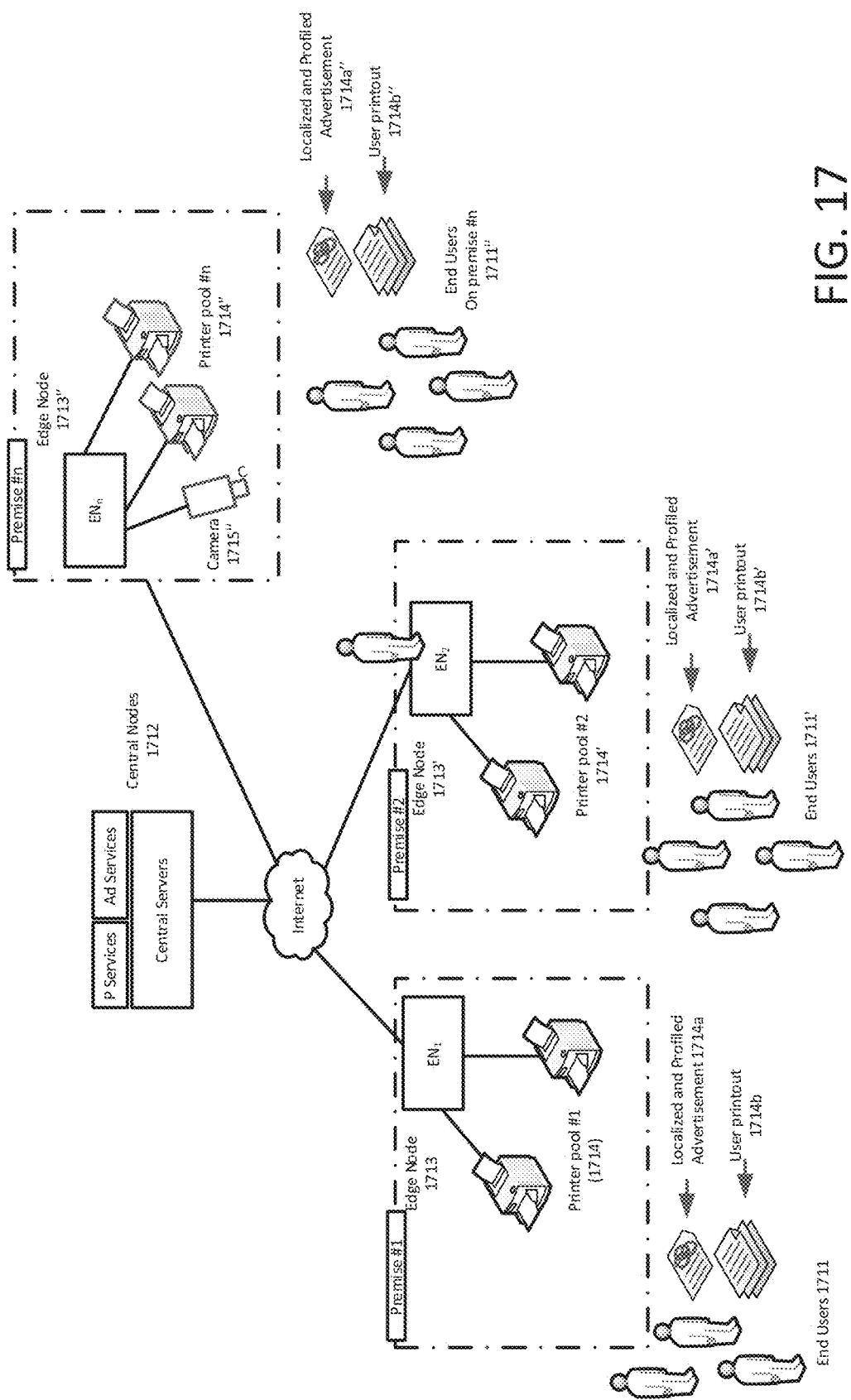
FIG. 17 is a schematic block diagram illustrating an exemplary arrangement of the disclosed technology for publishing targeted commercial content.

FIG. 17 is a schematic block diagram illustrating an exemplary arrangement for providing profiled commercial content on a cloud-based printer infrastructure. In particular, FIG. 17 illustrates an arrangement for delivering localized and profiled commercial content together with the end user printout.

One example embodiment for delivering localized and profiled commercial content on paper media according to the disclosed technology is a system, comprising: one or more central servers; and one or more edge nodes in communication with the one or more central servers via the internet, each of the one or more edge nodes comprising an edge node processor for executing edge node software services, each of the one or more edge nodes being further coupled to and configured to control one or more peripheral devices, a respective one of the edge nodes being coupled to and configured to control a printer, wherein the one or more central servers are configured to provide services over the internet to a mobile device, the services including an application that can be installed on or accessed by the mobile device and that facilitates a transaction with a user of the mobile device that causes a document to be printed at the printer controlled by the respective one of the edge nodes, wherein the one or more central servers are further configured to select commercial material targeted for the user and to cause the targeted commercial material to be printed at the printer with the document. The commercial material can comprise a coupon or advertisement. The one or more central servers can be configured to select the commercial material based on a known and previously stored location of the printer. The commercial material can comprise a coupon or advertisement for a business and the one or more central servers can be configured to select the commercial material by identifying one or more businesses that are in a geographic range of the printer and selecting the commercial material for one or more of the business identified as being within the geographic range. The one or more central servers can be configured to select the commercial material based on profile data for the user stored with the one or more central servers. The one or more central servers can be configured to select the commercial material based on analytics generated using transaction data from previous transaction between the user and the one or more central servers. The one or more central servers can be configured to select the commercial material based on information gathered from an additional peripheral device coupled to and controlled by the respective one of the edge nodes. In this implementation, the additional peripheral device can be a camera configured to capture an image of the user, and the one or more central servers can be configured to perform a facial recognition process on the image and to select the commercial material based on the facial recognition data.

9.8 Example Cloud Service Printing Solution

In certain example embodiments of the cloud services platform, the platform is used to provide printing services at various locations by allowing users to identify a local printer using their mobile device (e.g., a smartphone), upload document data and print identification data to the cloud-based server, and receive a printed copy of the document at the identified printer. Further, in some embodiments, the cloud-based central server can perform file manipulation and/or file conversion.

Figure 19:
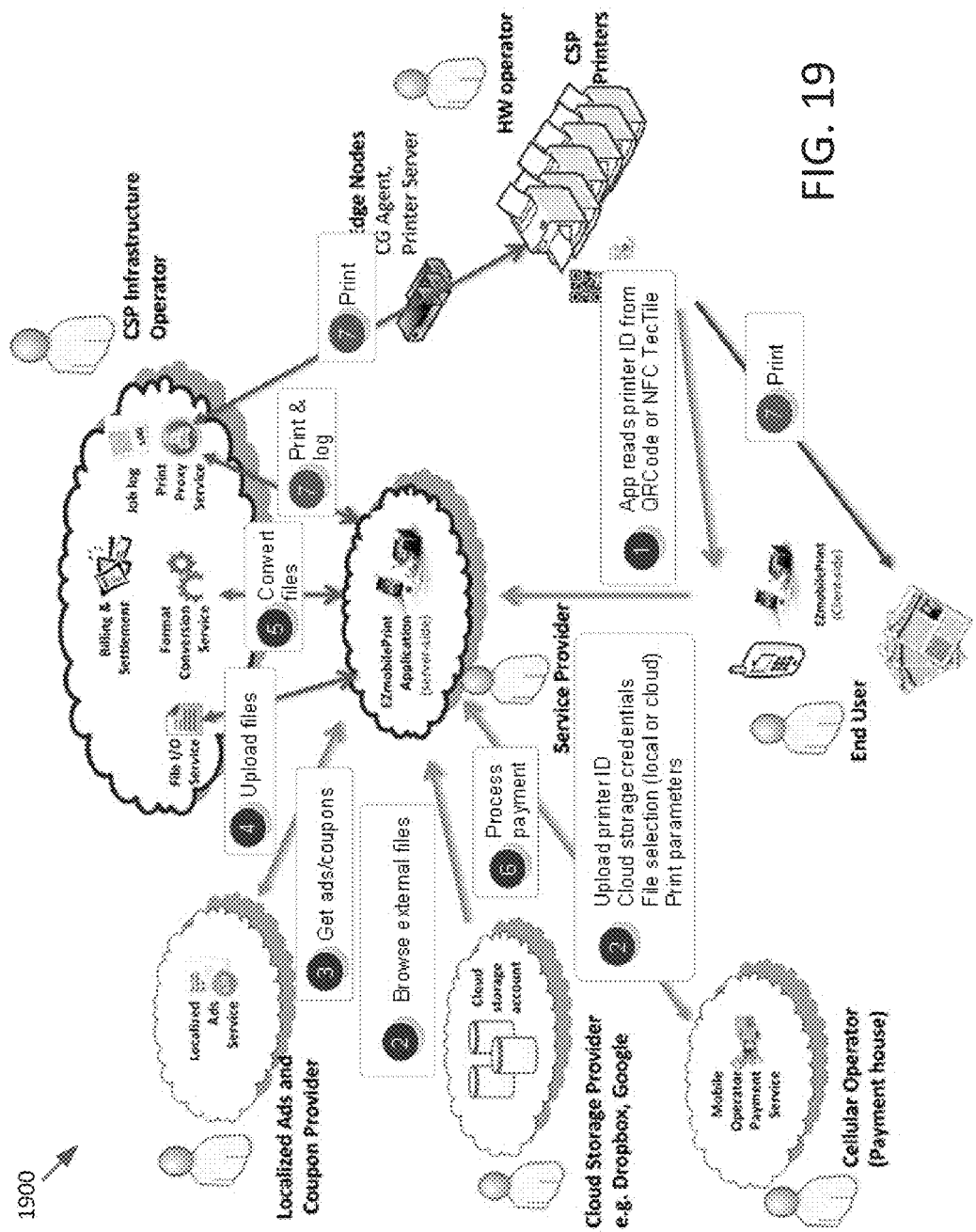
FIG. 19 is a block diagram illustrating various components of an example printing solution and method acts that can be performed.
Figure 20:
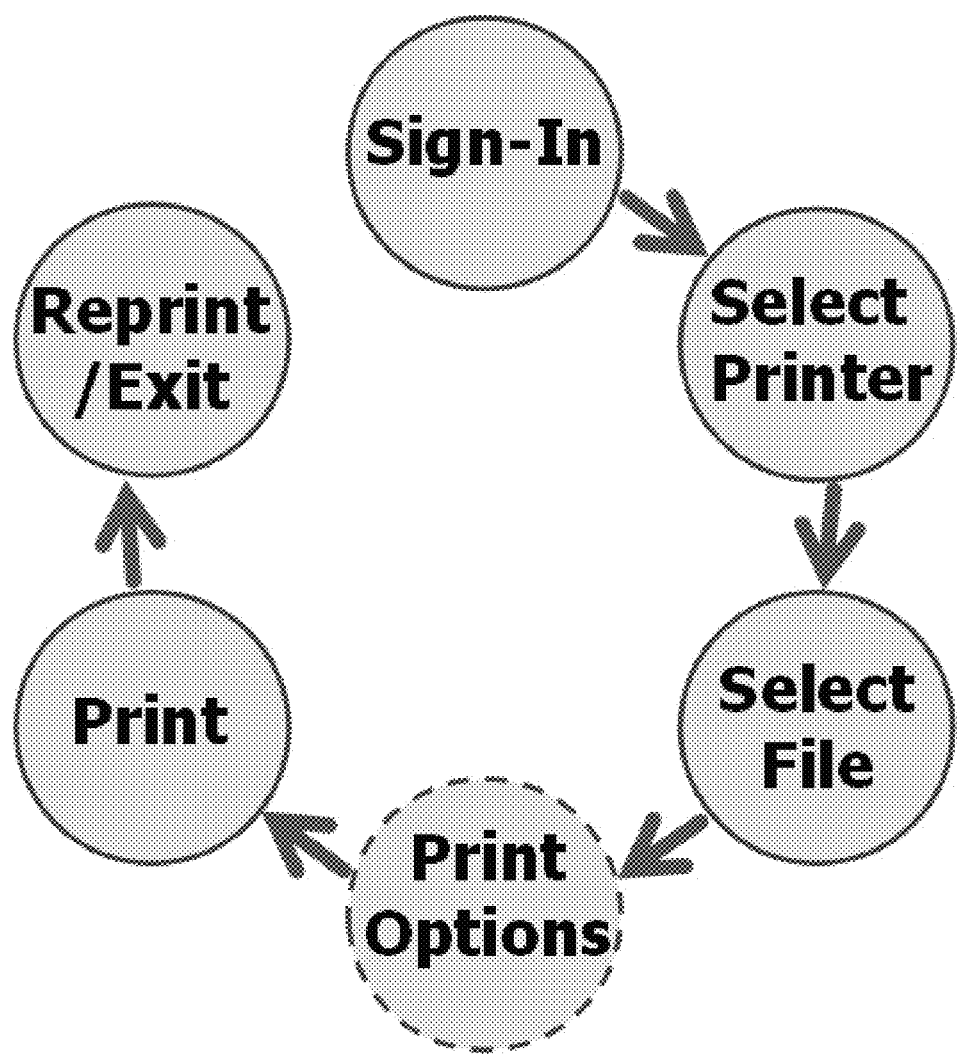
FIG. 20 is a high-level flow chart illustrating the various actions performed according to one exemplary printing flow.

FIG. 19 is a block diagram 1900 illustrating various components of the printing solution and method acts that can be performed. FIG. 20 is a high-level flow chart illustrating the various actions performed according to one exemplary printing flow. FIGS. 21-30 further illustrate the various actions identified in FIG. 20 and also show example screen shots that may be appear to the user on their mobile device (e.g., via an app that is downloaded or accessed by a web browser to implement the printing process). The illustrated method acts are not to be construed as limiting, as they can be used alone or in any combination or subcombination with one another or with other methods.

Figure 64:
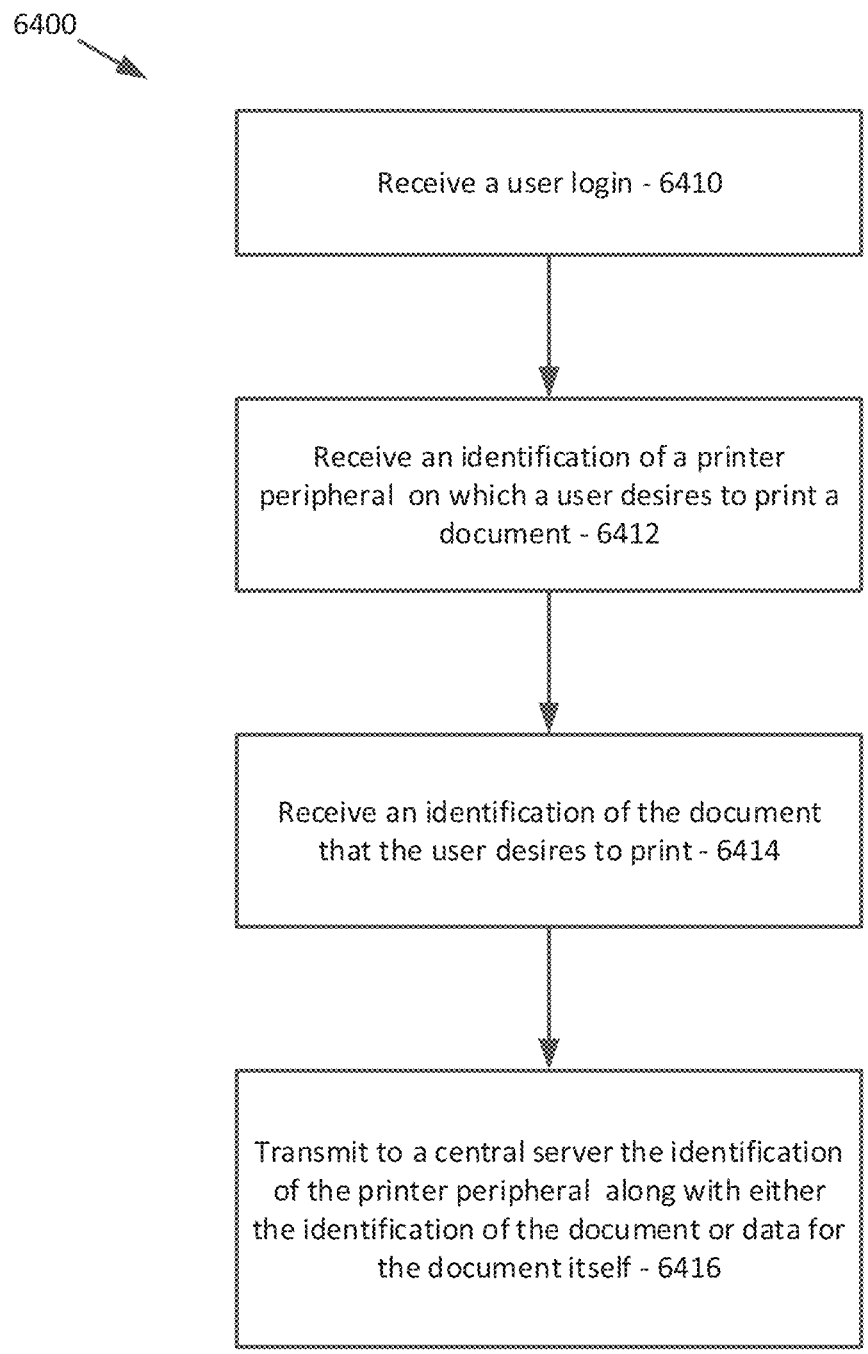
FIG. 64 is a flowchart illustrating method acts performed by an application executed on a user's mobile device for implementing an exemplary printing flow using a cloud service platform.
Figure 65:
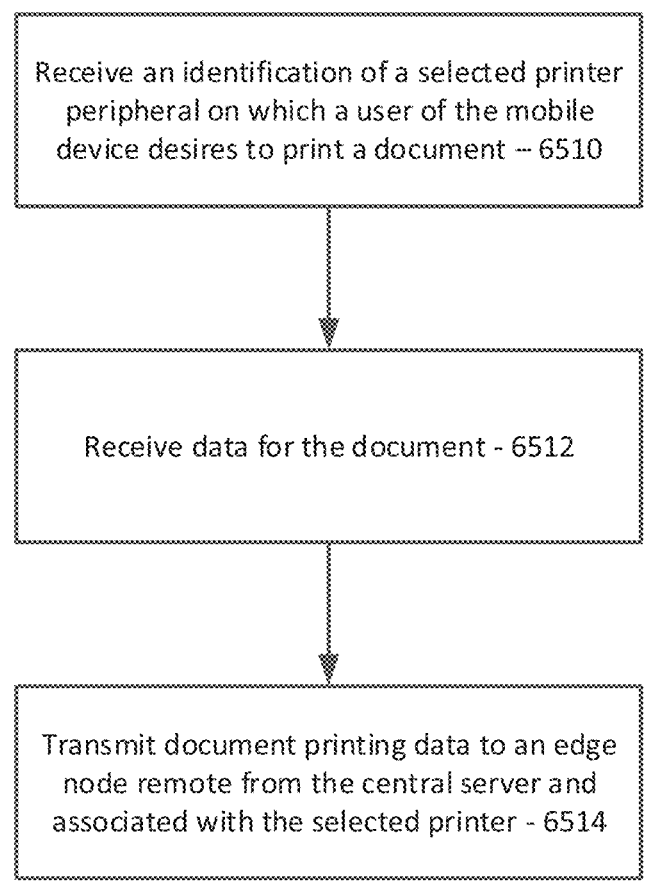
FIG. 65 is a flowchart illustrating method acts performed by a central server for implementing an exemplary printing flow using a cloud-based platform.

FIG. 64 is a flowchart 6400 illustrating method acts performed by an application executed on a user's mobile device for implementing an exemplary printing flow using a cloud service platform. FIG. 65 is a flowchart 6500 illustrating method acts performed by a central server for implementing an exemplary printing flow using a cloud-based platform. The illustrated method acts are not to be construed as limiting, as they can be used alone or in any combination or subcombination with one another or with other methods.

Figure 21:
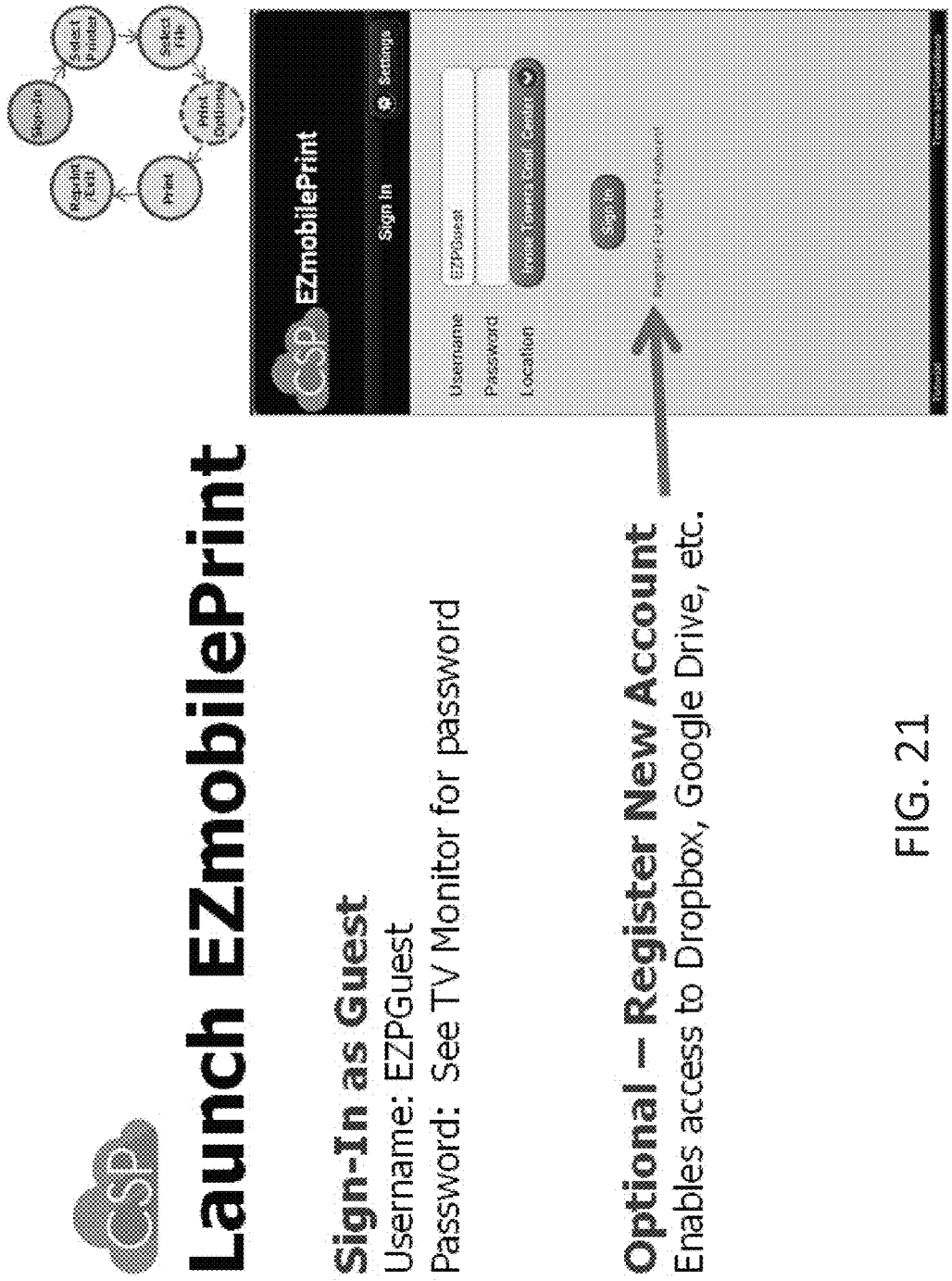

In FIG. 64, at 6410, a user login for his or her mobile printing account managed by a cloud-based central server is received. An example login screen is shown in FIG. 21. The user may login with a user name and password, and may optionally select a location. The location may also be determined by GPS coordinates of the mobile device or be absent from the login screen.

Figure 22:
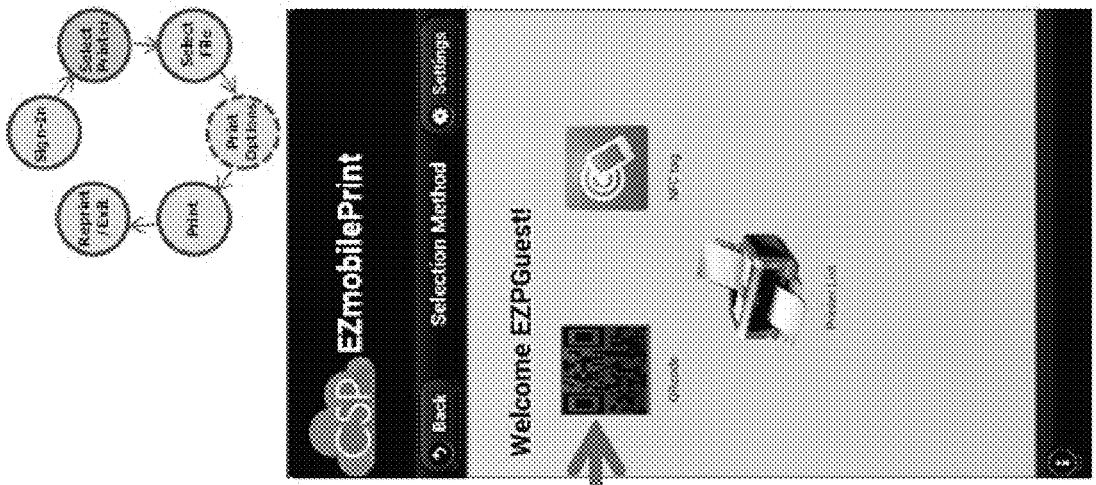
Figure 24:
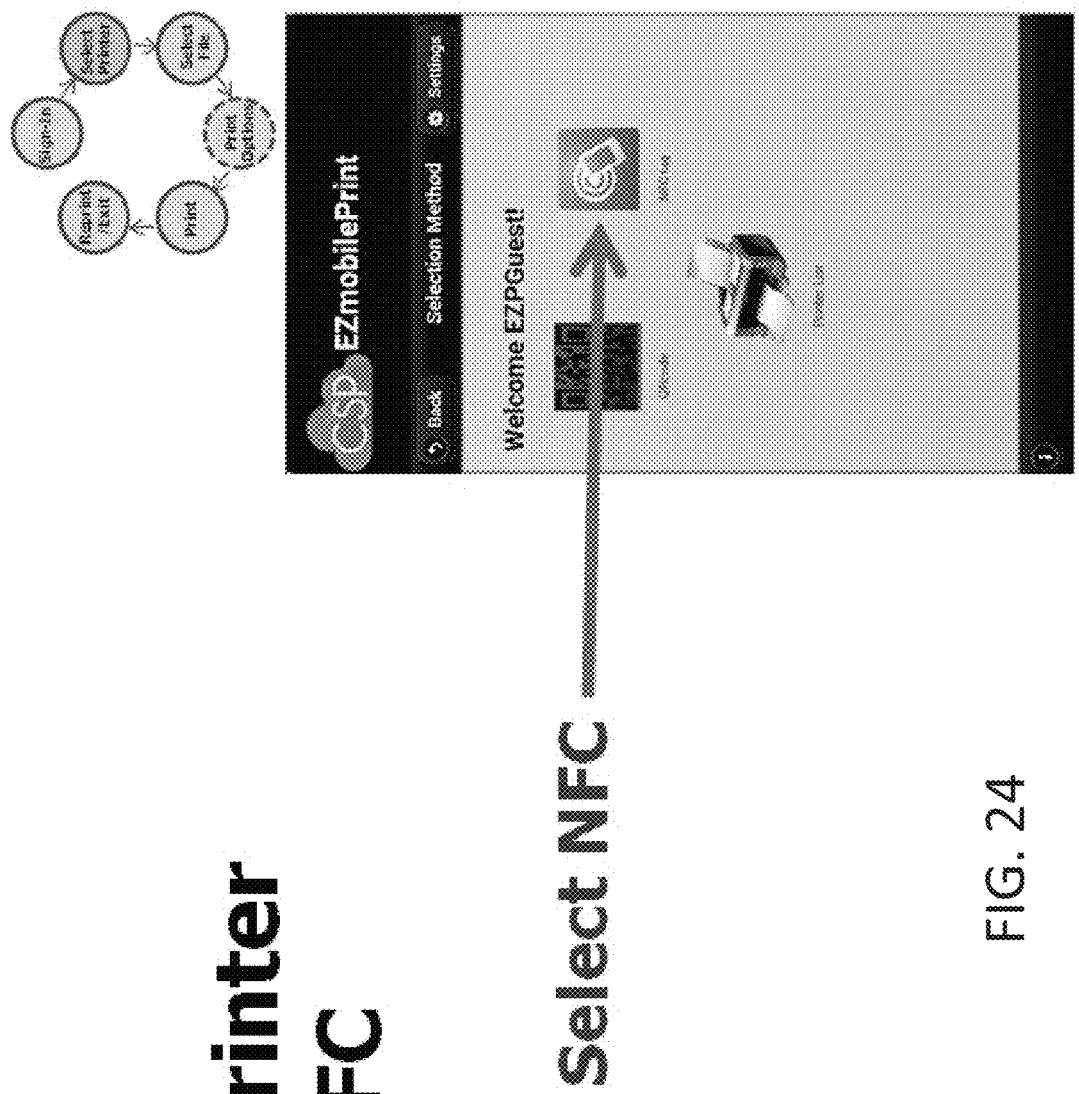
Figure 25:
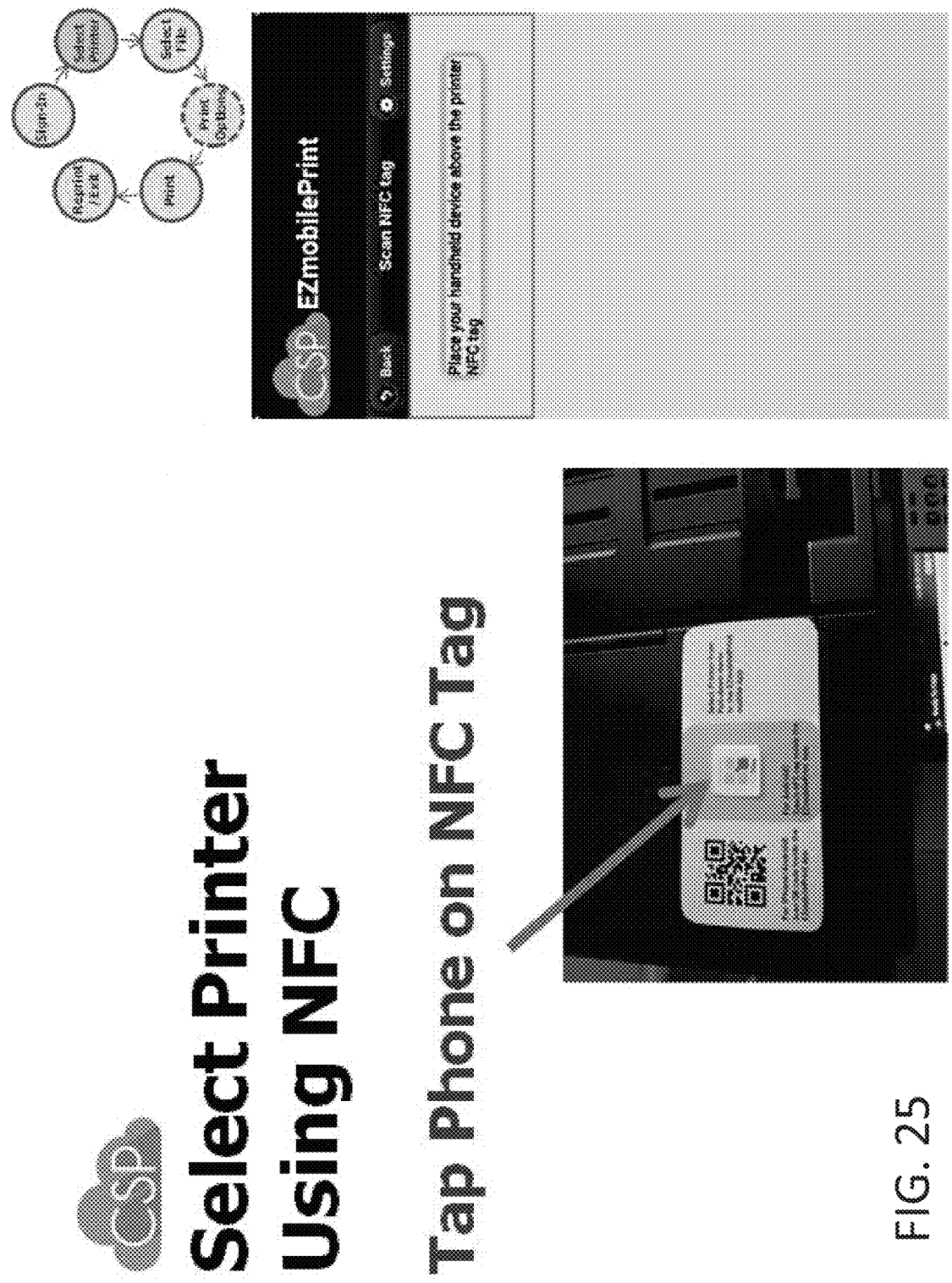

At 6412, an identification of a printer on which a user desires to print a document is received (e.g., input, buffered, or otherwise prepared for further processing). In some embodiments, the receiving can comprise performing a scanning operation of a machine-readable code associated with the printer (as shown in FIGS. 22-23) or performing a near-field communication (NFC) scanning operation on a NFC tag associated with the printer (as shown in FIGS. 24-25). In other embodiments, a Bluetooth, RFID, or other wireless connection can be established with printer, thereby providing the printer identification to the mobile device. Still further, the printer may have an identification number displayed on it that the user can input manually via the application on the mobile device. The printer identification can be an identification number assigned to the printer or some other form of unique identifier (e.g., a UUID, MAC address, or other such identification means).

Figure 26:
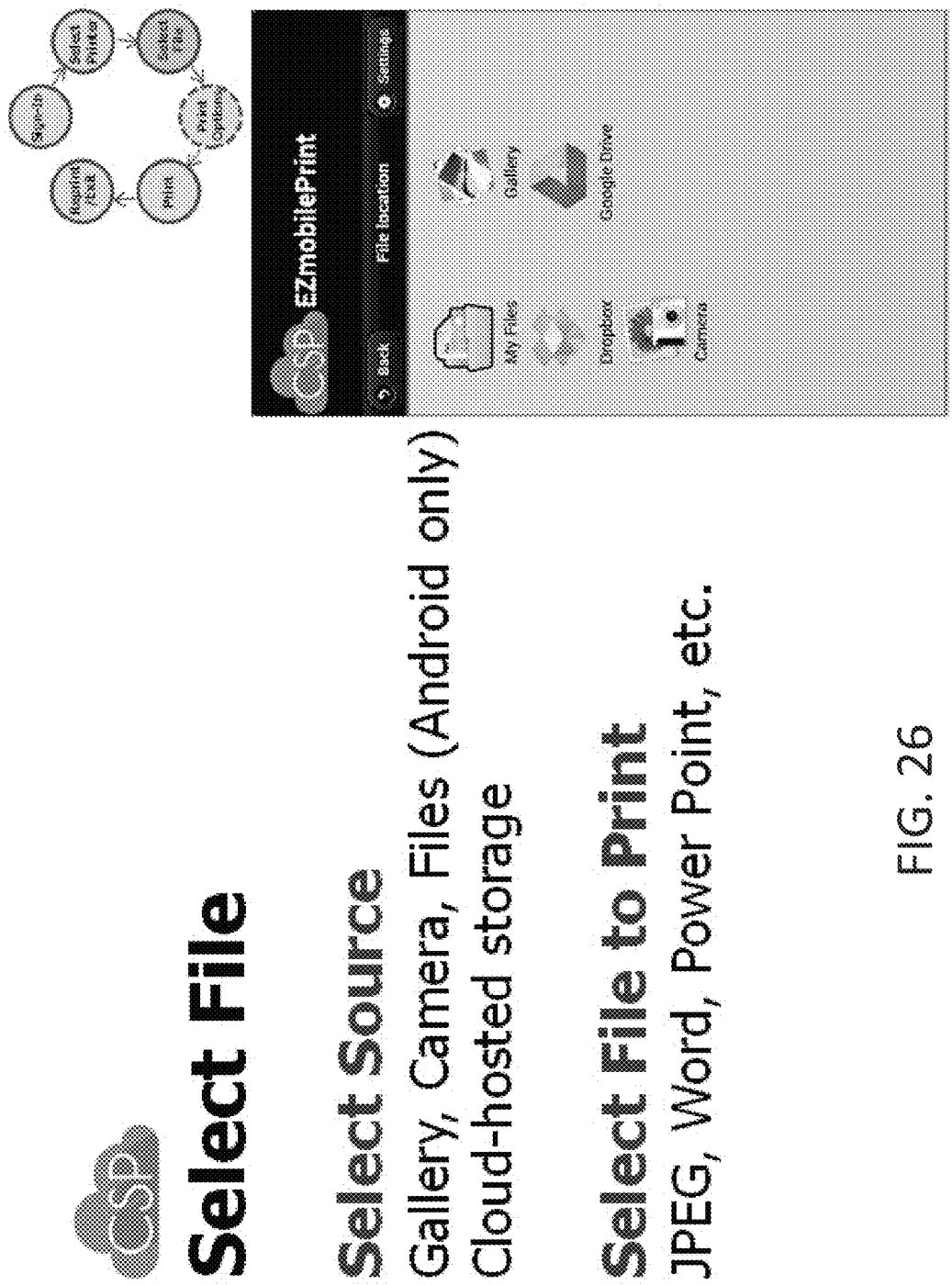
Figure 30:
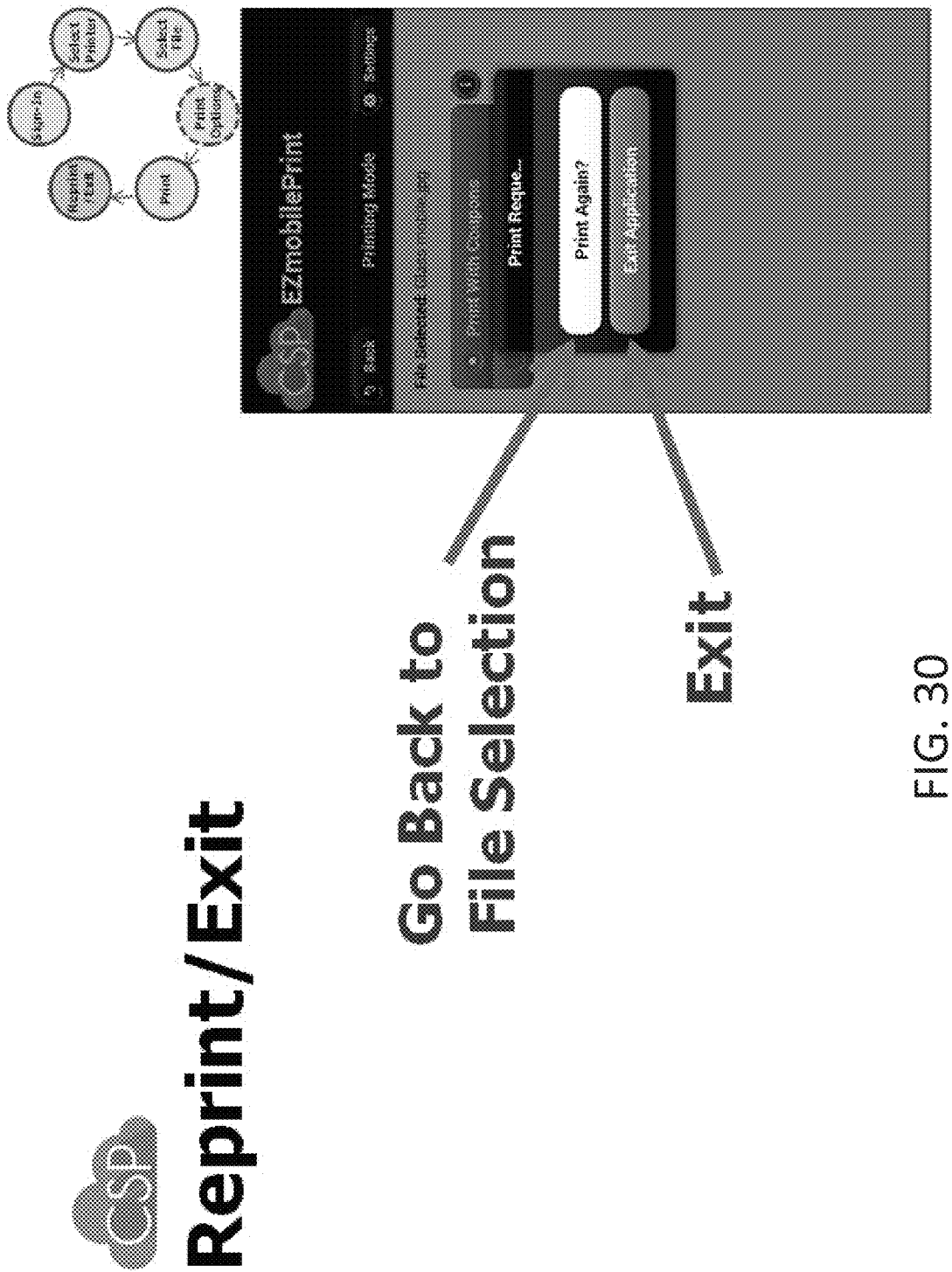

At 6414, an identification of the document that the user desires to print can be received (as shown in FIG. 26). In this discussion, the term "document" encompasses multiple file formats that stored digital media that might desirably be printed, such as a Word document, Power Point presentation, PDF, JPEG, or other such printable media file. The document can be stored locally at the device or be a file stored in a cloud-hosted storage service (e.g., administered by a third party).

At 6416, the identification of the printer along with either the identification of the document (when the document is stored in a cloud-hosted storage service) or data for the document itself (e.g., data for a document, presentation, picture, or any file desirably printed) is wirelessly transmitted to a central server (e.g., to a central node of the cloud service platform). When the document is stored in a cloud-hosted storage service, the digital media can be retrieved from the cloud storage provider for printing (e.g., using previously stored user credentials or using credentials that the user inputs as part of this particular print request).

In some embodiments, user-selected printing parameters affecting how the document will be printed are also received by the application on the mobile device (as shown in FIG. 28). The printing parameters can include, for example, paper size, orientation, color, number of copies, double sided, print range, and/or other such print parameters. The printing parameters can then be sent to the central server for use in processing and preparing the document for printing. In certain embodiments, a user selection indicating that the user desires to receive coupons for local services when printing the document is received by the application on the mobile device (as shown in FIG. 29). The user selection indicating that the user desires to receive coupons can then be transmitted to the central server. The selection to receive one or more coupons may allow a reduction in any printing price that is charged (e.g., the printing may be free or at least partially subsidized by the user's selection to receive coupons). Or, the user may simply desire to receive coupons for local businesses. The coupons to be printed with the selected document can be selected based on the location of the identified printer (e.g., local businesses) and/or user preferences. The content for the coupons can be maintained on the central server, the edge node itself, or accessed from a third-party server upon request by the central server.

Turning to FIG. 65, at 6510, an identification of a selected printer on which a user of the mobile device desires to print a document is received from a mobile device. As noted with respect to FIG. 64, the identification can be obtained, for example, by the user performing a scanning operation of a machine-readable code associated with the selected printer or performing a near-field communication (NFC) scanning operation on an NFC tag associated with the selected printer. At 6512, data for the document is received. For example, an identification of the document can be received by the mobile device, wherein the identification indicates that the document is stored on a cloud storage provider. In such instances, the act of receiving the data for the document can comprise retrieving the document from the cloud storage provider. In other examples, the document data itself is received from the mobile device.

At 6514, document printing data is transmitted to an edge node remote from the central server and associated with the selected printer. The document printing data is data that causes the document to be printed at the selected printer in accordance with any selected printing parameters.

In certain embodiments, a user selection of printing parameters affecting how the document will be printed is also received, and the document printing data is generated based at least in part on the printing parameters (e.g., to apply the printing parameters). In some embodiments, a user selection indicating that the user desires to receive coupons for local services when printing the document is received, coupon data associated with the location of the selected printer is received (e.g., accessed locally or accessed from another server), and the document printing data is supplemented with the coupon data so that one or more coupons are printed at the selected printer along with the document. In certain embodiments, the edge node is separate from the printer and is configured to communicate with the printer using printer drivers designed for the printer.

9.9 Example Cloud Service Display Solution

Figure 31:
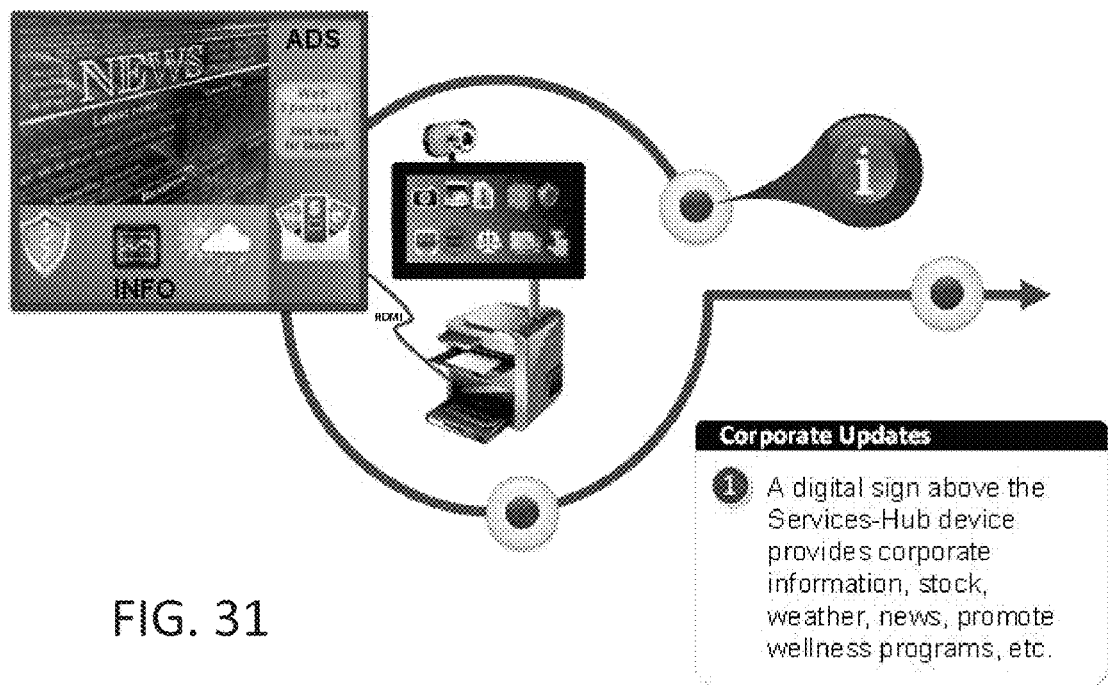
FIGS. 31-32 illustrate an exemplary display screen implementation for the disclosed technology.
Figure 32:
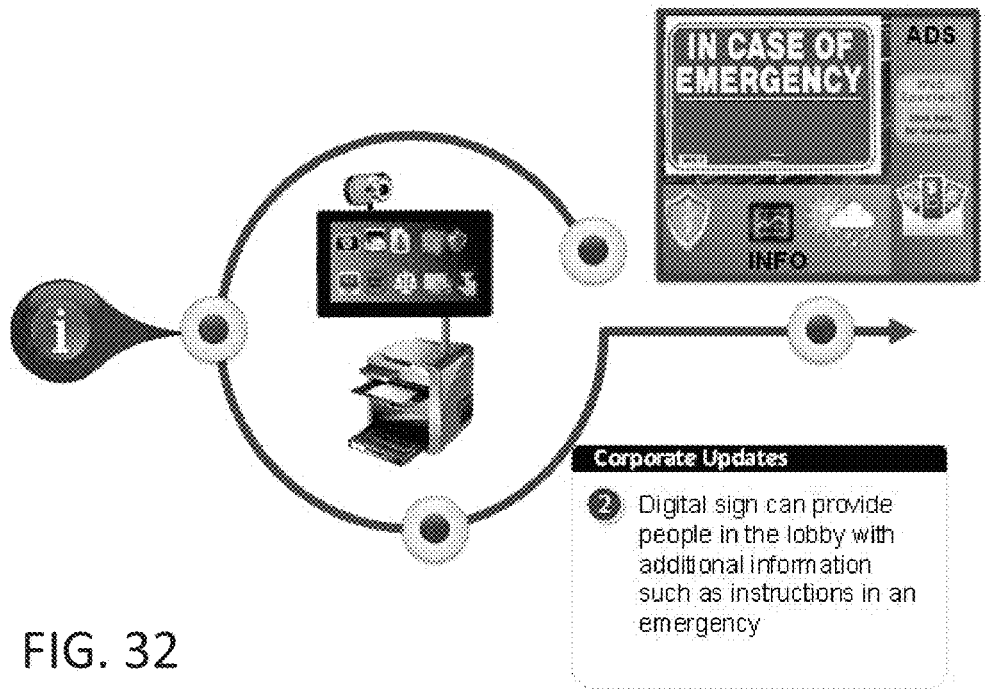

FIGS. 31-32 are block diagrams illustrating an example in which a cloud service platform is used to display digital media on a digital display or digital sign. The digital display can be connected to a central server via an edge node as disclosed herein. The edge node can also be connected one or more additional peripherals, such as a printer or image capture device as shown in FIGS. 31 and 32. The cloud-based central server can be used to manage and update digital media data on the display device. The cloud-based central server can, in some embodiments, also perform one or more of the processing tasks associated with rendering the digital media for display (e.g., by performing encoding or decoding operations). Further, in some embodiments, the cloud-based central server can perform file manipulation and/or file conversion (e.g., conversion from Power Point to PDF). The digital display can be used to present any type of desired information at the digital display, such as corporate information, stock information, weather, news, promotions, and the like (as shown in FIG. 31), or emergency instructions in the event of an emergency. Any of the information displayed can be supplemented by one or more advertisements, which can be maintained at the central server or accessed from a third-party server storing the advertisements.

9.10 Example Cloud Service Check-in Kiosk Solution

In certain example embodiments of the cloud services platform, the platform is used to provide visitor check-in services at a portal in a building, establishment, or other area.

FIGS. 33-41 illustrate various actions associated with the performance of one exemplary method. The illustrated method acts are not to be construed as limiting, as they can be used alone or in any combination or subcombination with one another or with other methods.

Figure 66:
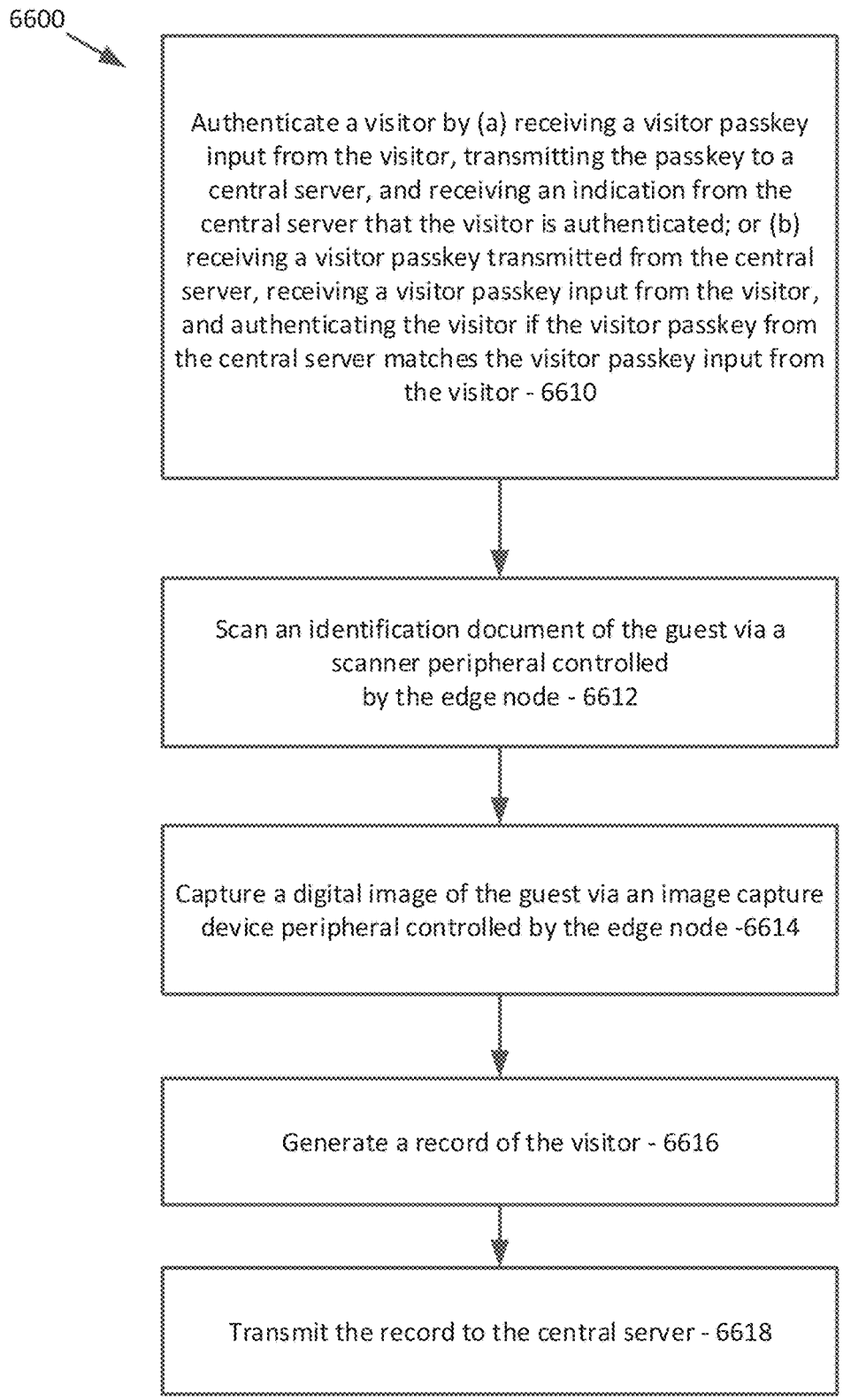
FIG. 66 is a flowchart illustrating method acts performed by an edge node and associated peripherals for implementing an exemplary check-in method using a cloud service platform.
Figure 67:
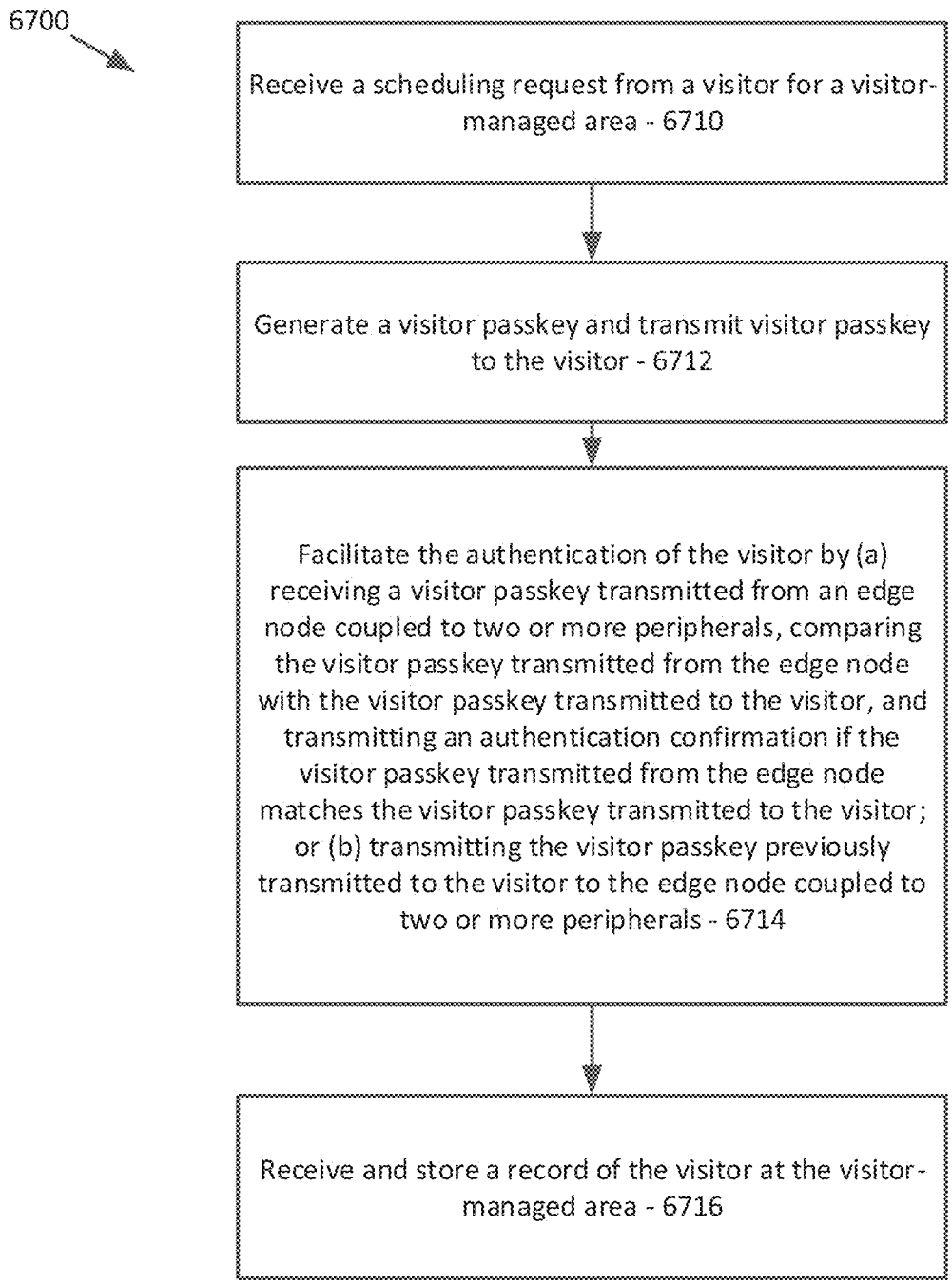
FIG. 67 is a flowchart illustrating method acts performed by a central server in communication with the edge node for implementing an exemplary check-in method using a cloud service platform.

FIGS. 66 and 67 are flow charts that illustrate an example implementation of the method introduced by FIGS. 33-41. FIG. 66 is a flowchart 6600 illustrating method acts performed by an edge node and associated peripherals (e.g., a video display device, a scanner, an imaging device, and/or a printer) for implementing an exemplary check-in method using a cloud service platform. FIG. 67 is a flowchart 6700 illustrating method acts performed by a central server in communication with the edge node for implementing an exemplary check-in method using a cloud service platform. The illustrated method acts are not to be construed as limiting, as they can be used alone or in any combination or subcombination with one another or with other methods.

Figure 33:
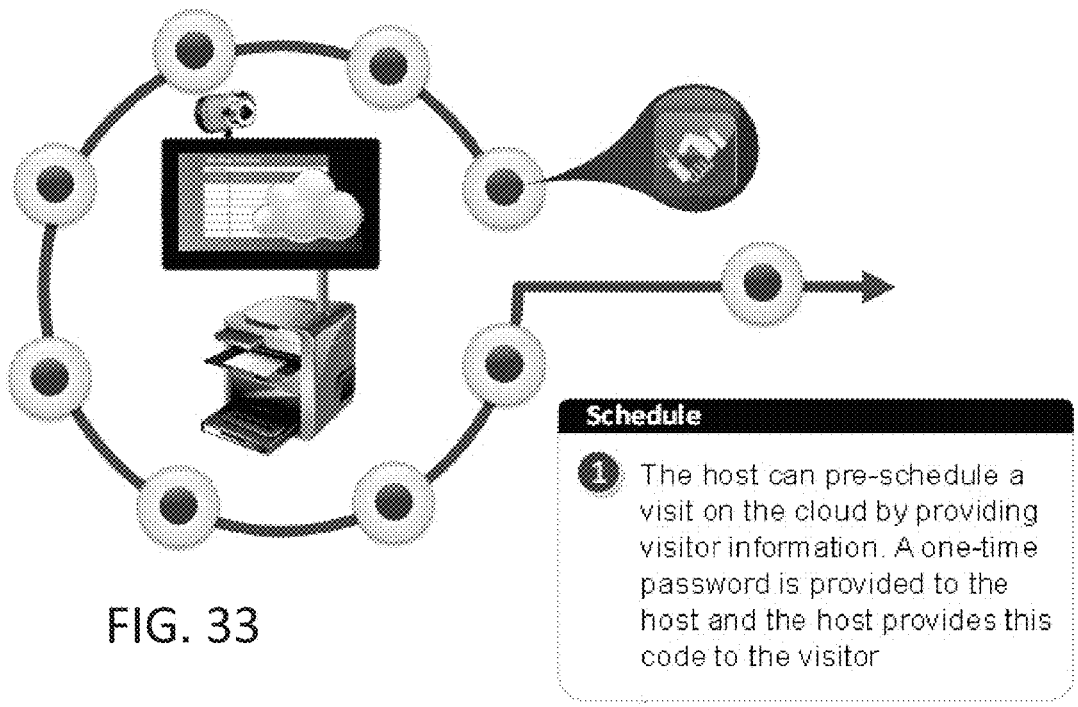
FIGS. 33-41 illustrate an exemplary check-in kiosk implementation for the disclosed technology.

As shown in FIG. 33, a passkey can be provided to the user by the user pre-scheduling the visit to the managed area. The passkey can be, for example, a one-time password, number, or code. The passkey can be either provided directly to the user via a website that manages the scheduling or by an authorized host (e.g., a resident in the managed building or employee of a company in the restricted area).

Figure 34:
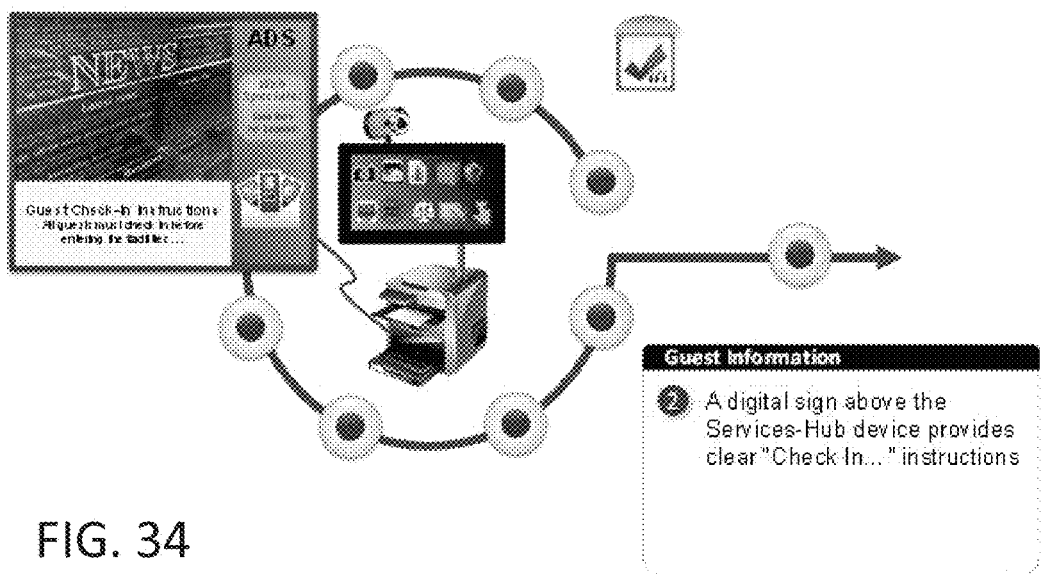

As shown in FIG. 34, the edge node and its associated peripherals can also be used to display check-in instructions. For instance, instructions for performing any one or more of the operations below can be displayed to the user during the check-in process.

Figure 35:
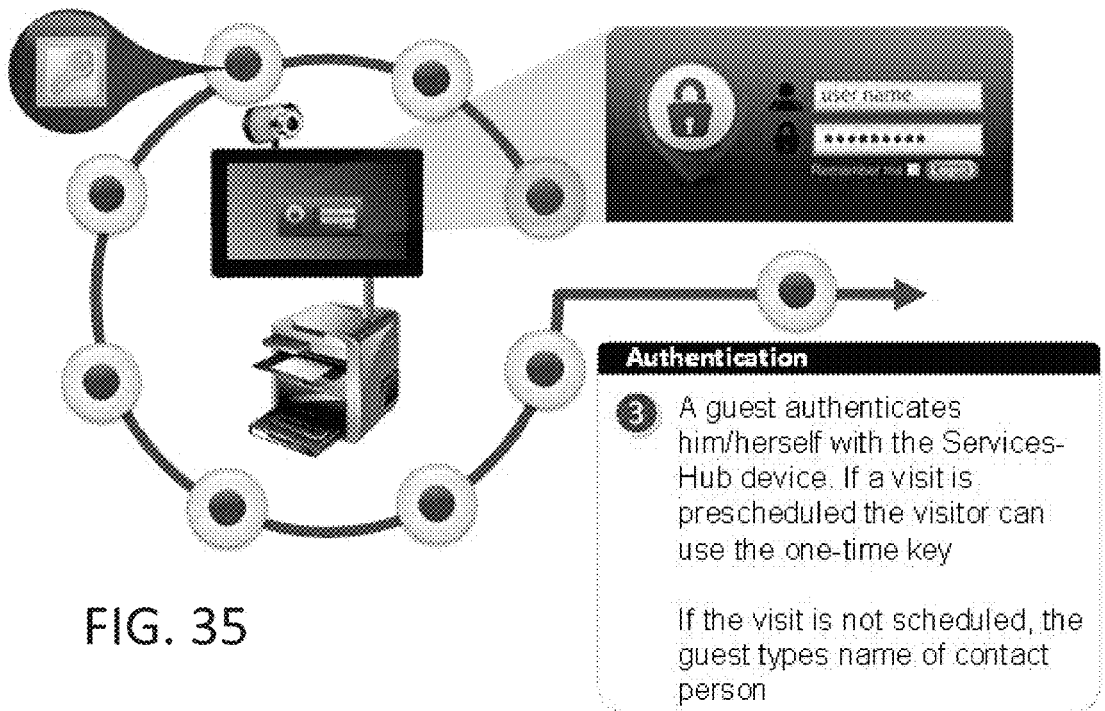

In FIG. 66, at 6610, a visitor is authenticated by (a) receiving a visitor passkey input from the visitor, transmitting the passkey to a central server, and receiving an indication from the central server that the visitor is authenticated; or (b) receiving a visitor passkey transmitted from the central server, receiving a visitor passkey input from the visitor, and authenticating the visitor if the visitor passkey from the central server matches the visitor passkey input from the visitor. In some embodiments, the user may not have a passkey and can instead check-in as a guest and optionally provide the name of his or her contact person. This authentication operation is also shown in FIG. 35.

Figure 36:
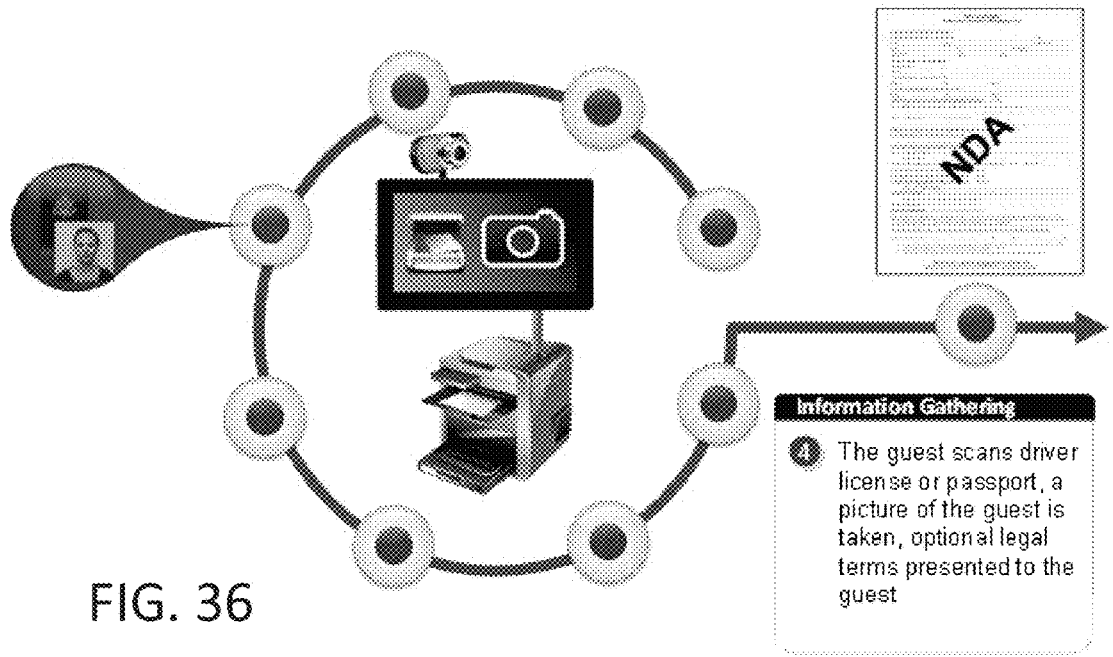

At 6612, an identification document of the guest is scanned via a scanner controlled by the edge node (as further shown in FIG. 36). The identification document can be, for instance, a driver's license, passport, or other identity card. In certain implementations, there may be legal terms or safety instructions concerning the visit that can be printed out for the visitor at this point or at any other point during the check-in operation.

At 6614 (and as further shown in FIG. 36), a digital image of the guest is captured via an image capture device controlled by the edge node.

Figure 37:
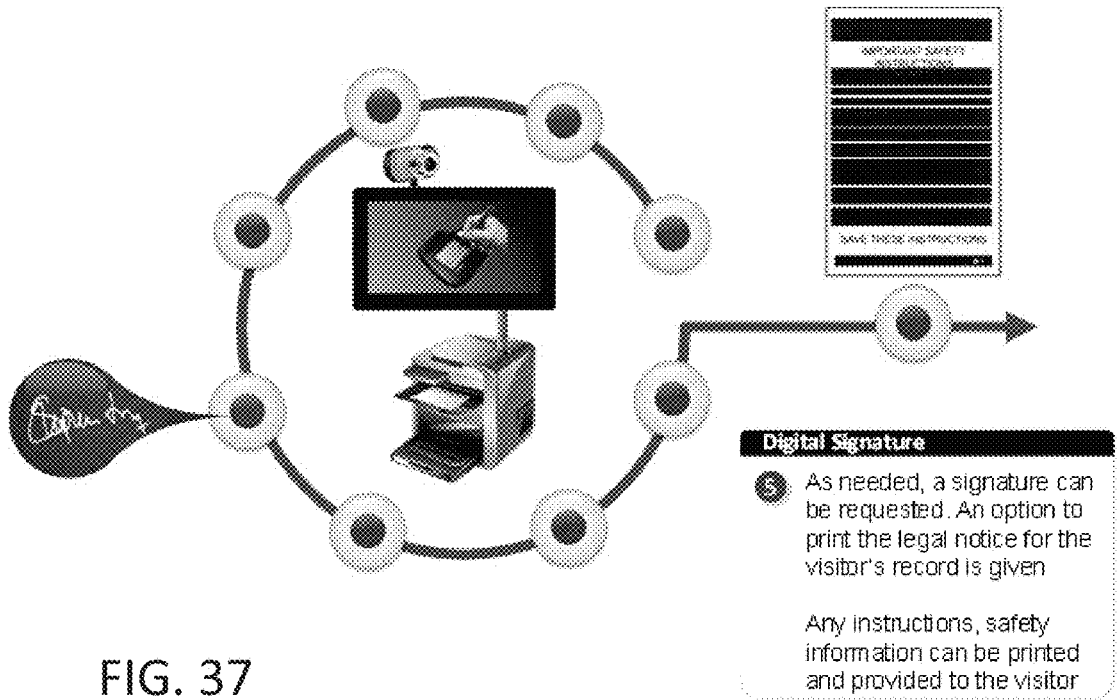
Figure 38:
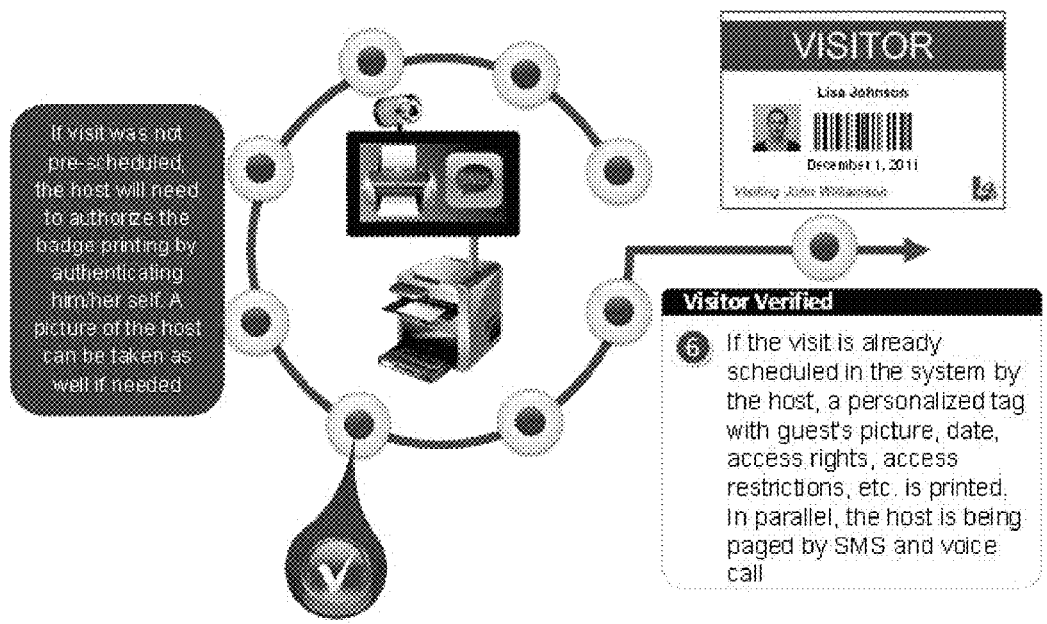

In some embodiments, and as shown in FIG. 37, a signature or other information about the visitor can be requested and obtained (e.g., a thumbprint, an email address, a mailing address, a social security number, or other such information).

In certain embodiments, a personalized tag to be worn by the visitor can be generated and printed. For example, the tag can be a personalized tag with the visitor's name, picture, date, access rights, access restrictions, and/or other such data. In particular implementations, the personalized tag can be created when the visit is pre-scheduled, and when the visit is not pre-scheduled, the host can be prompted to authenticate the visitor. In some instances, a digital image of the host can also be taken.

At any point during the check-in operation, the host can be notified of the visitor's arrival. For instance, the host can be automatically notified via a SMS message, email message, and/or voice mail message.

At 6616, a record of the visitor is generated. The record can comprise at least the identification document and digital image.

Figure 39:
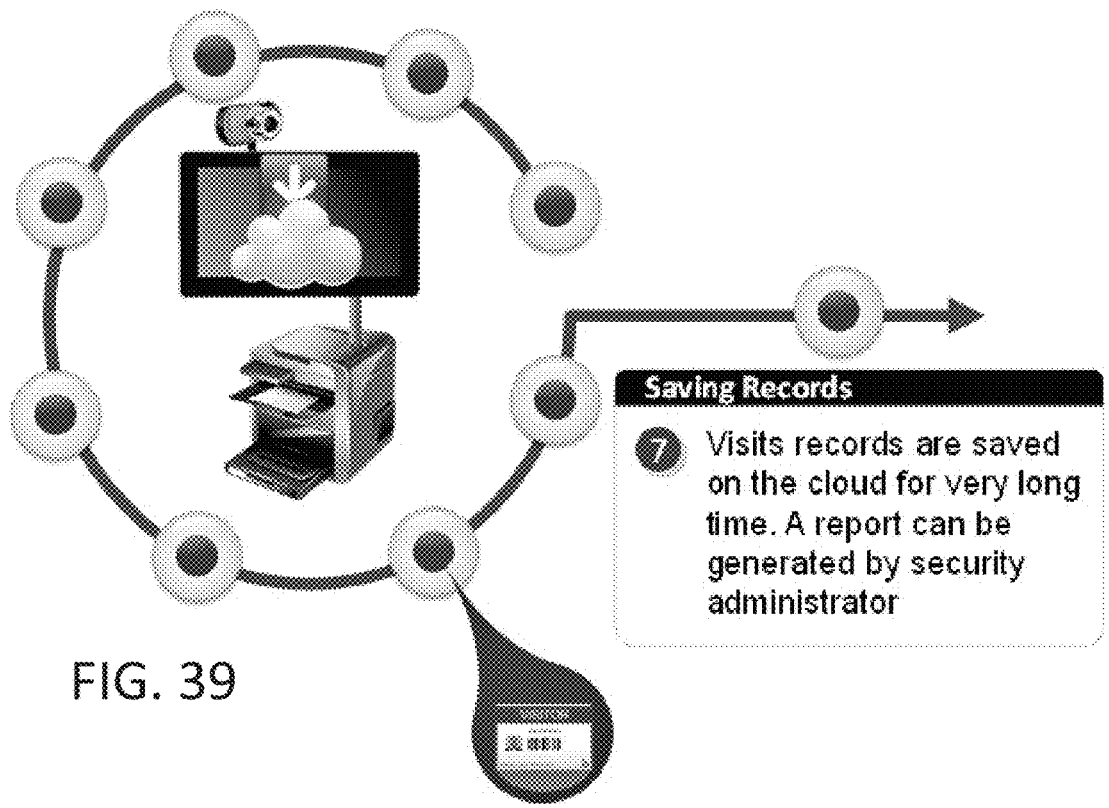

At 6618, the record is transmitted to the central server. As shown in FIG. 39, for example, the record can be stored by the central server for any period of time (e.g., days, months, or years).

Figure 40:
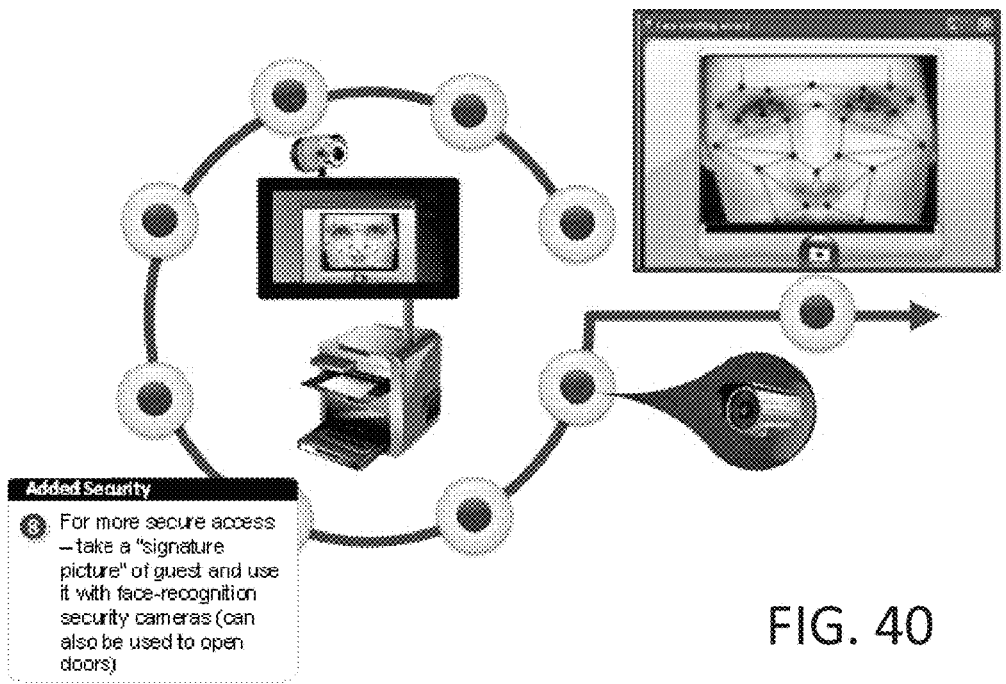

In some embodiments, and as shown in FIG. 40, the authentication process can further comprise using the digital image to perform a facial recognition process. For instance, the facial recognition process can be performed by the central server.

Figure 41:
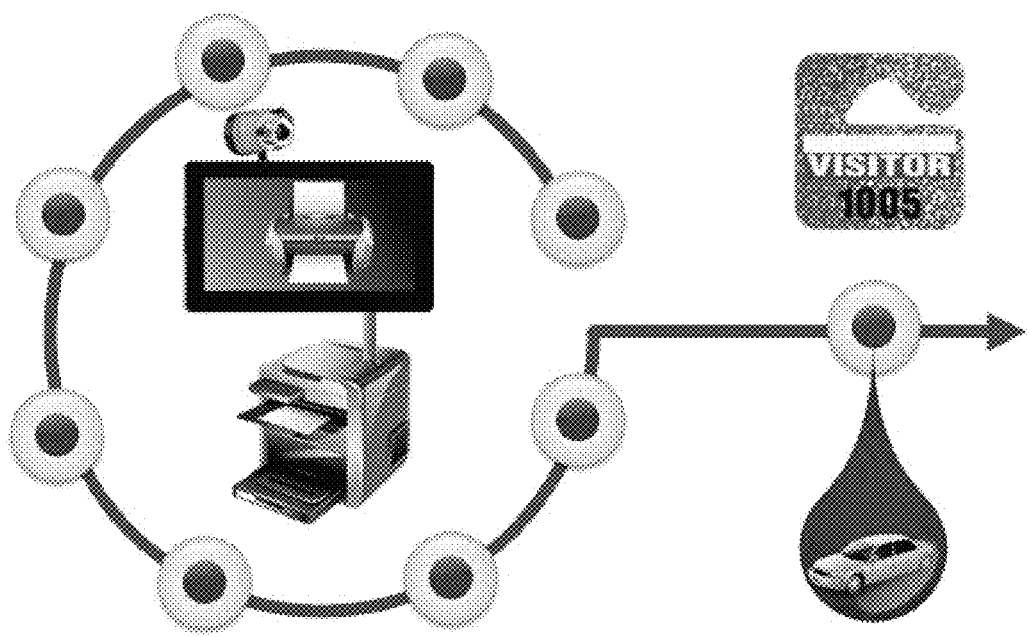

As shown in FIG. 41, a printer controlled by the edge node can be used to print a parking pass for the visitor.

Turning now to FIG. 67, which illustrates an exemplary process performed by the central server to implement the check-in process, at 6710, a scheduling request from a visitor or host for a visitor-managed area is received.

At 6712, a visitor passkey is generated and transmitted to the visitor.

At 6714, the authentication of the visitor at the visitor-managed area is facilitated by (a) receiving a visitor passkey transmitted from an edge node coupled to two or more peripherals, comparing the visitor passkey transmitted from the edge node with the visitor passkey transmitted to the visitor, and transmitting an authentication confirmation if the visitor passkey transmitted from the edge node matches the visitor passkey transmitted to the visitor; or (b) transmitting the visitor passkey previously transmitted to the visitor to the edge node coupled to two or more peripherals.

At 6716, a record of the visitor at the visitor-managed area is received and stored. The record can comprise at least a scanned image of an identification document for the visitor and a digital image of the visitor. The scanned image can be obtained by a scanner coupled to the edge node, and the digital image of the visitor can be obtained by an image capture device at the edge node.

In certain embodiments, a facial recognition process is performed on the digital image of the visitor, and the act of facilitating the authentication of the visitor at the visitor-managed area comprises transmitting an authentication confirmation based on the facial recognition process to the edge node.

9.11 Example Cloud Service Notary Solution

In certain example embodiments of the cloud services platform, the platform is used to facilitate an automated notarization process for documents. Although the term "notarization" is used, it should be understood that the term is used in a broad sense to encompass authentication processes by which a document is assigned a unique identification and a record is created for the document evidencing the date, time, and user who input the document. Such information can be used for various authentication purposes as well as document control and storage purposes.

FIGS. 42-50 illustrate various actions associated with the performance of one exemplary method. The illustrated notary method can be performed by an edge node and associated peripherals (e.g., a video display device, a scanner, a fingerprint scanner, an imaging device, and/or a printer). Furthermore, instructions for performing the notarization process can be displayed to the user via the display device as the user interacts with the edge-peripherals. The illustrated method acts are not to be construed as limiting, as they can be used alone or in any combination or subcombination with one another or with other methods.

Figure 42:
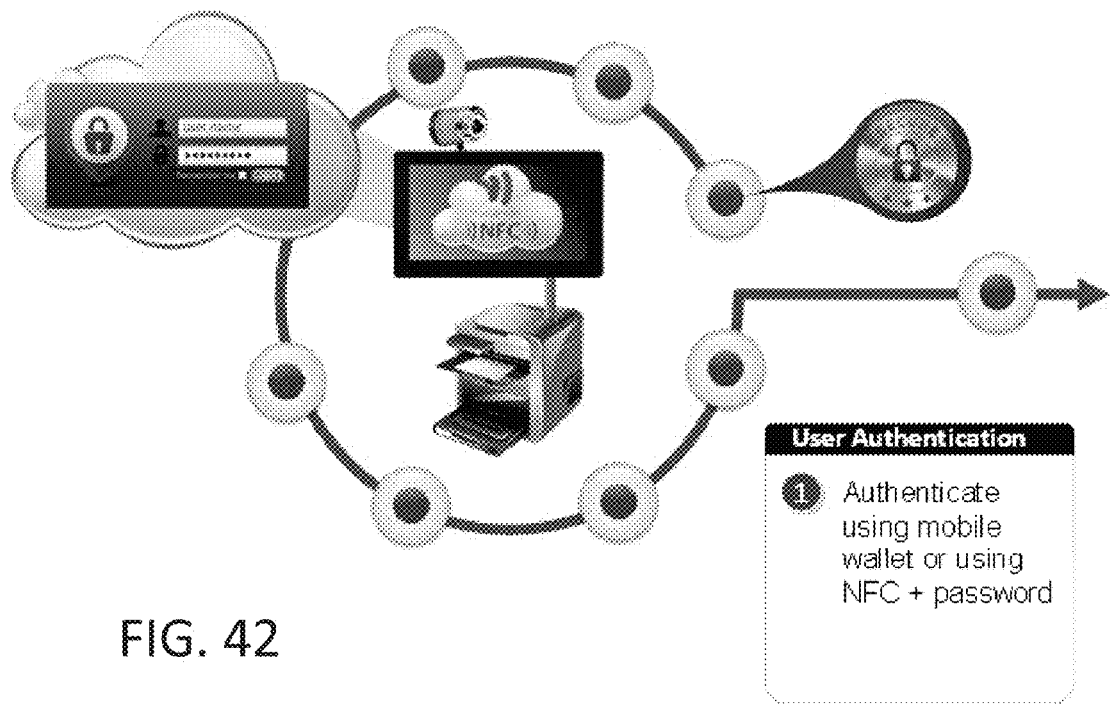
FIGS. 42-50 illustrate an exemplary document authentication implementation for the disclosed technology.
Figure 43:
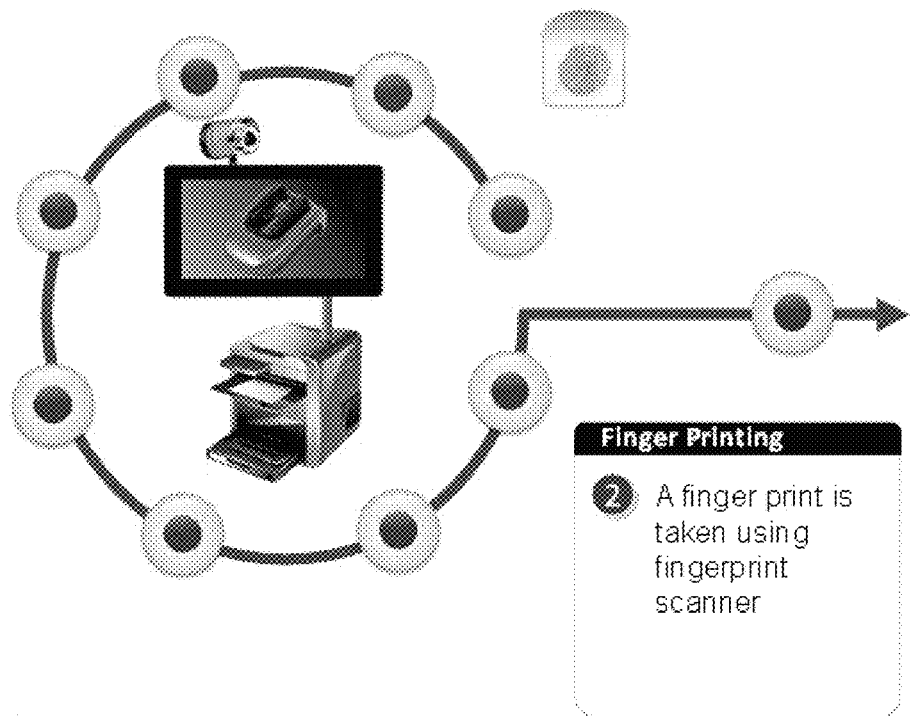
Figure 44:
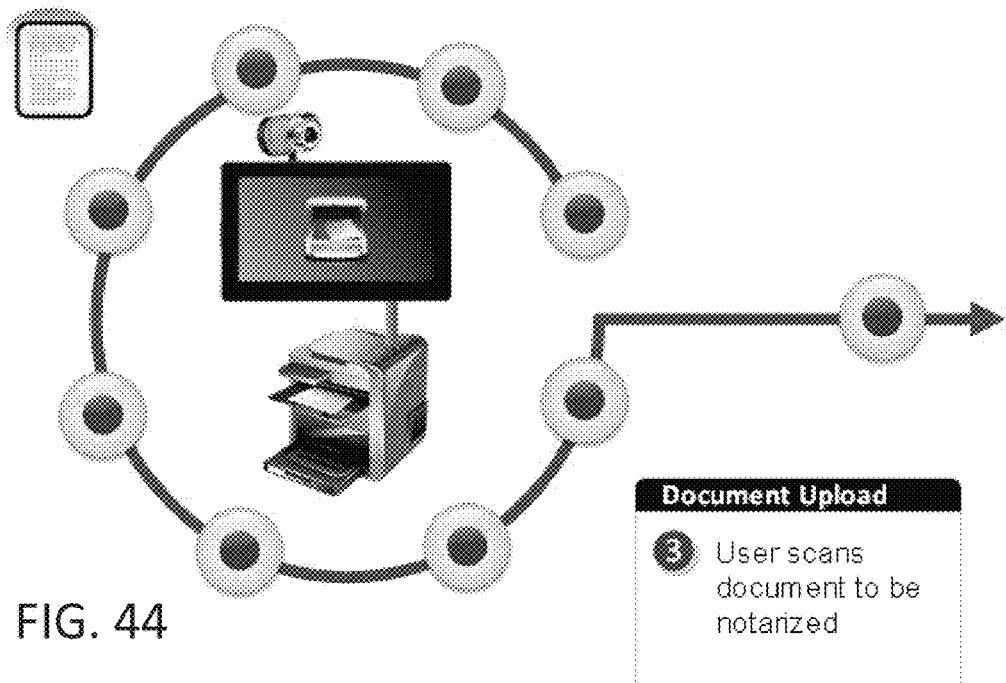
Figure 45:
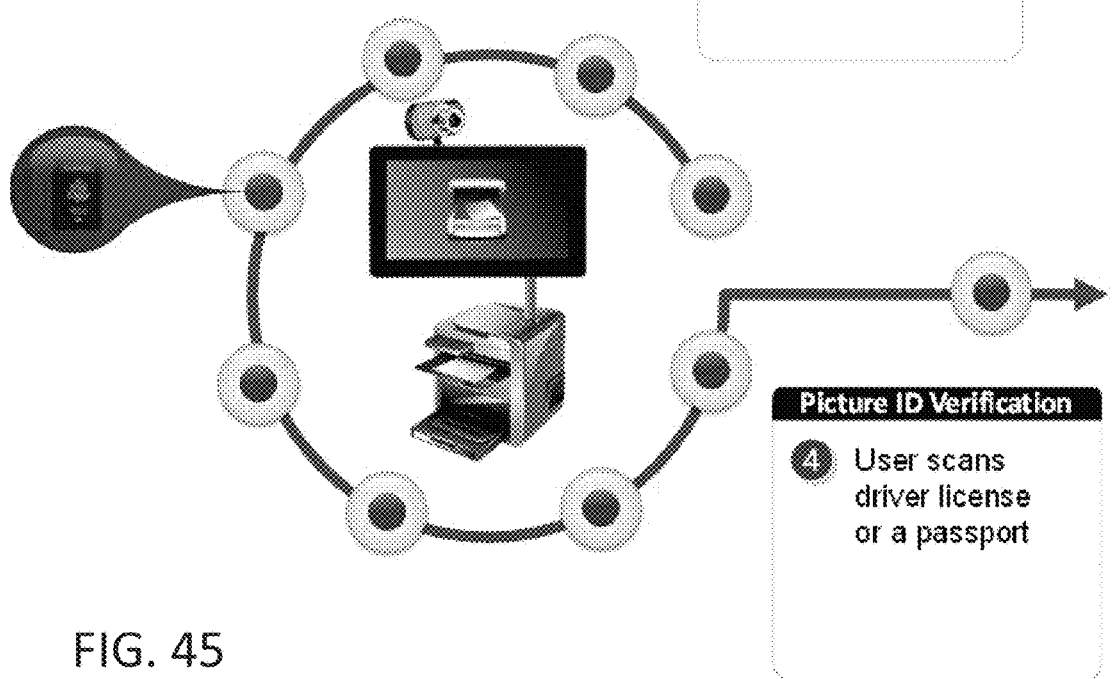
Figure 46:
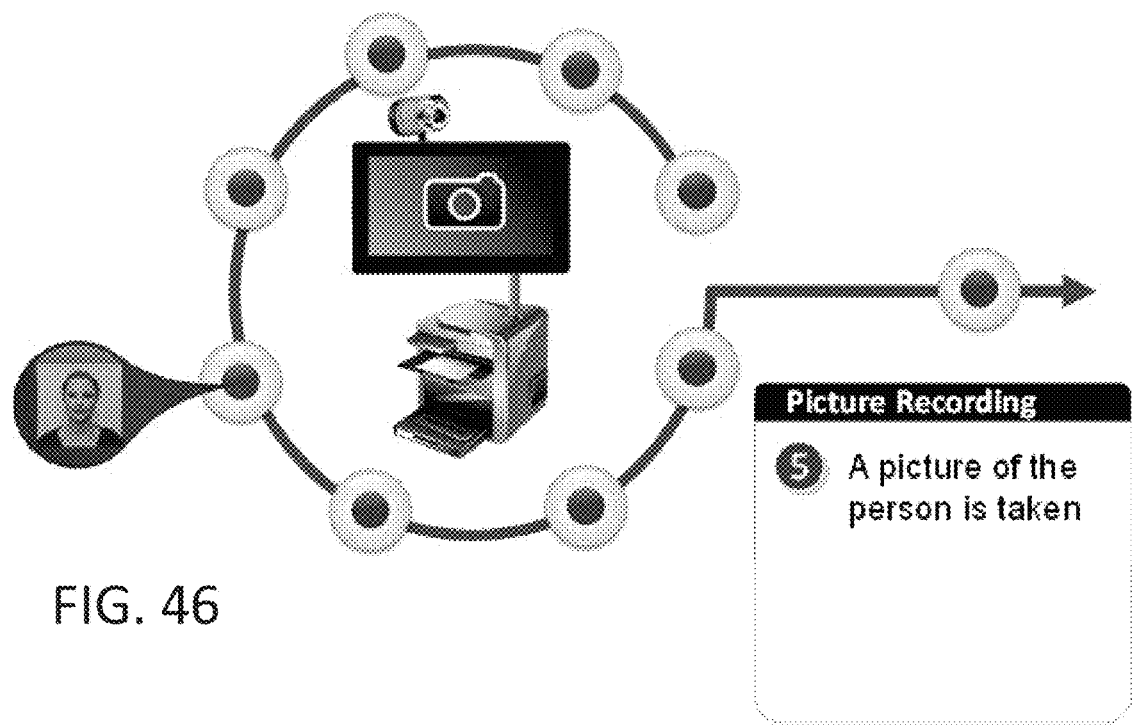
Figure 47:
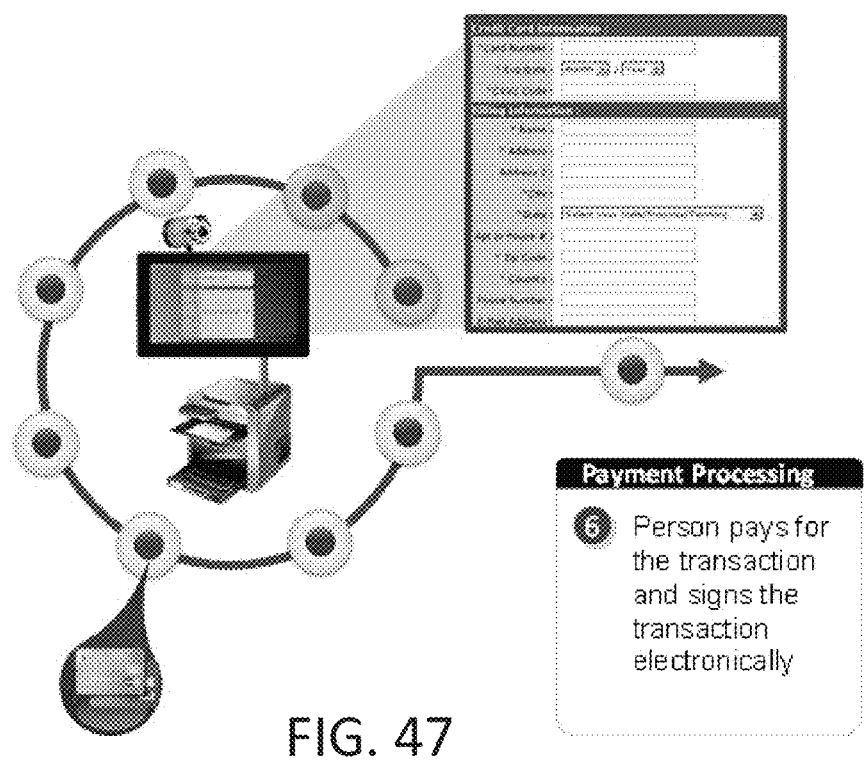
Figure 48:
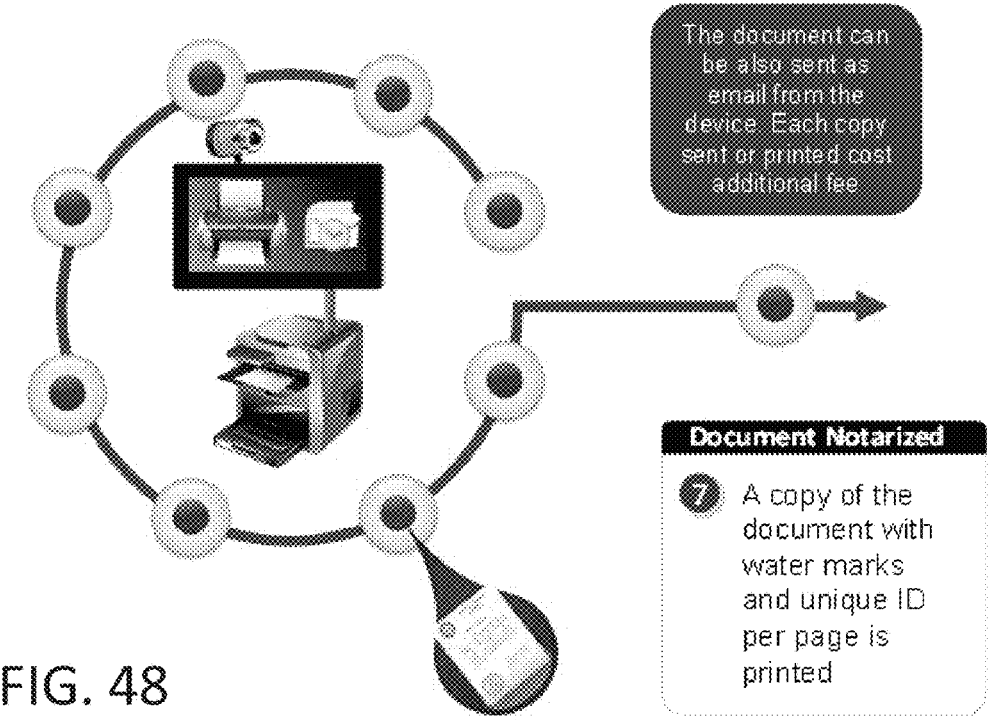
Figure 49:
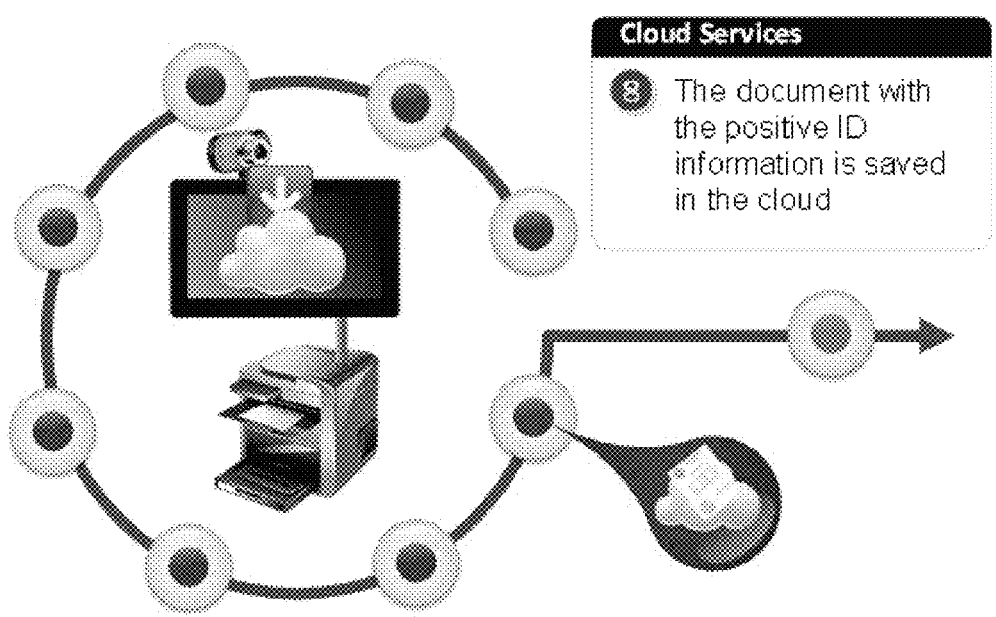
Figure 50:
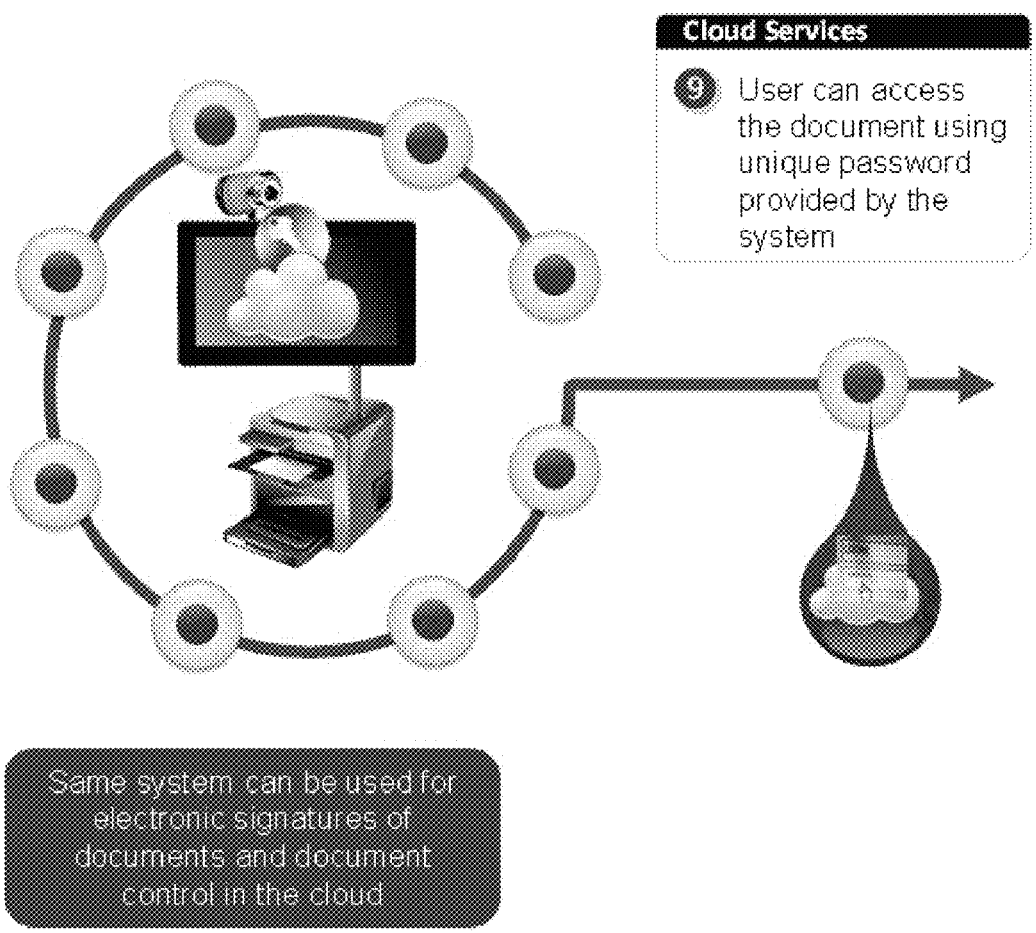

In FIG. 42, a user is authenticated. For instance, the user can be authenticated using a mobile wallet app, a username and password, NFC card/tag, or RFID card/tag. In FIG. 43, the user's fingerprint is taken (e.g., via a fingerprint scanner controlled by an edge node). In FIG. 44, the document desired to be notarized is scanned (e.g., via a scanner controlled by the edge node). In FIG. 45, an identification of the user is scanned (e.g., a driver's license, passport, or other official form of identification). In FIG. 46, an image of the user is obtained. In FIG. 47, payment information for the transaction is received from the user, potentially along with the user's electronic or other signature. In FIG. 48, a copy of the document with watermarks and/or a unique ID indicating the notarization (or authenticating the document as having been presented on the day and time stored) is printed for the user. The copy can also or alternatively be sent to the user via email (e.g., at a fee). In FIG. 49, the document and the identification information of the user is transmitted to the central server and stored for any desired amount of time (e.g., days, months, or years). The user may later desired to access the document and the authentication of the date and time at which it was scanned for authentication purposes. Thus, at FIG. 50, the user can access and re-print and/or re-send the authenticated document.

9.12 Example Cloud Service Shipping Solution

In certain example embodiments of the cloud services platform, the platform is used to facilitate an automated kiosk for shipping packages.

FIGS. 51-58 illustrate various actions associated with the performance of one exemplary method. The illustrated method acts are not to be construed as limiting, as they can be used alone or in any combination or subcombination with one another or with other methods.

Figure 68:
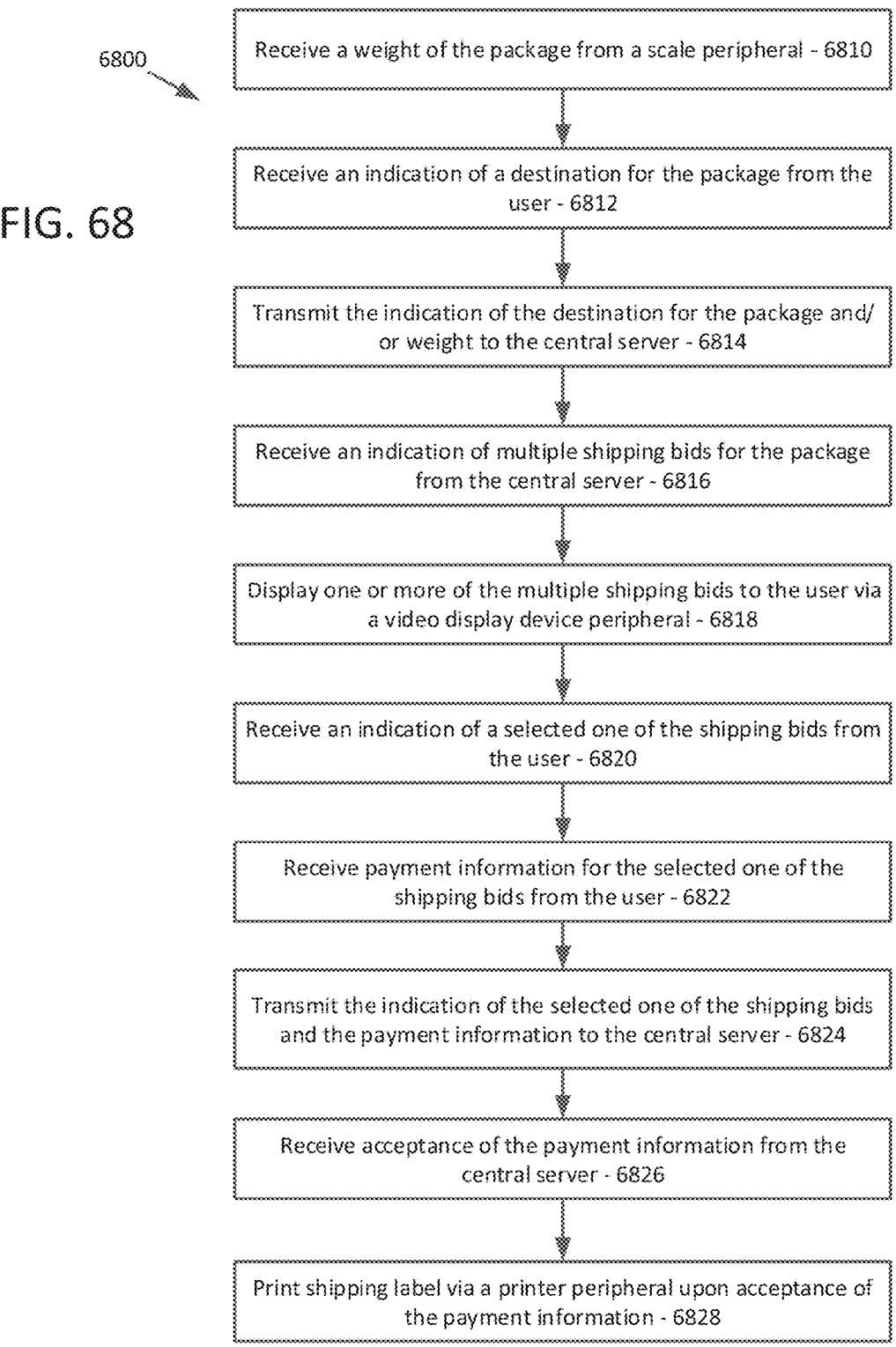
FIG. 68 is a flowchart illustrating method acts performed by an edge node and associated peripherals for implementing an exemplary shipping method using a cloud service platform.
Figure 69:
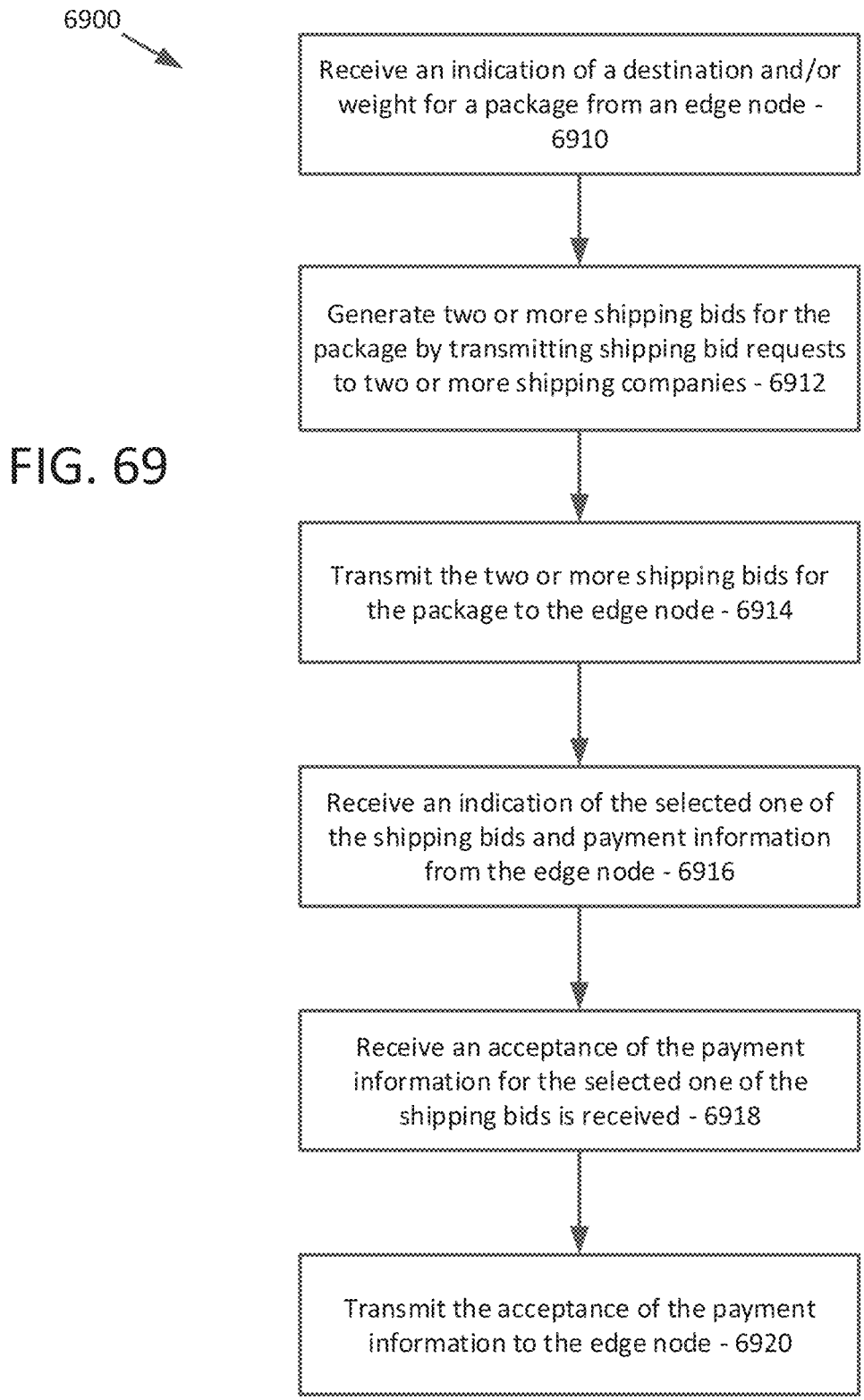
FIG. 69 is a flowchart illustrating method acts performed by a central server in communication with the edge node for implementing an exemplary shipping method using a cloud service platform.

FIGS. 68 and 69 are flow charts that illustrate an example implementation of the method introduced by FIGS. 51-58. FIG. 68 is a flowchart 6800 illustrating method acts performed by an edge node and associated peripherals (e.g., a video display device, a scale, and/or a printer) for implementing an exemplary shipping method using a cloud service platform. FIG. 69 is a flowchart 6900 illustrating method acts performed by a central server in communication with the edge node for implementing an exemplary shipping method using a cloud service platform. The illustrated method acts are not to be construed as limiting, as they can be used alone or in any combination or subcombination with one another or with other methods.

Figure 51:
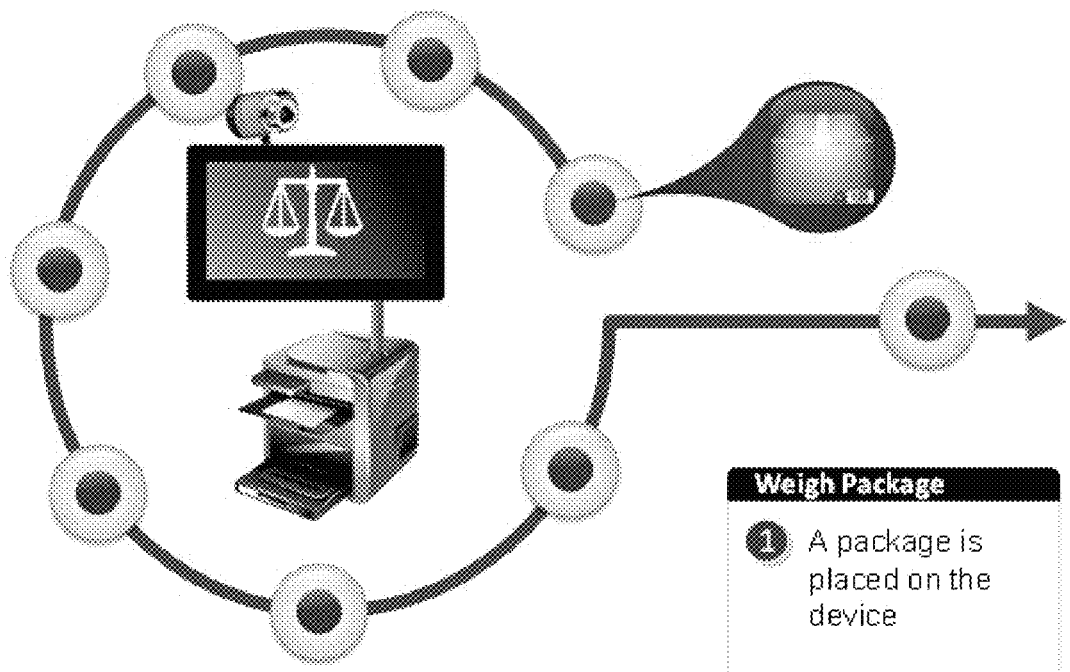
FIGS. 51-58 illustrate an exemplary document authentication implementation for the disclosed technology.

At 6810, and in some embodiments, a weight of the package is received from the scale. For instance, and as illustrated in FIG. 51, the package can be placed on a scale peripheral connected to the edge node (e.g., via a prompt from the display device).

Figure 52:

At 6812, an indication of a destination for the package is received from the user. For instance (and as shown in FIG. 52), the user can be requested to enter destination information via a display device and a user input device (e.g., a touchpad, keyboard, or touch screen).

Figure 53:
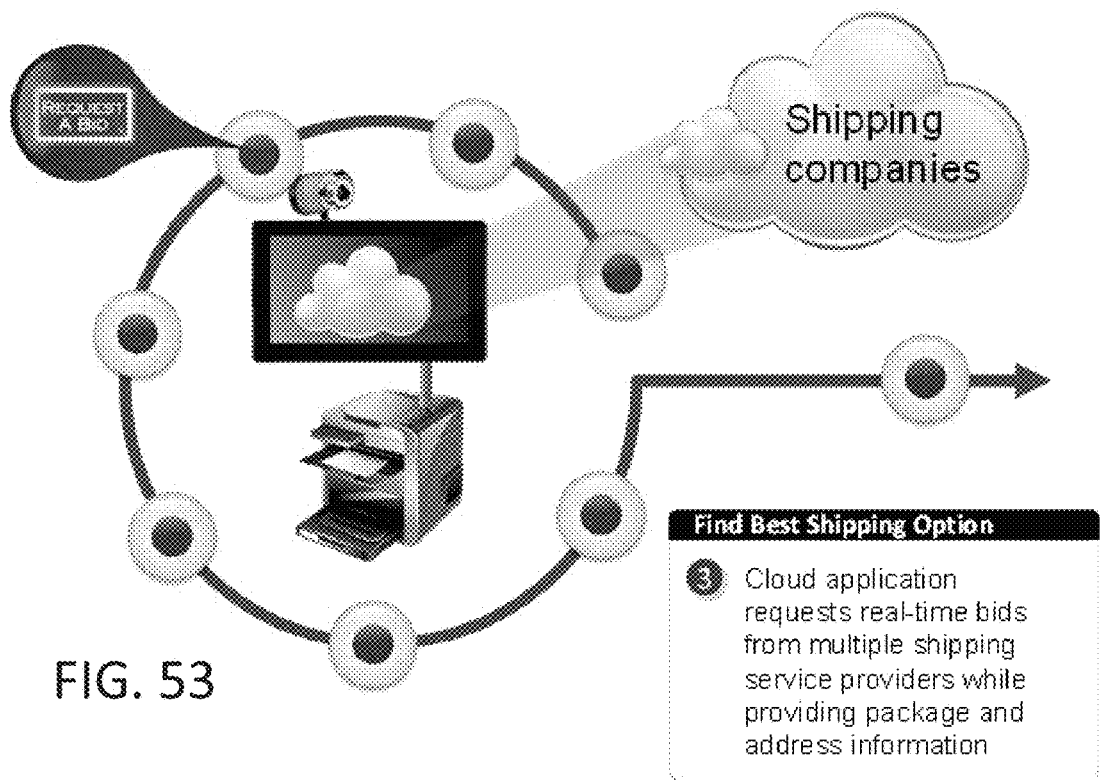

At 6814, the indication of the destination for the package (and, in some embodiments, the weight) is transmitted to the central server. For instance, as shown in FIG. 53, this information can be used by a central server to request real-time bids from multiple shipping service providers.

At 6816, an indication of multiple shipping bids for the package is received from the central server. One or more of the shipping bids can indicate a cost of shipping the package and a delivery time for the package.

Figure 54:
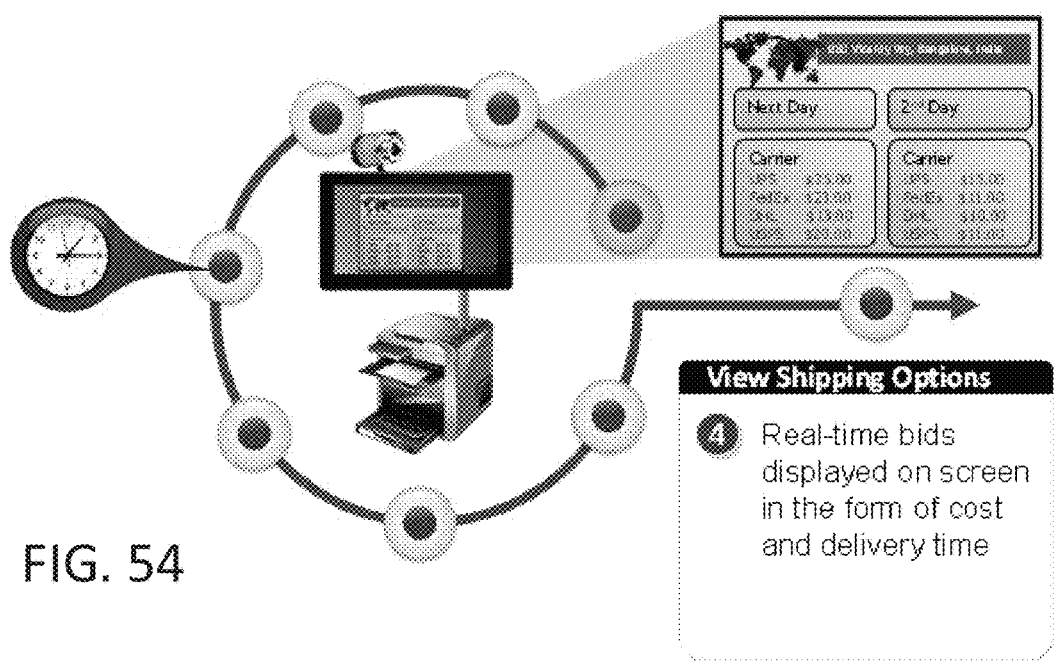

At 6818, one or more of the multiple shipping bids are displayed to the user via the video display device. For instance, as shown in FIG. 54, the multiple bids can be displayed in the form of cost and/or delivery time.

Figure 55:
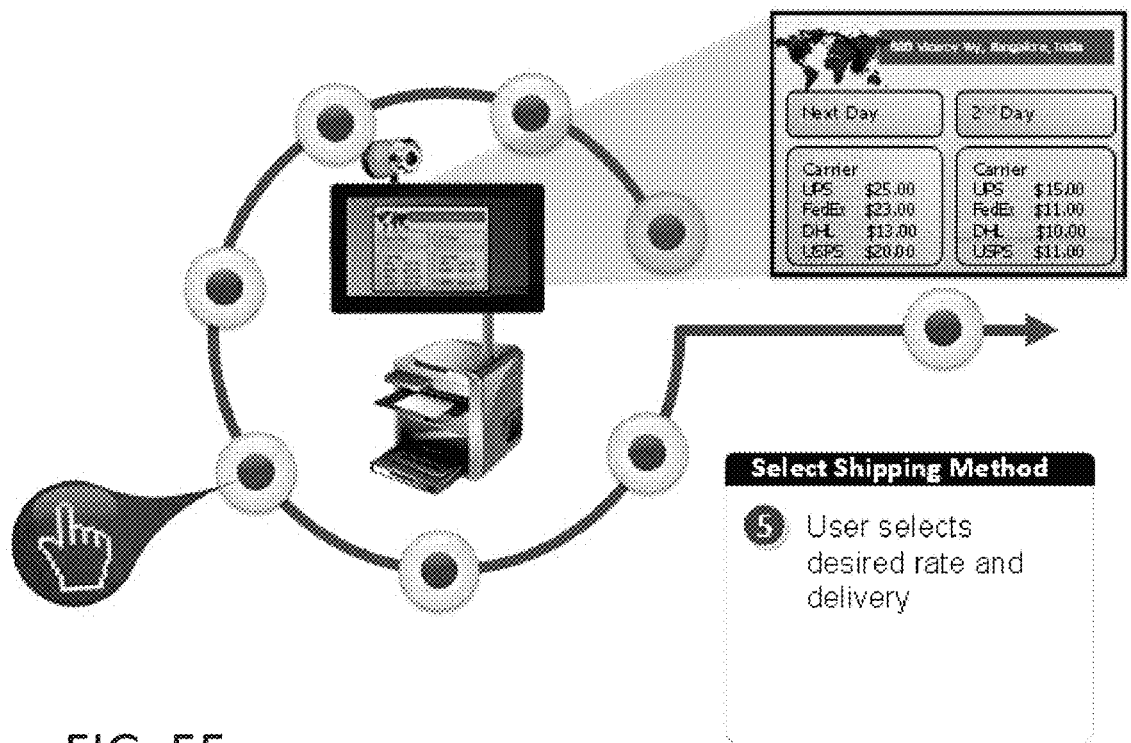
Figure 56:
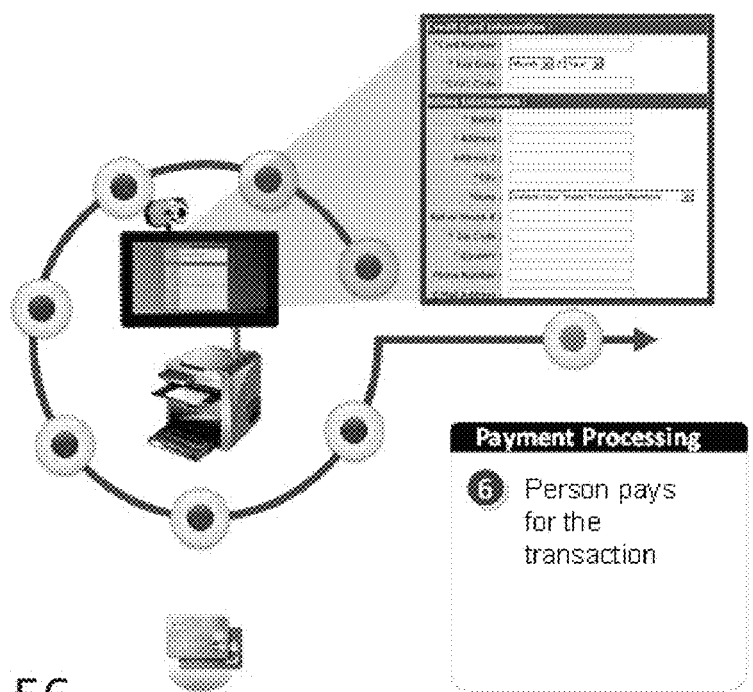
Figure 57:
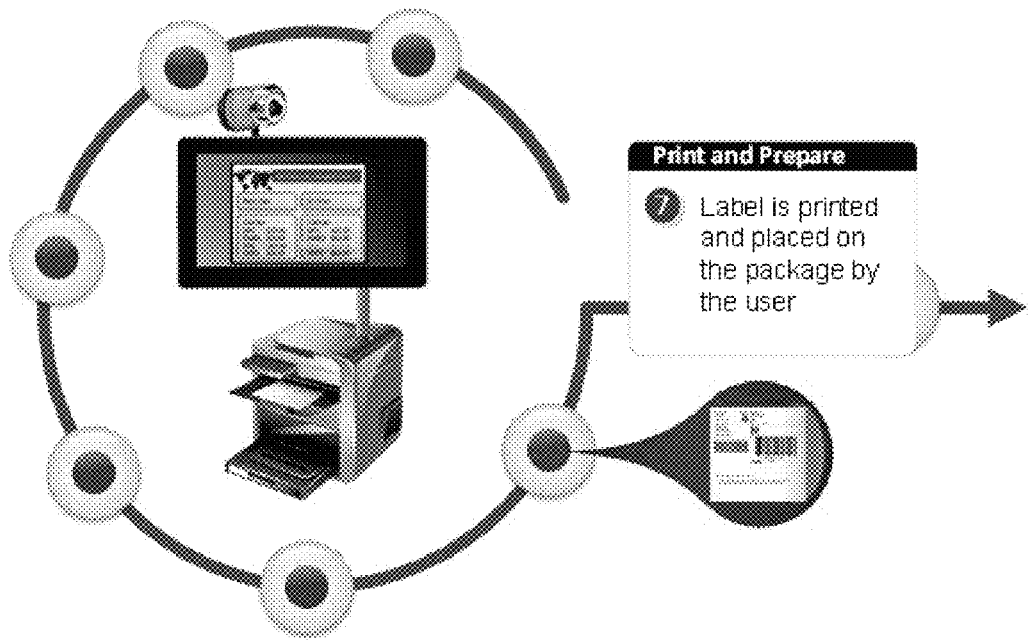
Figure 58:
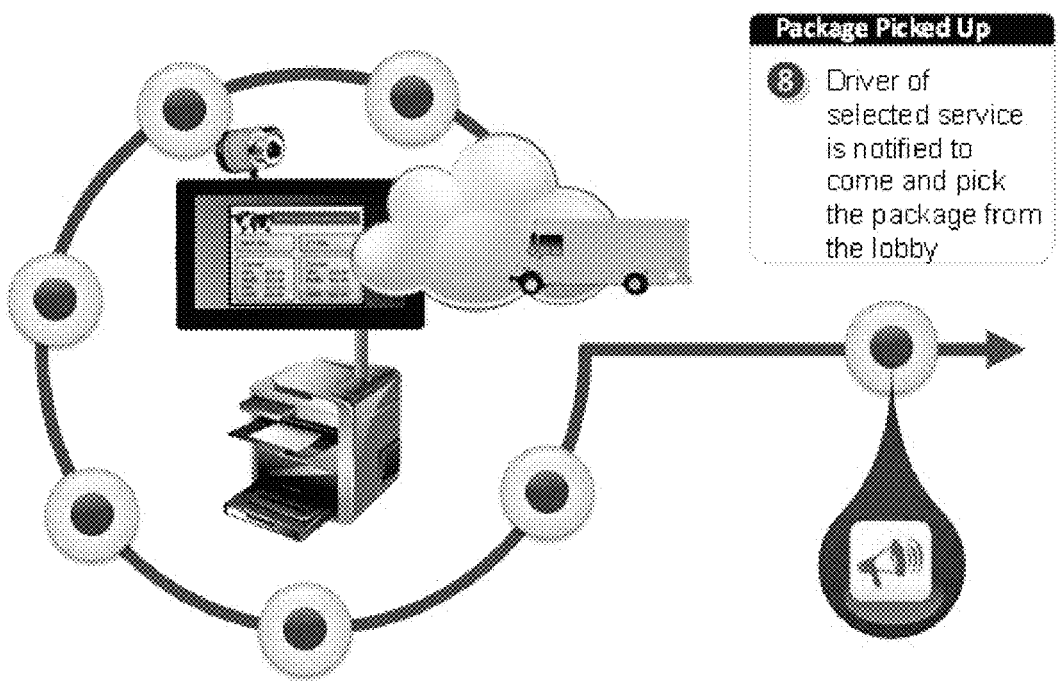

At 6820, an indication of a selected one of the shipping bids is received from the user. For instance (as shown in FIG. 55), the user can then select a desired bid.

At 6822, payment information for the selected one of the shipping bids is received from the user.

At 6824, the indication of the selected one of the shipping bids and the payment information is transmitted to the central server.

At 6826, acceptance of the payment information is received from the central server.

At 6828, a shipping label is printed via the printer upon acceptance of the payment information.

In certain embodiments, a notification is transmitted to a shipping company responsible for the selected one of the shipping bids of the package and the payment information.

Turning to FIG. 69, at 6910, an indication of a destination for a package (and, in some embodiments, a weight of the package) is received from an edge node coupled to two or more peripherals separate from the edge node, the two or more peripherals including at least a video display device and a printer.

At 6912, two or more shipping bids for the package are generated by transmitting shipping bid requests that include the destination for the package (and, in some embodiments, the weight) to two or more shipping companies.

At 6914, the two or more shipping bids for the package are transmitted to the edge node.

At 6916, an indication of the selected one of the shipping bids and payment information are received from the edge node.

At 6918, an acceptance of the payment information for the selected one of the shipping bids is received (e.g., from the selected shipping company or a payment card provider transacting the payment).

At 6920, the acceptance of the payment information is transmitted to the edge node.

The central server can also transmit a notification to a shipping company responsible for the selected one of the shipping bids of the package and the payment information.

10. Concluding Remarks

Further details for exemplary non-limiting embodiments of the disclosed cloud-based platform are shown in U.S. Provisional Application No. 61/801,857, filed on Mar. 15, 2013, and entitled "CLOUD SERVICES PLATFORM", and U.S. Provisional Application No. 61/889,525, filed on Oct. 10, 2013, and entitled "CLOUD SERVICES PLATFORM", both of which are hereby incorporated herein by reference. Any one or more of the features, aspects, and/or functions described in any of the appendices of these provisional applications or above can be used alone or in any combination or sub-combination with one another.

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention.

What is claimed is:

1. A system, comprising:
one or more cloud-based central servers; and
a plurality of edge nodes in communication with the one or more cloud-based central servers via the Internet, each of the edge nodes comprising an edge node processor for executing edge node software services, each of the edge nodes being further coupled to and configured to control different respective sets of two or more non-internet-enabled peripheral devices;
wherein the one or more cloud-based central servers are configured to provide web services over the Internet to a mobile device, the web services including a downloadable application, wherein the downloadable application is configured to operate on the mobile device to provide a single unified user interface on the mobile device operative to control the two or more peripheral devices coupled to and configured to be controlled by at least two respective ones of the plurality of edge nodes; and
wherein the downloadable application is a first application, and wherein the one or more cloud-based central servers are configured to provide a second application, wherein the second application is accessible by the mobile device and provides a second single unified user interface on the mobile device operative to control a different set of two or more peripheral devices controlled by a different set of at least two respective edge nodes among the plurality of edge nodes.

2. The system of claim 1, wherein the peripheral devices comprising at least one of the respective sets of two or more non-internet-enabled peripheral devices are heterogeneous peripheral devices.

3. The system of claim 1, wherein at least one of the peripheral devices among the respective sets of two or more non-internet-enabled peripheral devices has no separate user interface.

4. The system of claim 1, wherein the single unified user interface comprises: a user interface rendered on a touchscreen of the mobile device, including a first set of one or more user-selectable regions for controlling a first peripheral and a second set of one or more user-selectable regions for controlling a second peripheral.

5. The system of claim 4, wherein the first set and second set of user-selectable regions are simultaneously displayed to the user via the single unified user interface.

6. A non-transitory computer-readable medium storing instructions which, upon execution by a computer-implemented system, cause one or more cloud-based central servers in Internet communication with a plurality of edge nodes that are configured to control different respective sets of two or more non-internet-enabled peripheral devices to perform a method comprising:

providing a first downloadable application that is accessible by a mobile device, the first downloadable application providing a single unified user interface on the mobile device operative to control two or more of the non-internet-enabled peripheral devices controlled by at least two respective edge nodes from among the plurality of edge nodes; and providing a second downloadable application that is accessible by the mobile device, the second downloadable application providing a second single unified user interface on the mobile device operative to control a different set of two or more of the non-internet enabled peripheral devices controlled by a different set of at least two respective edge nodes from among the plurality of edge nodes.

7. The computer-readable medium of claim 6, wherein the peripheral devices comprising at least one of the respective sets of two or more non-internet-enabled peripheral devices are heterogeneous peripheral devices.

8. The computer-readable medium of claim 6, wherein at least one of the peripheral devices among the respective sets of two or more non-internet-enabled peripheral devices has no separate user interface.

9. The computer-readable medium of claim 6, wherein the single unified user interface comprises: a user interface rendered on a touchscreen of the mobile device, including a first set of one or more user-selectable regions for controlling a first peripheral and a second set of one or more user-selectable regions for controlling a second peripheral.

10. The computer-readable medium of claim 9, wherein the first set and second set of user-selectable regions are simultaneously displayed to the user via the single unified user interface.

11. A method, comprising:

by one or more cloud-based central servers in Internet communication with a plurality of edge nodes that are configured to control different respective sets of two or more non-internet-enabled peripheral devices:

providing a first downloadable application that is accessible by a mobile device, the first downloadable application providing a single unified user interface on the mobile device operative to control two or more of the non-internet-enabled peripheral devices controlled by at least two respective edge nodes from among the plurality of edge nodes; and providing a second downloadable application that is accessible by the mobile device, the second downloadable application providing a second single unified user interface on the mobile device operative to control a different set of two or more of the non-internet enabled peripheral devices controlled by a different set of at least two respective edge nodes from among the plurality of edge nodes.

12. The method of claim 11, wherein the peripheral devices comprising at least one of the respective sets of two or more non-internet-enabled peripheral devices are heterogeneous peripheral devices.

13. The method of claim 11, wherein at least one of the peripheral devices among the respective sets of two or more non-internet-enabled peripheral devices has no separate user interface.

14. The method of claim 11, wherein the single unified user interface comprises: a user interface rendered on a touchscreen of the mobile device, including a first set of one or more user-selectable regions for controlling a first non-internet-enabled peripheral and a second set of one or more user-selectable regions for controlling a second non-internet-enabled peripheral.

15. The method of claim 14, further comprising simultaneously displaying the first set and second set of user-selectable regions to the user via the single unified user interface.

* * * * *